United States Patent
McMurtry et al.

(10) Patent No.: US 12,055,388 B2
(45) Date of Patent: Aug. 6, 2024

(54) COORDINATE POSITIONING MACHINE

(71) Applicant: RENISHAW PLC, Wotton-under-Edge (GB)

(72) Inventors: David Roberts McMurtry, Stancombe (GB); Stephen Mark Angood, Portreath (GB)

(73) Assignee: RENISHAW PLC, Wotton-under-Edge (GB)

( * ) Notice: Subject to any disclaimer, the term of this patent is extended or adjusted under 35 U.S.C. 154(b) by 8 days.

(21) Appl. No.: 17/763,483

(22) PCT Filed: Oct. 15, 2020

(86) PCT No.: PCT/GB2020/052593
§ 371 (c)(1),
(2) Date: Mar. 24, 2022

(87) PCT Pub. No.: WO2021/074625
PCT Pub. Date: Apr. 22, 2021

(65) Prior Publication Data
US 2023/0375321 A1    Nov. 23, 2023

(30) Foreign Application Priority Data

Oct. 18, 2019 (GB) ...................................... 1915100
Dec. 11, 2019 (GB) ...................................... 1918184

(51) Int. Cl.
*G01B 5/008* (2006.01)
*G01B 5/00* (2006.01)
*B23Q 17/22* (2006.01)

(52) U.S. Cl.
CPC ........... *G01B 5/0016* (2013.01); *G01B 5/008* (2013.01); *B23Q 17/22* (2013.01)

(58) Field of Classification Search
CPC .................................................. G01B 5/0016
(Continued)

(56) References Cited

U.S. PATENT DOCUMENTS 647,491 A    4/1900 Hoffmann
3,661,276 A    5/1972 Wiesener
(Continued)

FOREIGN PATENT DOCUMENTS

CN    109690407 A    4/2019
CN    105973182 B    1/2020
(Continued)

OTHER PUBLICATIONS

French et al., "The spring-and-lever balancing mechanism, George Carwardine and the Anglepoise lamp," Proc Instn Mech Engrs, 2000, vol. 214, Part C, pp. 501-508.
(Continued)

*Primary Examiner* — George B Bennett
(74) *Attorney, Agent, or Firm* — Oliff PLC

(57) ABSTRACT

A coordinate positioning machine includes a plurality of drive axes, each being a rotary or linear drive axis, for positioning a platform within a working volume of the machine, and a separate linear counterbalance axis for counterbalancing the platform. With this arrangement the counterbalance axis can be substantially invariant to changes in orientation of the drive axes and can be counterbalanced by a simple counterweight. Also, an arrangement wherein the counterbalance axes and force generator are arranged so horizontal movement of the platform causes substantially no net movement of and/or no work to be done on the generator. Also, an arrangement wherein a series of counterbalance axes has at least one rotary counterbalance axis, and the generator is arranged behind or at a predetermined distance from the counterbalance axis. Also, an arrangement having a series of counterbalance axes with at most one rotary counterbalance axis between the generator and ground.

30 Claims, 28 Drawing Sheets

(58) Field of Classification Search
USPC .......................................................... 33/503
See application file for complete search history.

(56) References Cited

U.S. PATENT DOCUMENTS

| | | | |
|---|---|---|---|
| 4,229,136 | A | 10/1980 | Panissidi |
| 4,520,700 | A | 6/1985 | Herzog et al. |
| 4,949,465 | A | 8/1990 | Pesikov |
| 1,964,221 | A | 10/1990 | Breyer et al. |
| 5,072,522 | A | 12/1991 | Stott et al. |
| 5,257,461 | A | 11/1993 | Raleigh et al. |
| 5,650,852 | A * | 7/1997 | Chastain ............... G01B 11/005 33/702 |
| 5,724,264 | A * | 3/1998 | Rosenberg ........... G01B 21/042 700/161 |
| 5,787,758 | A | 8/1998 | Sheldon |
| 6,058,618 | A | 5/2000 | Hemmelgarn et al. |
| 6,397,485 | B1 | 6/2002 | McMurtry |
| 7,624,510 | B2 * | 12/2009 | Ferrari ................... G01B 21/04 33/503 |
| 7,779,549 | B2 * | 8/2010 | Garau .................... G01B 5/008 33/832 |
| 7,805,851 | B2 * | 10/2010 | Pettersson .............. G01B 5/008 33/503 |
| 11,003,095 | B2 | 5/2021 | Bustraan et al. |
| 11,236,987 | B2 * | 2/2022 | Derrick ................. G01B 5/012 |
| 11,566,880 | B2 * | 1/2023 | Sajedi ................... G01B 5/0014 |
| 2002/0069544 | A1 | 6/2002 | Mcmurtry |
| 2003/0129036 | A1 | 7/2003 | Fioroni |
| 2019/0145748 | A1 | 5/2019 | Angood |

FOREIGN PATENT DOCUMENTS

| | | |
|---|---|---|
| EP | 0 674 969 A1 | 10/1995 |
| GB | 379680 A | 8/1932 |
| GB | 404615 A | 1/1934 |
| GB | 417970 A | 10/1934 |
| GB | 433617 A | 8/1935 |
| GB | 2 568 459 A | 5/2019 |
| WO | 00/34733 A1 | 6/2000 |
| WO | 01/85403 A1 | 11/2001 |
| WO | 2007/144573 A1 | 12/2007 |
| WO | 2011/090890 A1 | 7/2011 |
| WO | 2017/174966 A1 | 10/2017 |
| WO | 2018/193228 A1 | 10/2018 |
| WO | 2019/073246 A1 | 4/2019 |

OTHER PUBLICATIONS

May 20, 2020 Search Report issued in British Patent Application No. 1918184.1.
Feb. 2, 2021 International Search Report issued in International Patent Application No. PCT/GB2020/052593.
Feb. 2, 2021 Written Opinion of the International Searching Authority issued in International Patent Application No. PCT/GB2020/052593.

* cited by examiner

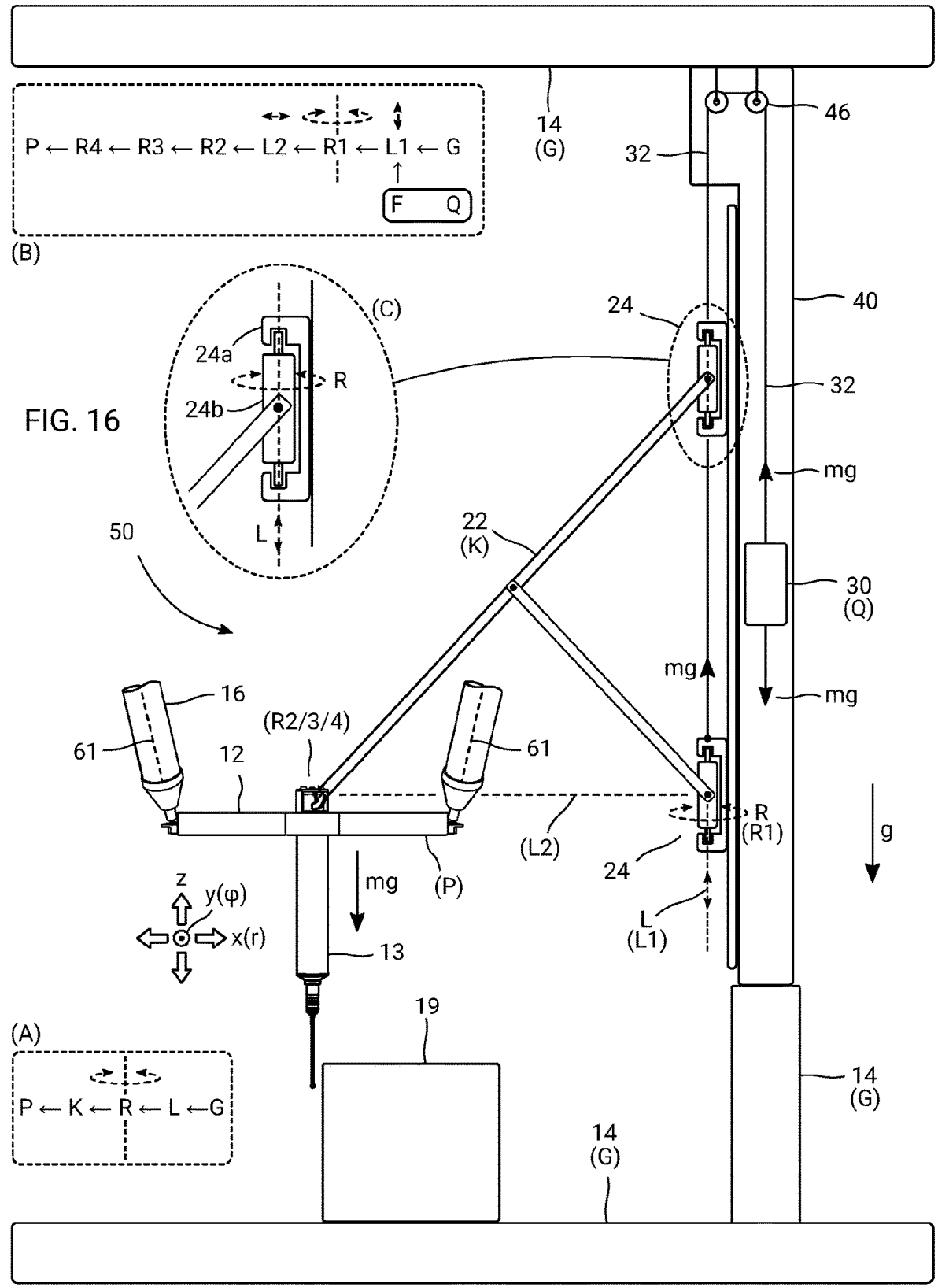

COORDINATE POSITIONING MACHINE

The present invention relates to a coordinate positioning machine. Coordinate positioning machines include, for example, coordinate measuring machines (CMMs) and machine tools.

FIG. 1 of the accompanying drawings shows a known type of coordinate measuring machine 1, having three linear axes x, y and z that are arranged orthogonally to one another in series, with the z axis being aligned with gravity g. A measurement probe 3 is mounted to a vertical column 8 which is slidable in the z direction within a carriage 2; this relative movement defines the z axis. The carriage 2 is itself supported on a horizontal beam 7 and is slidable in the y direction along the beam 7; this relative movement defines the y axis. In turn, the beam 7 is slidable in the x direction on a pair of rails 6; this relative movement defines the x axis. A computer controller 5 operates to drive each component (column 8, carriage 2, beam 7) along its corresponding respective axis to the appropriate position to place the measurement probe 3 in the desired position within the working volume of the machine, and to move it into a sensing relationship with a workpiece 9 which is supported on a fixed platform 4. The measurement probe 3 may be mounted to the vertical column 8 in a fixed manner as shown, or it may be mounted to the vertical column 8 via an articulated probe head as shown in the inset part of FIG. 1, with the articulated probe head providing two rotational axes a, b in addition to the three linear axes x, y, z.

Each axis x, y, z is driven independently of each other axis by a corresponding respective motor (not shown). Each axis x, y, z is also encoded or sensed independently of each other axis by a corresponding respective sensor, with the outputs from the sensors being used to determine the position of the measurement probe 3 (or whatever tool is attached to the column 8). Each axis is provided with a length-measuring transducer having an encoder scale (depicted schematically in FIG. 1 as a series of parallel lines along each axis) paired with a readhead (not shown). To measure relative movement between two parts, the encoder scale is mounted suitably to one part and the readhead is mounted suitably on the other part.

The coordinate measuring machine 1 of FIG. 1 can be referred to as a Cartesian coordinate measuring machine because it has three linear axes x, y and z that are arranged orthogonally to one another. With a Cartesian or orthogonal axis arrangement as shown in FIG. 1, in the absence of any drive from the motors (or other braking force) associated respectively with the x, y, z axes, since the z axis is aligned with gravity while the x, y axes are orthogonal to gravity, the system will be stable or self-supporting along the x, y axes, but along the z axis the vertical column 8 will naturally fall due to the force of gravity to its lowest possible position. To stabilise the system in the z direction, it is known to provide a counterbalance specifically for the z axis to counteract the weight of the vertical column 8 (and anything attached thereto, such as the measurement probe 3). Such z-axis counterbalance arrangements for Cartesian coordinate measuring or positioning machines are known, for example, from U.S. Pat. Nos. 6,058,618, 5,257,461 4,964,221A and 4,229,136.

Another type of coordinate measuring machine 10 is illustrated schematically in FIG. 2 of the accompanying drawings. The coordinate measuring machine 10 generally comprises a moveable platform 12 and a fixed platform 14 that are supported and moved relative to each other by a plurality of telescopic or extendable legs 16 provided between them. The fixed platform 12 forms part of a fixed structure of the machine 10. The moveable and fixed platforms 12, 14 can also be referred to as stages (or structures or parts), and the extendable legs 16 can also be referred to as struts (or actuators). Where there are six such extendable legs 16 (as illustrated in FIG. 2), the machine 10 is commonly called a hexapod.

The extendable legs 16 are typically mounted on the platforms 12, 14 via ball joints 18, with each leg 16 either having its own ball joint 18 at one or both ends thereof (as illustrated in FIG. 2) or sharing a ball joint 18 with an adjacent leg 16 at one or both ends. Each extendible leg 16 is typically formed as a pair of tubes, with one tube being moved telescopically within the other by a drive mechanism (e.g. linear motor) to provide extension and retraction of the extendible leg 16, as indicated by the arrows within each extendible leg 16 and as described in more detail in WO 2017/174966. A degree of separation between the drive and metrology parts of each strut can also be provided, as described in WO 2007/144573. It is also possible to provide a drive arrangement that is not only separate from but also different to the metrology arrangement, as described in WO 2019/073246.

Various relative positions between the moveable platform 12 and the fixed platform 14 can be achieved by extending the legs 16 by differing amounts. The relative position at any instant is monitored by a plurality of length-measuring transducers 17, with one such transducer for each extendable leg 16. Each length-measuring transducer 17 may comprise an encoder scale paired with a readhead, with the encoder scale being mounted suitably to one of the pair of telescopic tubes and the readhead mounted suitably on the other. Extension of the leg 16 thus causes the encoder scale to move past the readhead thereby allowing the length of the extendible leg 16 to be measured (or derived from measurements). A computer controller 15 operates to set the length of each extendible leg 16 to provide the required relative movement between the platforms 12, 14. By having six such length-measuring transducers 17, the relative position can be measured in six corresponding respective degrees of freedom (three translational degrees of freedom and three rotational degrees of freedom).

A workpiece 19 is mounted on the lower (fixed) platform 14 and a measurement probe 13 is mounted on the upper (moveable) platform 12. A working volume (or operating volume) 11 is defined between the upper (moveable) platform 12 and the lower (fixed) platform 14, with the measurement probe 13 being positioned (i.e. moved to a desired position) in the working volume 11 by operation of the extendible legs 16. The arrangement of FIG. 2 can be referred to as a "bottom-up" arrangement because the extendible legs 16 extend up from the fixed platform 14 to the moveable platform 12. This arrangement is illustrated more schematically in FIG. 3 of the accompanying drawings.

Alternatively, as illustrated schematically in FIG. 4 of the accompanying drawings, with a "top-down" arrangement the extendible legs 16 extend down from the fixed structure 14 to the moveable platform 12, with the measurement probe 13 mounted to a lower surface of the moveable platform 12 and a workpiece mounted to another part of the fixed structure 14 below that. These types of arrangement are discussed in more detail in WO 2019/073246, which also describes the use of a non-hexapod drive arrangement in combination with a hexapod metrology arrangement.

A measurement probe 13 is just one example of an operating tool that can be mounted on the moveable platform 12 to enable an operation to be performed on the workpiece 19. Depending on the intended application, the operating tool can be adapted for measuring, probing or scanning in the case of a coordinate measuring machine, or machining or drilling in the case of a machine tool. It is also possible to mount the workpiece 19 on the moveable platform 12 and the measurement probe 13 (or other operating tool) on the fixed platform 14.

The coordinate measuring machine 10 of FIG. 2 can be referred to as a non-Cartesian coordinate measuring machine because, in contrast to a Cartesian machine such as is illustrated in FIG. 1, its axes are not arranged orthogonally according to a Cartesian coordinate system. The coordinate measuring machine 10 of FIG. 2 can be considered to have six axes of movement (or six drive axes), corresponding to (and defined by) the six extendable legs 16. In this sense, an axis of a coordinate positioning machine can be considered to relate to a degree of freedom that is sensed (e.g. by a transducer or encoder), noting that an axis can be linear or rotary, and that a coordinate positioning machine can have a combination of linear and rotary axes.

The coordinate measuring machine 10 of FIG. 2 can also be referred to as a "parallel kinematic" coordinate measuring machine, because its axes of movement are arranged in parallel. This is to be contrasted with the coordinate measuring machine 1 of FIG. 1, which can be referred to as a "serial kinematic" coordinate measuring machine because its axes of movement are arranged instead in series. Another type of serial kinematic machine is an inspection robot or a manual articulating arm, with multiple articulating arm members connected in series by multiple rotary joints.

The moveable platform 12 and the measurement probe 13 of the coordinate measuring machine of FIG. 2 will have an associated weight that will need to be supported by the extendible legs 16. The motors that are provided to extend and retract the extendible legs 16 will therefore need to be working even to maintain the moveable platform 12 in a steady vertical position, and this will use energy and generate heat. Energy efficiency is particularly important in a metrology application, because heat generated by the motors can lead to thermal expansion of components that is uncontrolled and unknown, which will affect the metrology results in ways that cannot be calibrated out.

For this reason, a counterbalance can be provided in such machines to support at least part of the weight of the moveable platform 12. An example counterbalance arrangement for a hexapod coordinate positioning machine is disclosed in WO 2017/174966, and shown in FIG. of the accompanying drawings. The hexapod coordinate positioning machine of FIG. 5 has a top-down arrangement, like that of FIG. 4, and is provided with a counterbalance arrangement 90 having first and second arms 92, 94 connected to each other via a hinge 93. The first arm 92 is connected the moveable platform 12 via a ball 91 that is inserted into a retaining element 26 on the top of the moveable platform 12, forming a universal ball joint, and the second arm 94 is connected to a fixed part of the machine 10 (not shown) via rotary joint 95 and connected to the hinge 93 via another rotary joint 97. Hinge 93 generates a counterbalancing force by way of springs 96 that are just visible through apertures in the sheet material forming housing of hinge 93; the springs 96 are more clearly apparent in the reverse view of the counterbalance arrangement 90 as shown enclosed in the inset part of FIG. 5. These springs 96 generate a force that acts between the first and second arms 92, 94, and in particular which applies a moment of force (or torque) to the first arm 92 around rotary joint 98, which in turn applies a counterbalancing force to the platform 12 via the ball 91 and retaining element 26. When the platform 12 moves in a horizontal plane, second arm 94 swings around rotary joint 95, thereby moving hinge 93 in a wide arc, also in a horizontal plane. The hinge 93 and springs 96 also rotate around the rotary joint 97 as the platform 12 moves in a horizontal plane, such that the separation between the springs 96 and the rotary joint 95 varies depending on where the platform 12 is in the working volume.

The present applicant has appreciated that counterbalance arrangements for non-Cartesian machines, such as that illustrated in FIG. 5, suffer from one or more of the following drawbacks.

Firstly, such counterbalance arrangements have moving arms that, in certain positions of the moveable platform 12, can extend outside of the normal working volume, which increases the overall size of the machine, and which can also present a danger to operators. For example, this occurs with the machine of FIG. 5 when the platform 12 is moved laterally towards the rotary joint 95, forcing the upper part of the L-shaped second arm 94 to swing around outside the normal working volume.

Secondly, such counterbalance arrangements can suffer from non-ideal behaviour, particularly in certain parts of their range of operation, such that the weight of the moveable platform 12 is not supported uniformly around the working volume 11. For example, with the counterbalance of FIG. 5 the counterbalancing force provided by the springs 96 will vary slightly depending on the z position of the platform 12 because of the different spring extension involved.

Thirdly, in such counterbalance arrangements the arms 92, 94 and springs 96 adopt different positions and orientations relative to the moveable platform 12 depending on where the moveable platform 12 is in the working volume 11. The springs 96 in particular need to be relatively bulky (and therefore relatively weighty) in order to generate a sufficient counterbalance force to counterbalance a heavy moveable platform 12 (and whatever tool or components are coupled thereto). Even for horizontal movements of the moveable platform 12, these heavy springs 96 are moving around, and for certain movements of the moveable platform 12 in certain positions within the working volume, the springs 96 can be subject to very high and highly non-uniform accelerations. Accordingly, for these reasons, the dynamic response of the system (e.g. when being accelerated) can be highly non-uniform. This is a consequence of the fact that the counterbalance arrangement of FIG. 5 comprises only rotary axes (no linear axes, i.e. no linear degrees of freedom), with at least two rotary axes between the heavy springs 96 and the fixed structure of the machine, which leads to complicated motions of the springs 96. With the counterbalance arrangement of FIG. 5 there are two rotary counterbalance axes 95, 97 between the force generator (i.e. the springs 96) and ground (i.e. the fixed structure of the machine), but in similar known types of counterbalance arrangement there can effectively be three rotary counterbalance axes between the force generator and ground. This is discussed in more detail below with reference to FIGS. 11 and 44 of the accompanying drawings.

Finally, the types of z-axis counterbalance arrangements as mentioned above in connection with Cartesian machines are simply not suitable for non-Cartesian machines because non-Cartesian machines do not have a fixed z axis which can be counterbalanced directly. For example, the hexapod coordinate positioning machine 10 shown in FIG. 2 effectively has six linear axes (i.e. the six drive axes associated respectively with the six extendable legs 16), but none of these drive axes is aligned with gravity at all times and none of these drive axes is independent of the other drive axes. Rather, movement of the platform 12 in the z direction involves changes to all six drive axes (i.e. changes in length of all six extendible legs 16) of the hexapod coordinate positioning machine 10, so it is not possible to provide a z-axis counterbalance arrangement such as is used in Cartesian machines.

It is therefore desirable to provide an improved counterbalance arrangement for a coordinate positioning machine and in particular, but not exclusively, for a non-Cartesian coordinate positioning machine.

A coordinate positioning machine forming the basis for several aspects of the present invention comprises: a plurality of drive axes for positioning a moveable structure within a working volume of the machine; a plurality of counterbalance axes for counterbalancing the moveable structure; and a force generator for generating a counterbalance force which is applied to at least one of the counterbalance axes.

According to one aspect of the present invention, the counterbalance axes comprise a linear counterbalance axis and the counterbalance force is applied to the linear counterbalance axis.

According to another aspect of the present invention, the counterbalance axes and force generator are mutually arranged such that movement of the moveable structure in a direction perpendicular to gravity causes substantially no (net) movement of the force generator, other than due to rotation of the force generator about at most one rotary counterbalance axis.

According to another aspect of the present invention, the counterbalance axes and force generator are mutually arranged such that movement of the moveable structure in a direction perpendicular to gravity causes substantially no (net) work to be done on the force generator (overall), other than due to rotation of the force generator about at most one rotary counterbalance axis.

According to another aspect of the present invention, the counterbalance axes are arranged in series, the counterbalance axes comprise at least one rotary counterbalance axis, and the force generator is arranged behind the first rotary (or only) counterbalance axis in (or of) the series (when viewed in a direction towards the moveable structure).

According to another aspect of the present invention, the counterbalance axes are arranged in series, the counterbalance axes comprise at least one rotary counterbalance axis, and the force generator is arranged (or positioned) at a predetermined horizontal distance (or separation or offset) from the first rotary (or only) counterbalance axis in (or of) the series (when viewed in a direction towards the moveable structure).

According to another aspect of the present invention, the counterbalance axes are arranged in series with at most one rotary counterbalance axis (in the series of counterbalance axes) between the force generator and a fixed structure of the machine.

According to another aspect of the present invention, there is provided a coordinate positioning machine comprising a plurality of drive axes (each of which is either a rotary drive axis or a linear drive axis) for positioning a moveable structure within a working volume of the machine, and a linear counterbalance axis (separate from any of the drive axes) for counterbalancing the moveable structure.

According to another aspect of the present invention, there is provided a method of counterbalancing a coordinate positioning machine having a plurality of drive axes (each of which is either a rotary drive axis or a linear drive axis) for positioning a moveable structure within a working volume of the machine, the method comprising providing a linear counterbalance axis (separate from any of the drive axes) and counterbalancing the moveable structure via the linear counterbalance axis.

It will be appreciated that the above-mentioned aspects can be used independently of one another, or in any suitable combination.

An embodiment of the present invention in which a linear counterbalance axis is employed is particularly beneficial for a non-Cartesian coordinate positioning machine in which none of the drive axes of the machine has a fixed orientation and in which none of the drive axes can therefore be directly counterbalanced. By providing a separate linear counterbalance axis, which can be counterbalanced directly, the machine is able to take advantage of the benefits of a simple (yet highly effective) linear counterbalance arrangement such as that described below with reference to FIG. 6 of the accompanying drawings. Such a counterbalance arrangement is able to provide ideal (or near-ideal) counterbalance behaviour regardless of the position (in particular the z position) of the moveable structure within the working volume, unlike for known counterbalance arrangements such as that described above with reference to FIG. 5. This is possible in an embodiment of the present invention because the orientation of the linear counterbalance axis is substantially invariant to changes in orientation of the drive axes, thereby providing a stable and constant reference for the counterbalance arrangement.

For an embodiment of the present invention in which the force generator is not caused to move (or where no net work is performed on the force generator) when the moveable structure is moved horizontally (other than perhaps due to rotation of the force generator around at most one rotary counterbalance axis), the drive arrangement is thereby performing less work (using less energy and generating less heat) compared for example to the counterbalance arrangement described with reference to FIG. 5. In this respect, the force generator is typically relatively heavy (e.g. a large counterweight or a bulky spring), so the benefit of moving the force generator around as little as possible can be significant. Even where there is movement of the force generator around at most one rotary axis, the dynamic response is more controlled and/or less extreme, without rapid changes in acceleration of the force generator, compared to the type of counterbalance arrangement shown in FIG. 5.

For an embodiment in which the force generator is arranged behind the first rotary counterbalance axis in the series of counterbalance axes, there is no rotation of the force generator for any movement of the moveable structure, which again leads to less work being done by the drive arrangement. Even if not strictly arranged behind the first rotary axis in series, it is advantageous nonetheless to place the force generator close to (preferably along) the rotary counterbalance axis to reduce the amount of work performed in rotating the force generator.

Reducing the amount of work done by the drive arrangement is advantageous because this in turn reduces the amount of heat generated by the drive arrangement, thereby reducing the adverse effects that thermal expansion and contraction of machine parts has on metrology results. For a hexapod coordinate positioning machine, it is beneficial to avoid making the drive arrangement do extra work for horizontal movements of the platform in particular, because the drive struts are typically more powerful in the vertical direction than in the horizontal direction by virtue of their predominantly vertical orientation.

Unless already stated as being the case, the counterbalance axes may be arranged in series.

Unless already stated as being the case, the coordinate positioning machine may comprise at most one rotary counterbalance axis (in the series of counterbalance axes) between the force generator and a fixed structure of the machine.

Unless already stated as being the case, the counterbalance axes may comprise at least one linear counterbalance axis.

The counterbalance axes comprise at least two linear counterbalance axes.

The counterbalance axes comprise two linear counterbalance axes.

The or each linear counterbalance axis may have a substantially constant orientation relative to gravity.

The coordinate positioning machine may comprise a linkage for transferring the counterbalance force to the moveable structure.

The linkage may be a rigid linkage.

The linkage may be a mechanical linkage.

The linkage may comprise a plurality of rigid interconnected links connected by a plurality of joints.

The linkage may be adapted to provide for movement of the moveable structure in a direction perpendicular to gravity whilst causing the counterbalance force to do substantially no work.

The linkage and the force generator may be mutually arranged to maintain the counterbalance force in a substantially constant orientation relative to gravity as the moveable structure moves around the working volume.

The counterbalance force transferred to the moveable structure by linkage may be substantially aligned with gravity.

The linkage may be separate from and/or independent of any of the drive axes.

The force generator and linkage may be mutually arranged substantially in a plane and remain so as the moveable structure moves around the working volume.

The plane may be substantially aligned with gravity.

The linkage and force generator may be mutually arranged such that there is substantially no change in the direction of the counterbalance force as the moveable structure moves around the working volume.

The linkage may not change substantially in form during a vertical movement of the moveable structure. The linkage may move as a whole during a vertical movement of the moveable structure.

The counterbalance axes may comprise first and second linear counterbalance axes which are arranged substantially perpendicular to one another.

The second linear counterbalance axis may be provided by the linkage.

The linkage may be adapted to produce a substantially perpendicular change of motion, from linear to linear.

The linkage may be a Scott Russell linkage. The linkage may be a Scott Russell type of linkage.

The counterbalance force may be applied to a predetermined linear counterbalance axis of the plurality of counterbalance axes.

An orientation of the predetermined linear counterbalance axis may be substantially invariant to any change in orientation of the drive axes.

An orientation of the predetermined linear counterbalance axis may be substantially invariant to actuation of the drive axes.

The predetermined linear counterbalance axis may have a substantially constant orientation relative to gravity.

The predetermined linear counterbalance axis may be substantially aligned with gravity.

The predetermined linear counterbalance axis may be the first linear counterbalance axis.

The predetermined linear counterbalance axis may be behind any rotary counterbalance axis of the series of counterbalance axes (viewed in a direction towards the moveable structure).

The predetermined linear counterbalance axis may be in front of at least one rotary counterbalance axis of the series of counterbalance axes (viewed in a direction towards the moveable structure).

The linkage may be adapted to absorb horizontal movement of the moveable structure and to convert vertical movement of the moveable structure into corresponding vertical movement of the linkage along the predetermined linear counterbalance axis. This vertical movement of the linkage may be vertical movement of the entire linkage along the predetermined linear counterbalance axis substantially without change in form.

The linkage may be adapted to maintain the counterbalance force in a direction substantially parallel with the predetermined counterbalance axis.

The moveable structure may be counterbalanced along the predetermined linear counterbalance axis via the linkage.

At least part of the weight of the moveable structure may be supported via the linkage by a substantially constant counterbalance force (or component thereof) applied to the linkage along the predetermined linear counterbalance axis.

The coordinate positioning machine may comprise at least one support member coupled (e.g. slidably) to the predetermined linear counterbalance axis. The counterbalance force may be arranged to act on the at least one support member, and the linkage may be connected (or coupled) between the moveable structure and the at least one support member (to transfer the counterbalance force from the at least one support member to the moveable structure).

The at least one support member may be arranged to move slidably along the predetermined linear counterbalance axis (e.g. along a linear track).

The or each support member may provide a rotary counterbalance axis of the plurality of counterbalance axes.

A vertical movement of the moveable structure by the drive arrangement may be converted by the linkage into a corresponding vertical movement of the at least one support member, causing the counterbalance force applied to (acting on) the at least one support member to do work substantially equal but opposite to the work done by the force of gravity acting on the moveable structure.

A first value can be considered to be substantially equal to a second value if the first value is to within 20% of the second value, or more preferably to within 10% of the second value, or more preferably to within 5% of the second value, or more preferably to within 1% of the second value.

A horizontal movement of the moveable structure by the drive arrangement may be converted by the linkage into at most a vertical movement of the at least one support member, causing the force(s) applied to at least one support member to do substantially no work overall.

The coordinate positioning machine may comprise first and second support members each arranged to move slidably along a track that is substantially aligned with gravity.

Movement of the moveable structure in a direction perpendicular to the or each track may be translated by the linkage into movement of the second support member along its track with substantially no movement of the first support member along its track. Movement of the moveable structure in a direction parallel to the or each track may be translated by the linkage into motion of at least the first support member along its track in the same direction and by the same amount.

The counterbalance force may be applied to the first support member and not the second support member.

A force $F_i$ may be applied by the force generator to each support member i in a direction substantially opposed to gravity, with $\Sigma_i F_i \sim mg$, with the linkage translating or converting changes dx, dy, dz in the moveable structure to changes $dx_i$, $dy_i$, $dz_i$ in each support member i such that $\Sigma_i F_i dz_i \sim mg.dz$, $dx_i \sim 0$ and $dy_i \sim 0$, where m is the mass of the moveable structure, g is the gravitational acceleration and i is an integer greater than or equal to one and where at least one of $F_i$ may be zero.

The counterbalance force generated by the force generator may act between the at least one support member and a fixed structure of the machine.

Unless already stated as being the case, the counterbalance axes may comprise at least one rotary counterbalance axis.

The counterbalance axes may comprise a single rotary axis (e.g. excluding any which may be provided as part of a universal joint) or four rotary counterbalance axes (e.g. three of which may be provided as part of a universal joint).

Unless already stated as being the case, the force generator may be arranged behind or at a predetermined horizontal distance (or separation or offset) from the first rotary counterbalance axis in (or of) the series of counterbalance axes (when viewed in a direction towards the moveable structure).

The force generator may be arranged close to the first rotary counterbalance axis. In other words, the predetermined horizontal distance may be small. The predetermined horizontal distance may be substantially zero.

The predetermined horizontal distance may be less than 50% of (or more preferably less than 25% of, or more preferably less than 10% of, or more preferably less than 5% of) a representative horizontal distance (or separation or offset) between the first rotary counterbalance axis and the moveable structure. This may be the case for any (normal or realistic) position of the moveable structure within the working volume.

The representative horizontal distance (between the first rotary counterbalance axis and the moveable structure) may be determined relative to a representative point of the moveable structure, such as a geometric centre of the moveable structure, or its centre of gravity.

Alternatively, the representative horizontal distance may be between the first rotary counterbalance axis and a centre of the working volume, or may be a representative width of the working volume.

The predetermined horizontal distance (between the first rotary counterbalance axis and the force generator) may be determined relative to a representative point of the force generator, such as a geometric centre of the force generator, or its centre of gravity.

The predetermined horizontal distance (between the force generator and the first rotary counterbalance axis) may be substantially constant, and this may be maintained as the moveable structure moves around the working volume.

Unless already stated as being the case, the counterbalance axes and force generator may be mutually arranged such that movement of the moveable structure in a direction perpendicular to gravity causes substantially no net movement of, other than due to rotation of the force generator about at most one rotary counterbalance axis.

Unless already stated as being the case, the counterbalance axes and force generator may be mutually arranged such that movement of the moveable structure in a direction perpendicular to gravity causes substantially no work to be done on the force generator, other than due to rotation of the force generator about at most one rotary counterbalance axis.

The at most one rotary counterbalance axis may be the first (or only) rotary counterbalance axis in the series of counterbalance axes (when viewed in a direction towards the moveable structure).

Each of the plurality of drive axes may be either a rotary drive axis or a linear drive axis.

Each of the plurality of counterbalance axes may be either a rotary counterbalance axis or a linear counterbalance axis.

The counterbalance axes may be separate from the drive axes.

Each counterbalance axis may be separate from and/or independent of and/or different to each of the drive axes.

The counterbalance force generated by the force generator may be substantially aligned with gravity.

The or each counterbalance axis to which the counterbalance force is applied may have a substantially constant orientation relative to gravity.

The or each counterbalance axis to which the counterbalance force is applied may be substantially aligned with gravity (e.g. in the case of a linear counterbalance axis) or substantially perpendicular to gravity (e.g. in the case of a rotary counterbalance axis).

The counterbalance axes and force generator may be mutually arranged such that movement of the moveable structure in a direction parallel to gravity causes work to be done on the force generator that is substantially equal to the work done by the force of gravity acting on the moveable structure.

As mentioned above, a first value can be considered to be substantially equal to a second value if the first value is to within 20% of the second value, or more preferably to within 10% of the second value, or more preferably to within 5% of the second value, or more preferably to within 1% of the second value.

The force applied to the counterbalance axis may be at least a component of the actual counterbalance force generated by the force generator. For example, the force applied to the counterbalance axis may be a component of the counterbalance force relative to the counterbalance axis (for example along a linear counterbalance axis or around a rotary counterbalance axis).

Applying a counterbalance force to the counterbalance axis may comprise applying the counterbalance force along or around the counterbalance axis (for example along a linear counterbalance axis or around a rotary counterbalance axis).

The counterbalance axes may be passive and/or not active and/or not driven and/or not powered.

Counterbalancing the moveable structure may comprise providing a counterbalance for the moveable structure. Counterbalancing the moveable structure may comprise supporting at least part of the weight of the moveable structure.

The counterbalance force applied to the counterbalance axis may be transferred to the moveable structure via at least one of the other counterbalance axes.

The counterbalance force may be transferred via the linkage.

The counterbalance force may be a substantially constant counterbalance force.

The force generator may be adapted to generate a substantially constant counterbalance force.

The counterbalance force (or at least a magnitude thereof) may be substantially equal to a force of gravity (or at least a magnitude thereof) acting on the moveable structure. The force generator may be adapted to generate a counterbalance force (the magnitude of which is) substantially equal to a force of gravity acting on the moveable structure.

The force generator may comprise a counterweight which generates a tensional force in a string or cord or cable or wire or similar coupled thereto.

The force generator may comprise a spring which generates a spring force. The spring may be a constant force spring such as a fusee spring.

Each counterbalance axis (other than those forming part of a universal joint) may have (or maintain) a substantially constant orientation relative to gravity (as the moveable structure moves around the working volume).

It may be that none of the drive axes has (or maintains) a substantially constant orientation relative to gravity (as the moveable structure moves around the working volume).

The counterbalance axes may be arranged between the moveable structure and a fixed structure of the machine.

The drive axes may be arranged between the moveable structure and a fixed structure of the machine.

The machine may comprise a fixed structure.

Relative movement around a rotary (drive or counterbalance) axis may be sensed by a corresponding rotary transducer.

Relative movement along a linear (drive or counterbalance) axis may be sensed by a corresponding linear transducer.

The drive axes may form part of a drive arrangement for moving the moveable structure around the working volume and the counterbalance axes form part of a counterbalance arrangement for supporting at least part of a weight of the moveable structure.

The machine may comprise a fixed structure, and the drive and counterbalance arrangements may be connected separately and/or in parallel between the moveable structure and the fixed structure.

The drive and counterbalance arrangements may be connected separately to the moveable structure.

The counterbalance arrangement may be arranged with at least 80% of its overall mass (or that of the force generator) being within 10% of a horizontal separation between the (linear and/or first rotary) counterbalance axis (of the series of counterbalance axes) and a centre of the working volume.

The drive arrangement may comprise a plurality of extendable legs connected between the moveable structure and a fixed structure of the machine.

The extendible legs may be oriented (on average) closer to vertical than horizontal (at least for a central position of the moveable structure within the working volume).

The coordinate positioning machine may comprise six such extendable legs.

A linear (drive or counterbalance) axis may be one which provides a linear degree of freedom (for the drive or counterbalance arrangement, as the case may be).

A linear (drive or counterbalance) axis may be one which provides constrained relative linear motion between two machine elements (of the drive or counterbalance arrangement, as the case may be).

A rotary (drive or counterbalance) axis may be one which provides a rotary degree of freedom (for the drive or counterbalance arrangement, as the case may be).

A rotary (drive or counterbalance) axis may be one which provides constrained relative rotary motion between two machine elements (for the drive or counterbalance arrangement, as the case may be).

The counterbalance force may be generated along an axis that maintains a substantially constant alignment with or relative to gravity as the moveable structure moves around the working volume.

The coordinate positioning machine may comprise a brake for holding the moveable structure in the same position in the working volume when the drive axes is not being controlled to move the moveable structure around the working volume.

Each of the drive axes may be a linear drive axis.

The drive axes may be associated respectively with the extendible legs.

The coordinate positioning machine may comprise a metrology arrangement for measuring a position of the moveable structure within the working volume.

The metrology arrangement may be adversely affected by heat generated by the drive arrangement.

The drive and metrology arrangements may be connected separately between the moveable structure and the fixed structure.

The metrology arrangement may comprise a plurality of length-measuring transducers.

Each length-measuring transducer may comprise an encoder scale paired with a readhead.

The transducers may be associated respectively with the extendable legs.

The coordinate positioning machine may be a non-Cartesian coordinate positioning machine. It may be that the drive axes of the coordinate positioning machine are not mutually orthogonal.

The coordinate positioning machine may be a parallel kinematic coordinate positioning machine. It may be that the drive axes of the coordinate positioning machine are arranged in parallel.

The coordinate positioning machine may be a hexapod coordinate positioning machine.

The moveable structure may comprise a moveable platform and at least one tool supported on the moveable platform.

The tool may be or may comprise a measurement probe.

The coordinate positioning machine may be a coordinate measuring machine.

According to another aspect of the present invention, there is provided a coordinate positioning machine comprising a moveable structure, a drive arrangement for moving the moveable structure around a working volume of the machine, and a counterbalance arrangement for supporting at least part of a weight of the moveable structure (that would otherwise be supported by the drive arrangement).

The counterbalance arrangement may be rotatable about a counterbalance axis, which may be a fixed counterbalance axis. The counterbalance arrangement may comprise a force generator for generating a counterbalance force and a linkage for transferring the counterbalance force to the moveable structure.

The counterbalance arrangement (for example the linkage of the counterbalance arrangement) may be arranged and/or adapted to provide (or accommodate or allow or enable) at least one of the following:

(a) relative movement between the moveable structure and the counterbalance axis in a direction perpendicular to gravity and/or perpendicular the counterbalance axis substantially without causing (net) work to be done on the force generator (by the drive arrangement) and/or substantially without causing the force generator to move or be moved and/or substantially without causing (net) movement of the force generator; and (b) movement of the moveable structure (e.g. relative movement between the moveable structure and the counterbalance axis optionally in a direction perpendicular to gravity and/or perpendicular to the counterbalance axis) without substantially changing (or altering or affecting) a separation (or offset or distance) and/or a relative orientation between the force generator and/or counterbalance force (generated by the force generator) and the counterbalance axis (or gravity in the case of the relative orientation).

A movement of the moveable structure by a predetermined angle around the counterbalance axis may cause a movement of the linkage and/or force generator and/or counterbalance force by a corresponding angle around the counterbalance axis.

A movement of the moveable structure by a predetermined amount vertically within the working volume may cause the linkage to move (e.g. or translate or slide) vertically by a corresponding amount.

The force generator and/or the counterbalance force may be arranged substantially in or on or along a plane containing the counterbalance axis and a connection between the linkage and the moveable structure, and this may remain so as the moveable structure moves around the working volume.

The force generator and/or the counterbalance force, the counterbalance axis and the linkage may be arranged substantially in a plane, and this may remain so as the moveable structure moves around the working volume.

The counterbalance axis may be arranged out of the working volume, for example to the side of the working volume.

The linkage may be arranged such that, for such a movement of the moveable structure relative to the counterbalance axis, substantially no (net or overall) work is (done or) performed by the (counterbalance force generated by the) force generator.

The linkage may be arranged such that, for such a movement of the moveable structure relative to the counterbalance axis, there is substantially no (net) movement of the force generator in a direction perpendicular to gravity.

The linkage may be arranged such that, for a movement of the moveable structure in a direction aligned with gravity, the work performed by the (counterbalance force generated by the) force generator is substantially equal but opposite to the work performed by a gravitational force acting on the moveable structure.

The linkage may be adapted to isolate or decouple a movement of the moveable structure relative to the counterbalance axis from the force generator.

The force generator may be arranged on or close to the counterbalance axis.

The force generator may be (closely) associated with the counterbalance axis.

The force generator may be coupled to the counterbalance axis.

At least part of the force generator may be arranged on or along the counterbalance axis.

The counterbalance arrangement or force generator may have at least 80% of its overall mass within 10% of a horizontal separation between the counterbalance axis and a centre of the working volume.

A (net) distance moved by the force generator (e.g. under the action of a force derived or resulting from or produced by the drive arrangement) may be less than 10% of the distance moved by the moveable structure during such a movement relative to the counterbalance axis.

The linkage may be adapted to isolate or decouple a movement of the moveable structure relative to the counterbalance axis from the at least one support member to enable the substantially constant orientation relative to gravity to be maintained.

A separation between the force generator and the counterbalance axis may be determined based on a representative point of the force generator, such as its geometrical centre or centre of gravity. In this respect, the force generator may comprise multiple parts that move relative to one another, so that even if there is movement of one of the parts there may be a corresponding movement of another part in the opposite direction so that the centre point does not move.

The linkage may be arranged and/or adapted to enable (or provide for or allow for) a movement of the moveable structure relative to the counterbalance axis in a direction perpendicular to gravity without causing any (net or overall) work to be done (or performed) on the force generator (by the drive arrangement).

The linkage may be arranged and/or adapted to enable (or provide for or allow for) the moveable structure to move or be moved (by the drive arrangement) relative to the counterbalance axis in a direction perpendicular to gravity without causing any (net or overall) work to be done (or performed) on the force generator (by the drive arrangement).

The linkage may be arranged and/or adapted such that for a movement of the moveable structure relative to the counterbalance axis in a direction perpendicular to gravity there is substantially no (net or overall) work done (or caused to be done or performed) on the force generator (by the drive arrangement).

The linkage may be arranged and/or adapted such that for a movement of the moveable structure in a direction perpendicular to gravity there is substantially no movement (or at least no net movement) of the force generator relative to the counterbalance axis and substantially no work is done (or caused to be done) by the force generator (or by the counterbalance force).

The linkage may be arranged and/or adapted such that substantially no work is done on or by the force generator by a movement of the moveable structure in a direction perpendicular to gravity, at least when the movement is also in a direction towards/away from (or along a line intersecting) the counterbalance axis.

The linkage may be arranged and/or adapted such that for a movement of the moveable structure in a direction perpendicular to gravity there is substantially no work done on the force generator by a movement relative to the counterbalance axis and substantially no work is done (or caused to be done) by the force generator.

The linkage may be arranged and/or adapted such that for a movement of the moveable structure in a direction perpendicular to gravity there is substantially no net movement of the force generator relative to the counterbalance axis and substantially no work is done (or caused to be done) by the force generator.

The linkage may be arranged and/or adapted such that for a movement of the moveable structure in a direction perpendicular to gravity there is substantially no work done (or caused to be done) on or by the force generator.

The linkage may be arranged and/or adapted to isolate (at least partially) such a movement of the moveable structure from the force generator such that no work is caused to be done or performed on the force generator.

The linkage may be arranged and/or adapted to maintain the counterbalance force in a direction substantially parallel with or to the counterbalance axis as the moveable structure is moved around the working volume by the drive arrangement.

The force generator may be referred to alternatively as a (counterbalance) force source or (counterbalance) force origin.

A movement of the moveable structure relative to something else (e.g. the counterbalance axis) can be considered to relate to a movement of a particular part of or point on the moveable structure, for example a connection between the moveable structure and the linkage (a part or point or place where the linkage connects or couples to the moveable structure), or a centre of gravity of the moveable structure, or a centre of a platform forming part of the moveable structure.

A movement relative to the counterbalance axis can be considered to be a movement (directly) towards or away from the counterbalance axis. A movement relative to the counterbalance axis can be considered to be a movement in a direction (or along a line) that intersects the counterbalance axis. A movement relative to the counterbalance axis can be considered to be a radial movement relative to or with respect to counterbalance axis. A movement relative to the counterbalance axis can be considered to be a movement along a radius extending from the counterbalance axis. A movement relative to the counterbalance axis can be considered to be a movement along a line extending radially from the counterbalance axis.

Work done on the force generator is to be distinguished from work done by the force generator. Work done by the force generator is the work done by the force which is generated internally by the force generator itself (noting that work done may be negative); if that force is applied to an object then the work done by the force generator (or the force generated by the force generator) is equal to the force multiplied by the distance moved by the object under application of that force. On the other hand, work done on the force generator is the work done by a force generated externally of the force generator and applied to the force generator, with the work done on the force generator being equal to the force multiplied by the distance moved by the force generator under the application of that force. If the force generator does not move at all for a particular movement of the moveable structure then no work has been done on the force generator, because otherwise it will have been caused to move (accelerate). As will become apparent from the detailed description below, it is possible for there to be some relative internal movement of parts of the force generator, so long as there is no net movement overall (so that no net work is done). For a known counterbalance arrangement described above with reference to FIG. 5, although no work is done by the spring (force) for a horizontal platform move, because there is no change in spring extension, there must be work done on the spring (i.e. the force generator) by the drive struts because the spring is caused to move (accelerate).

The term "position" as used herein can be considered to mean position and/or orientation. The term "vertical" as used herein can be considered to mean in a direction substantially aligned with gravity. The term "horizontal" or "lateral" as used herein can be considered to mean in a direction substantially perpendicular to gravity.

To distinguish from cases in which the stated properties are exhibited only for a small subset of artificially-restricted movements of the moveable structure, i.e. not for the full type and range of movements which would typically occur in a normal working routine, the stated properties of the counterbalance arrangement may be considered to apply for all possible movements of the moveable structure (or at least those movements that comply with any stated restrictions, such as movements that are perpendicular to gravity) in at least one contiguous part of the working volume not being less than 25% of the working volume, more preferably not being less than 50% of the working volume, more preferably not being less than 75%, more preferably being the entire working volume.

In the case where the force generator comprises multiple parts which are moveable relative to one another (e.g. multiple counterweights), a reference to there being no movement of the force generator can be considered to mean that there is no overall or net movement of the parts forming the force generator. For example, if one part (e.g. counterweight) moves up and the other moves down then there can be considered to be no overall or net movement. It will also be appreciated that mere rotation of a part (e.g. a pulley) does not count as movement of the part in this context because there is no movement of the centre of the part.

Alternatively, the force generator can be considered to have a representative point, and the position of (and therefore movement of) the force generator can be determined based on that representative point. For example, the representative centre point may be a geometric centre or a centre of gravity of the force generator, or a weighted mean position of multiple parts taking account of the respective forces acting on the parts (e.g. the force generator may comprise one counterweight supported by a single pulley arrangement and another counterweight of twice the mass supported by a double pulley arrangement).

Where there is a reference to there being substantially no movement of a first part caused by a particular movement of a second part (optionally relative to a third part), this can be understood as meaning that the movement of the first part is less than 10% of the movement of the second part (optionally relative to the third part), more preferably less than 5% and more preferably less than 1%.

Similarly, where there is a reference to there being substantially no work done on a first part due to a particular movement of a second part, this can be understood as meaning that the work done on the first part is less than 10% of the work done on the second part by such a movement, more preferably less than 5% and more preferably less than 1%.

Reference will now be made, by way of example, to the accompanying drawings, in which:

FIG. 1, discussed hereinbefore, is schematic illustration of a Cartesian coordinate positioning machine;

FIG. 2, discussed hereinbefore, is schematic illustration of a non-Cartesian coordinate positioning machine;

FIG. 3, discussed hereinbefore, is a schematic illustration of a bottom-up arrangement for a non-Cartesian coordinate positioning machine, corresponding to the arrangement of FIG. 2;

FIG. 4, discussed hereinbefore, is a schematic illustration of a top-down arrangement, which is an alternative to the bottom-up arrangement of FIG. 3;

FIG. 5, discussed hereinbefore, illustrates a known type of counterbalance for a non-Cartesian coordinate positioning machine;

FIGS. 6 and 7 schematically illustrate a counterbalance arrangement for a non-Cartesian machine that is stable in the z direction but not in the x and y directions; this arrangement does not constitute an embodiment of the present invention;

FIG. 8 is a more schematic representation of the counterbalance arrangement of FIGS. 6 and 7;

FIG. 9 provides a more generalised representation of FIG. 8, showing a generic force generator in place of the pulley and counterweight arrangement depicted in FIG. 8;

Figure 5:
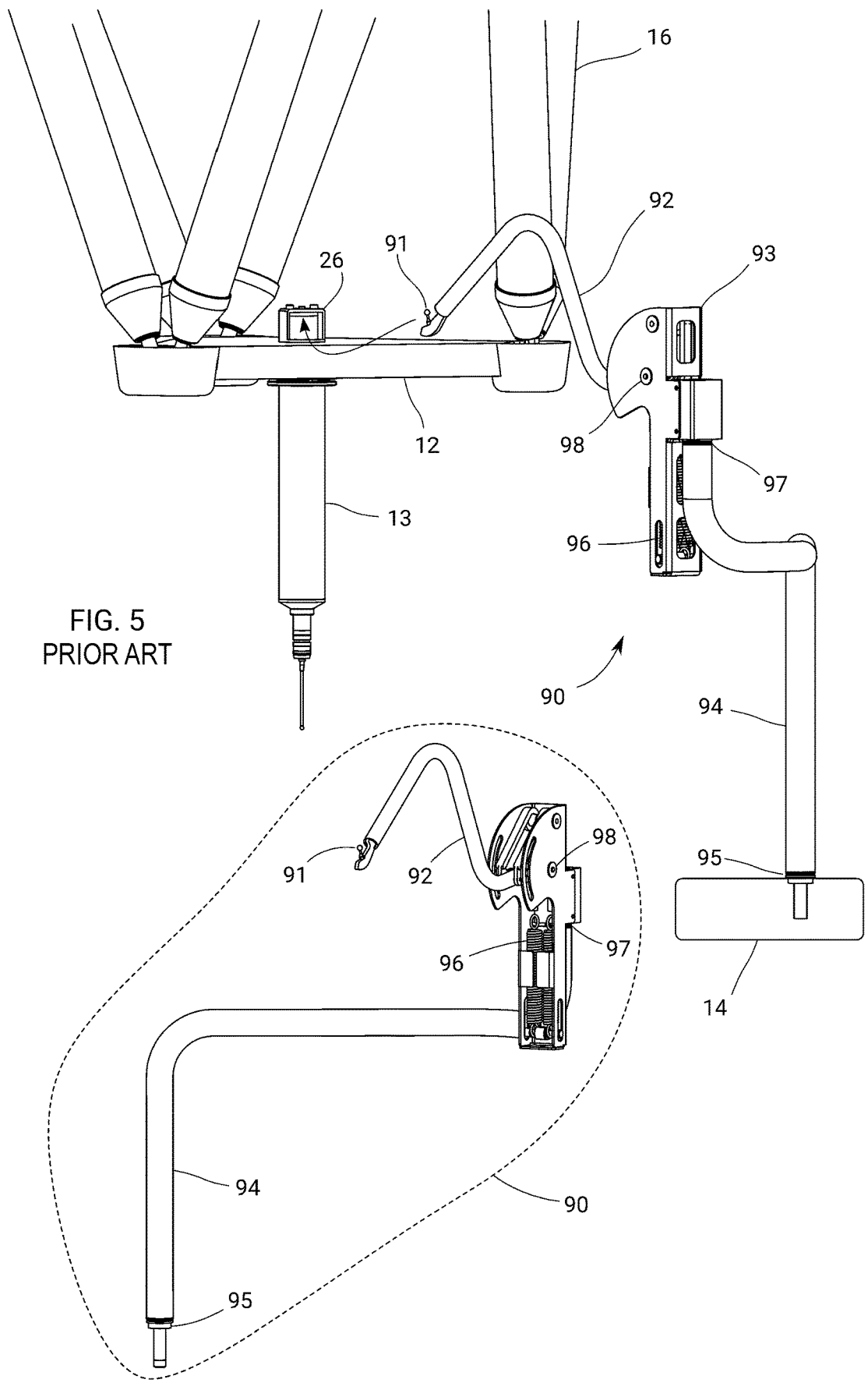
Figure 10:
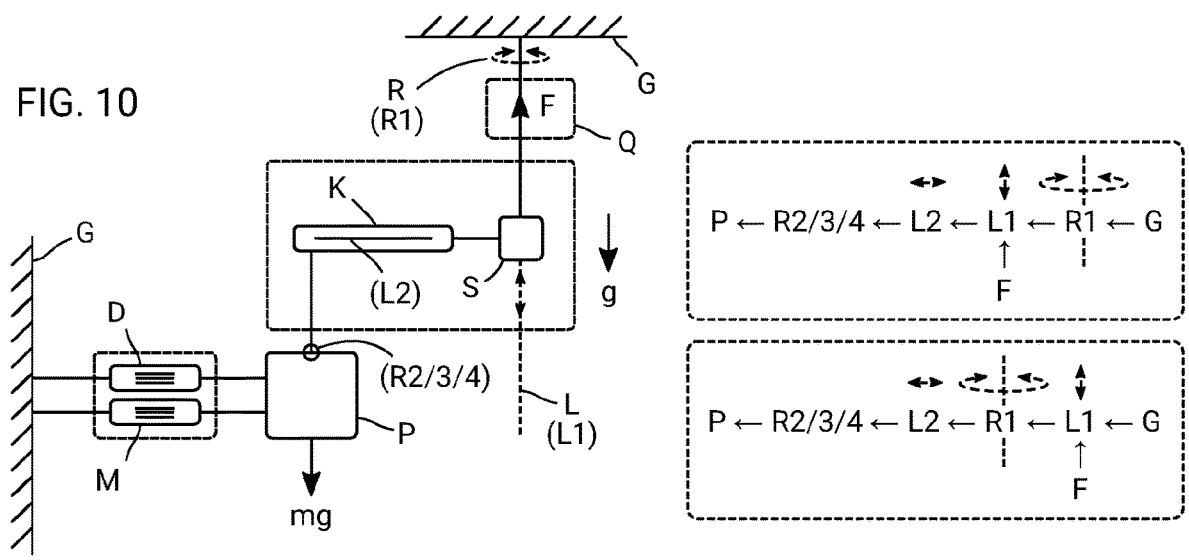
FIG. 10 is a schematic representation of a coordinate positioning machine according to an embodiment of the present invention, being a development of the scheme illustrated in FIG. 9.
Figure 14:
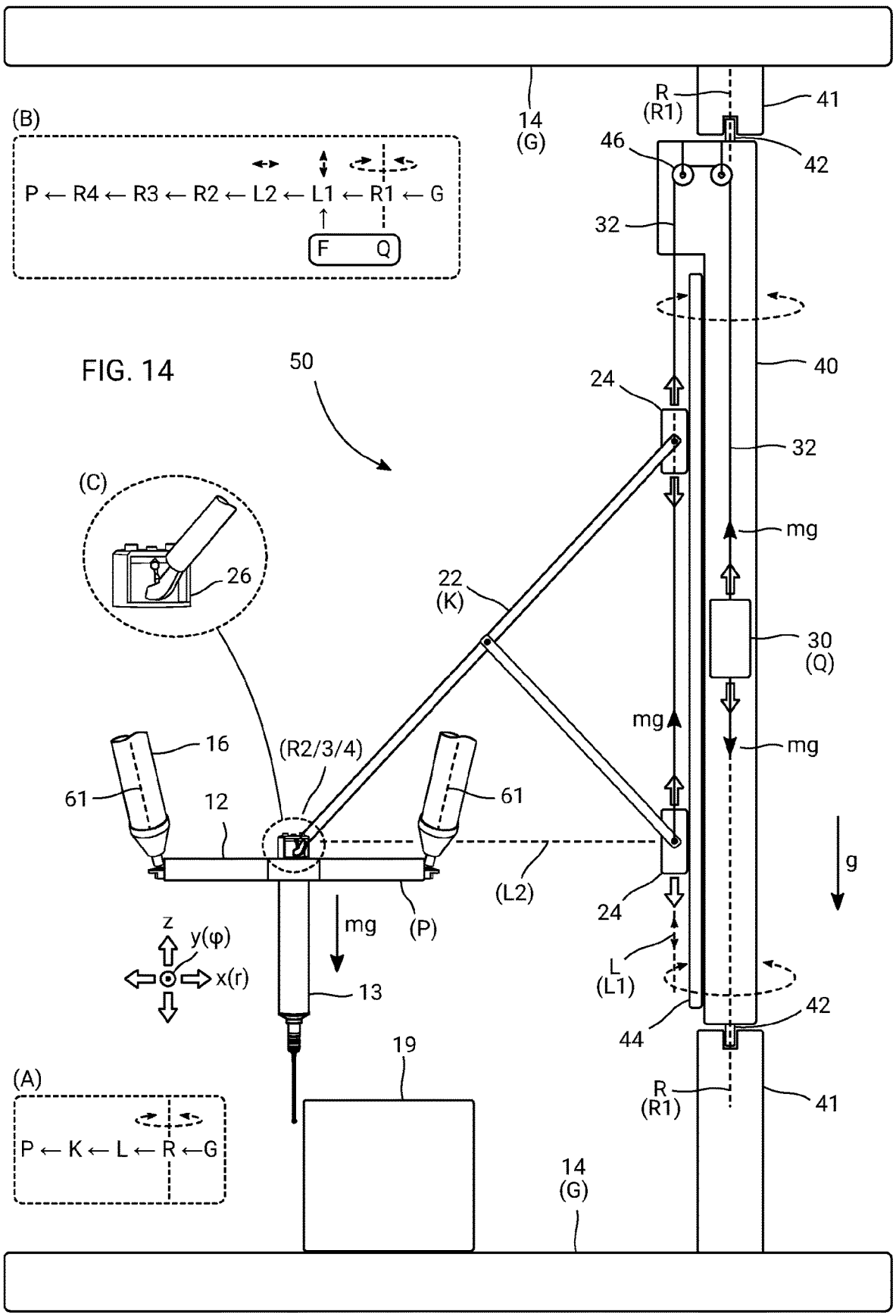
Figure 15:
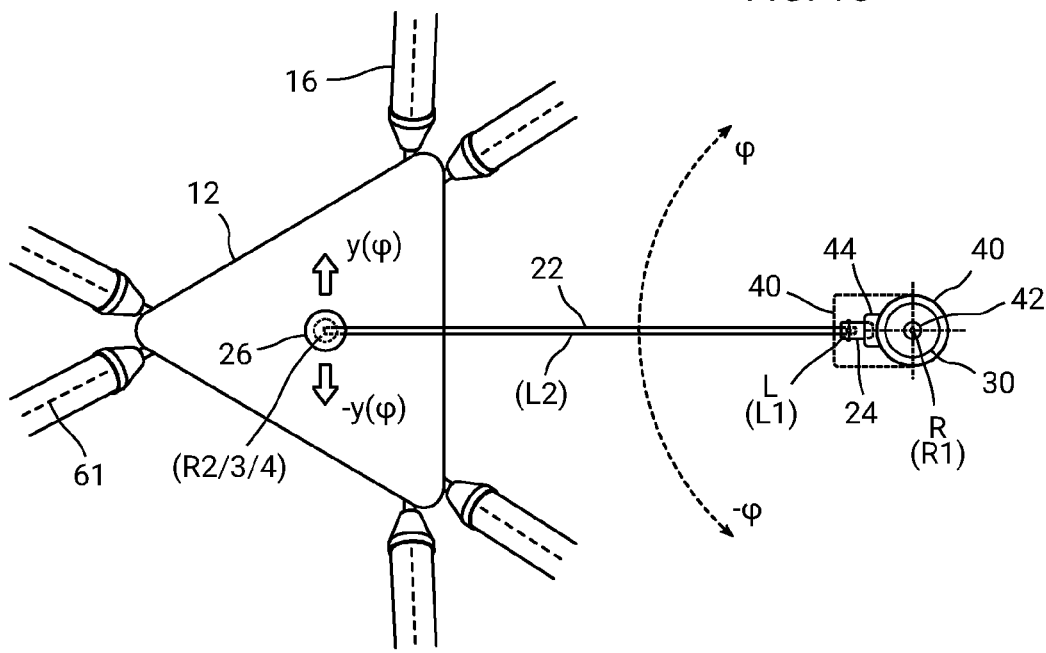
Figure 20:
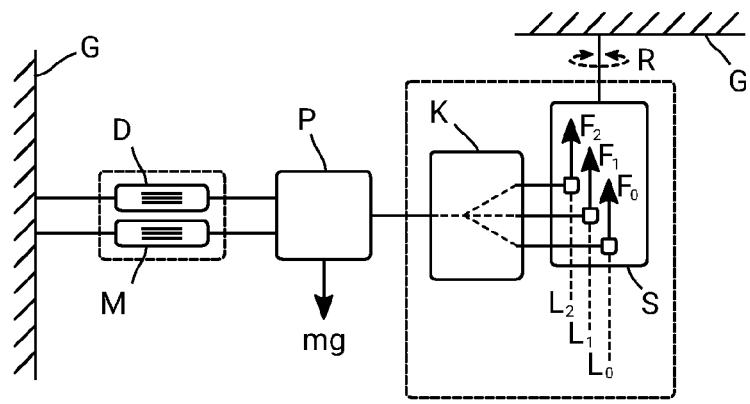
Figure 17:
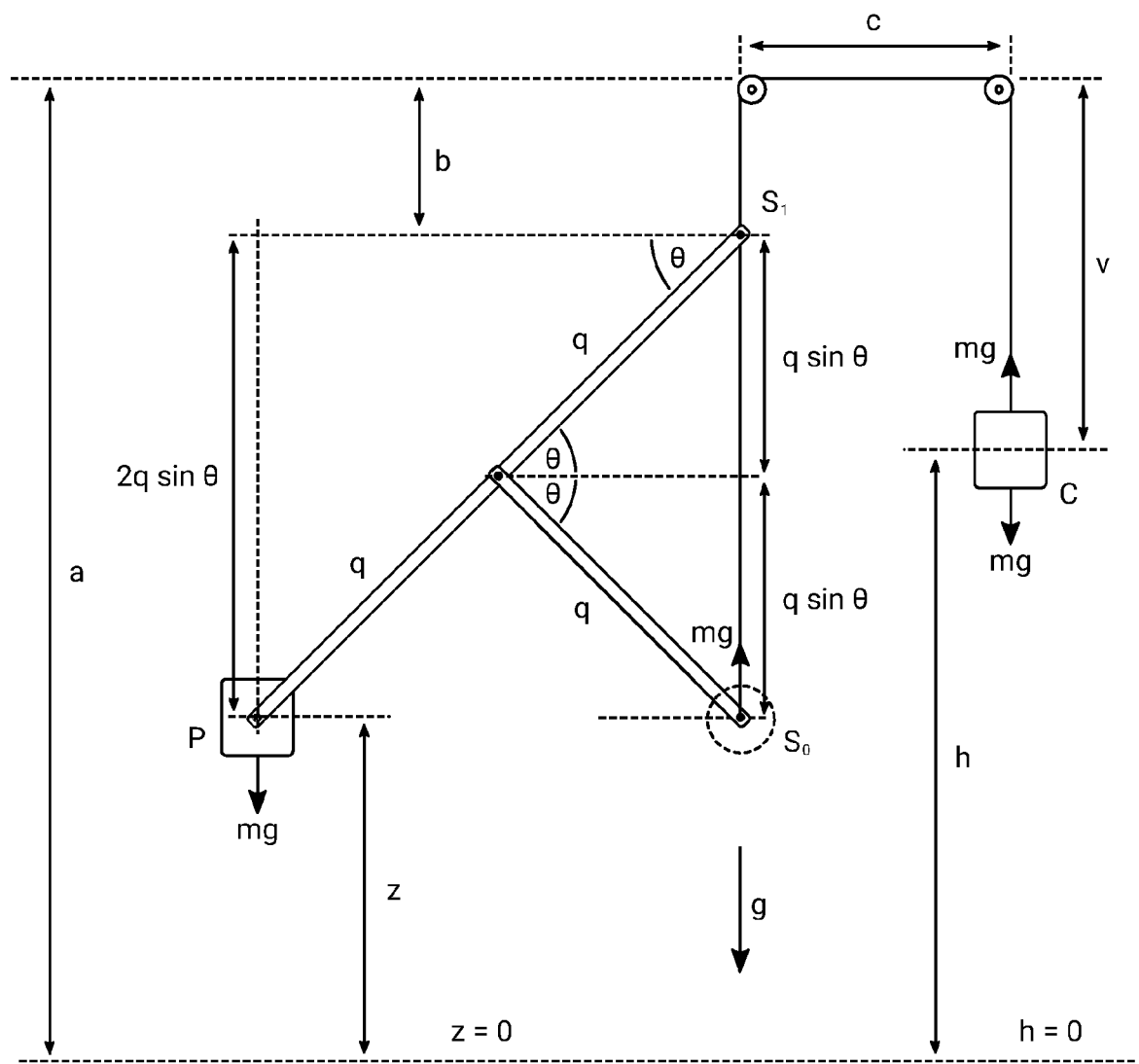
Figure 18:
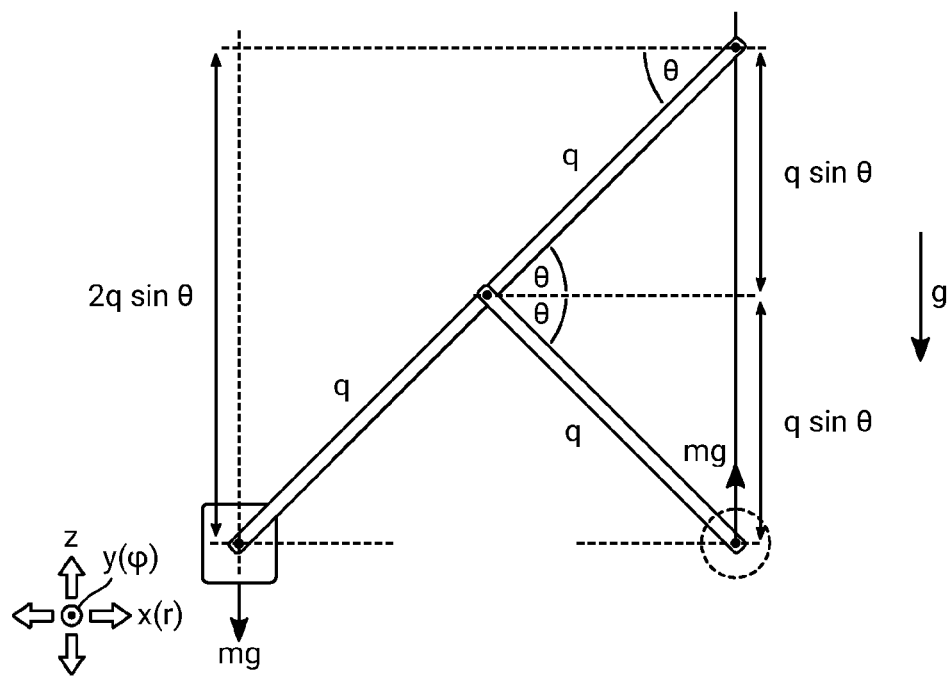
Figure 19:
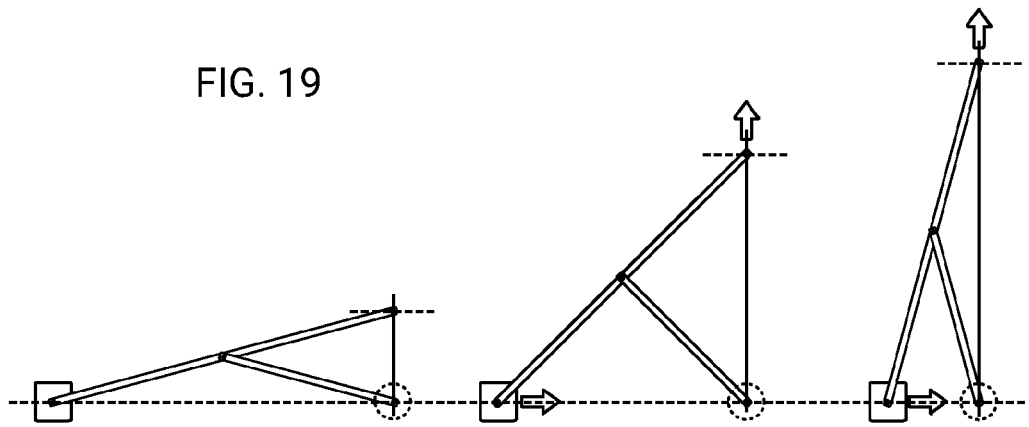
Figure 21:
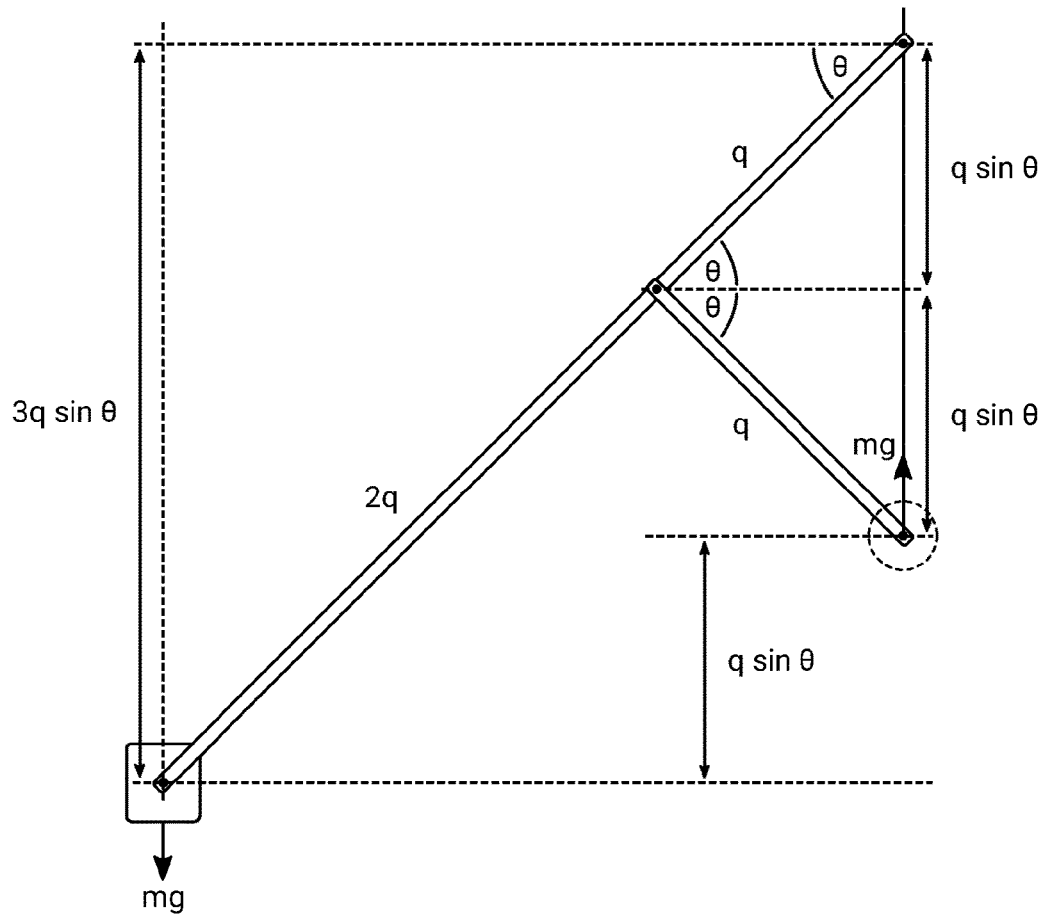
Figure 22:
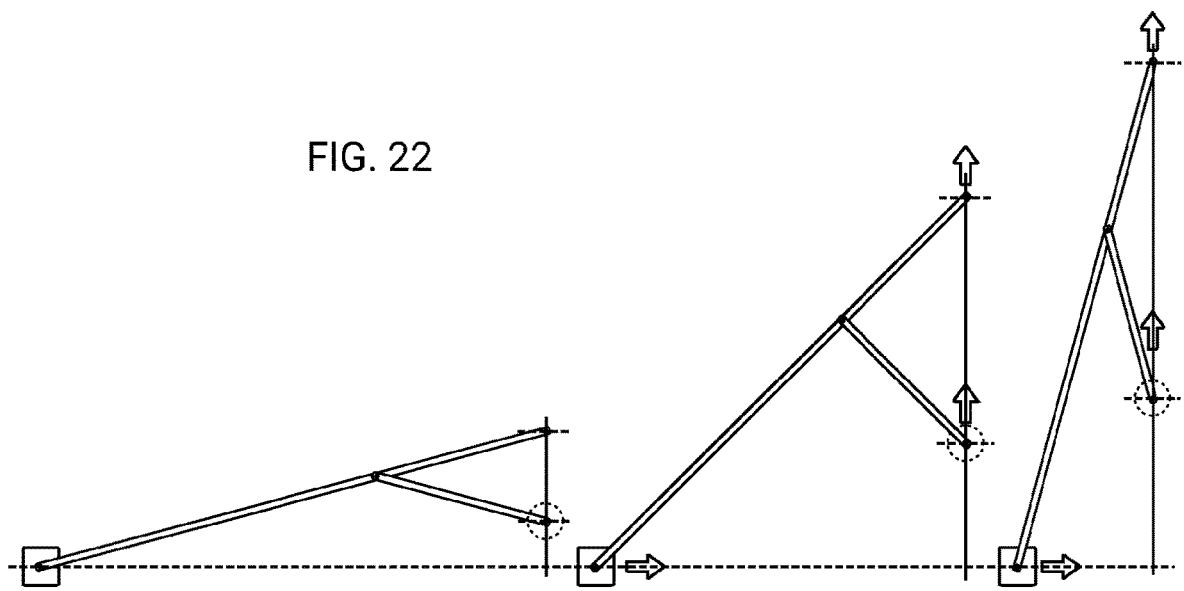
Figure 23:
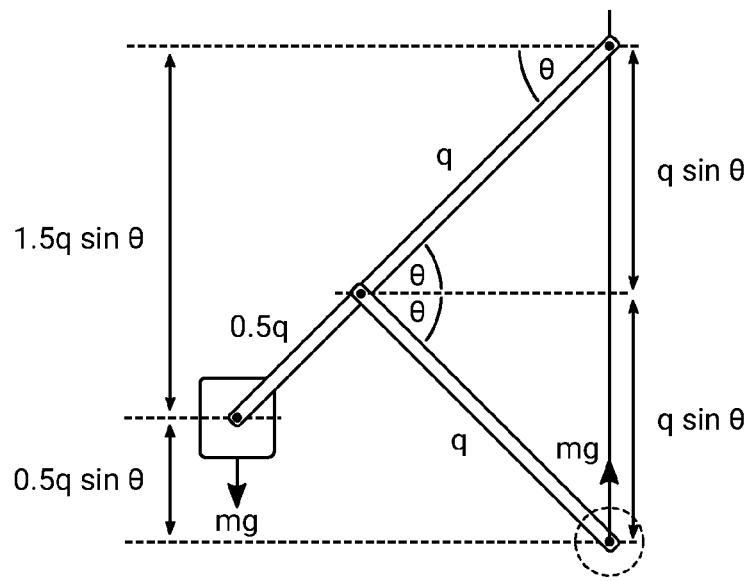
Figure 24:
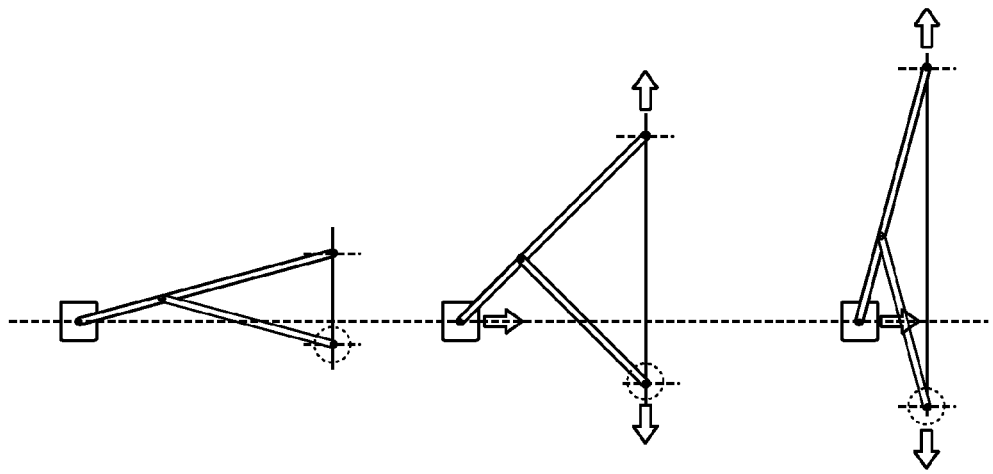
Figure 25:
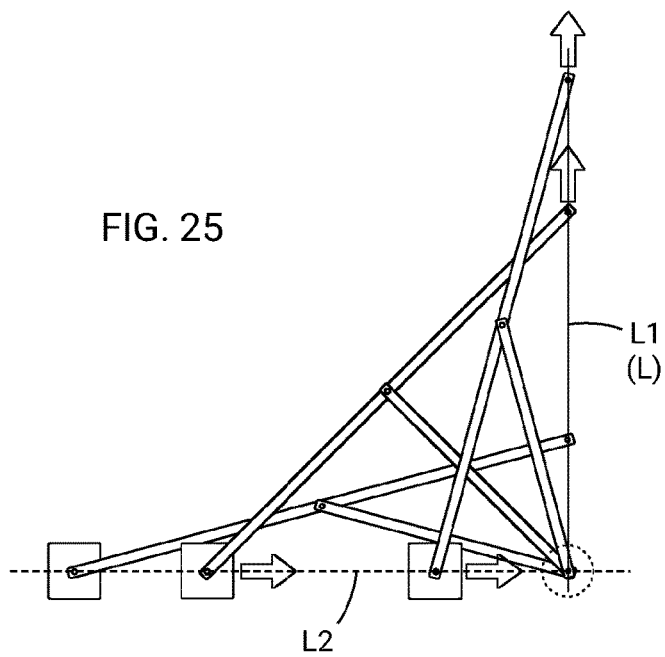
Figure 26:
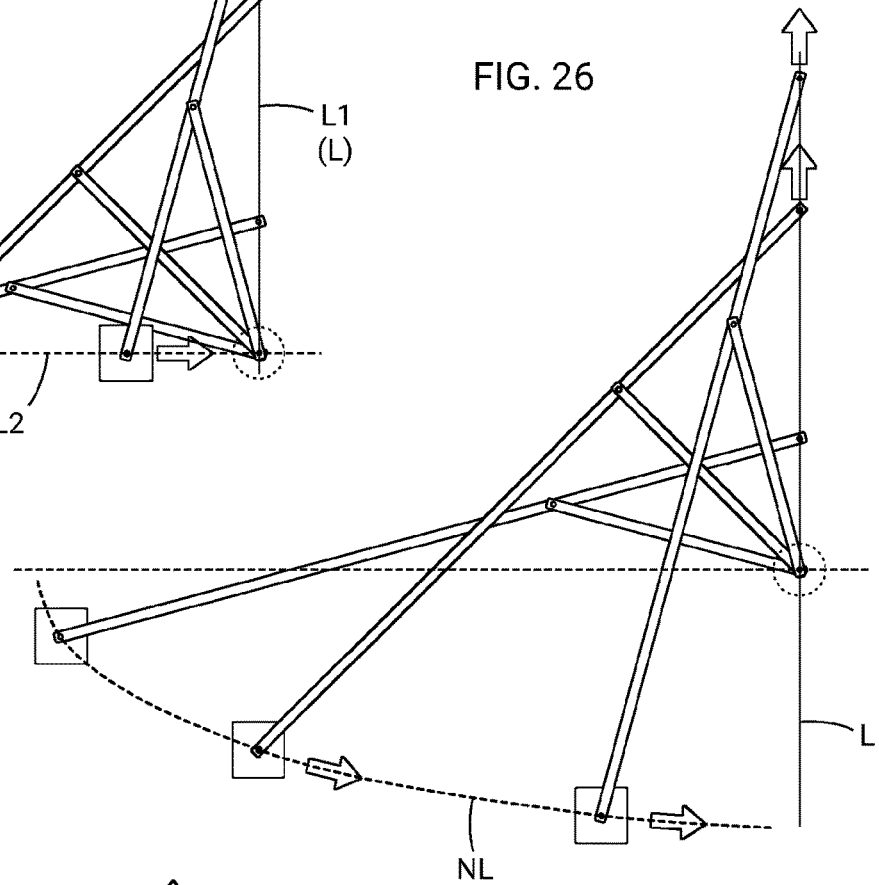
Figure 27:
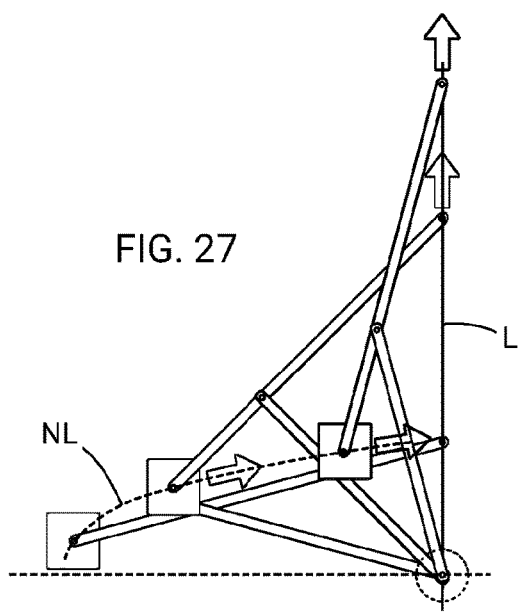
Figure 28:
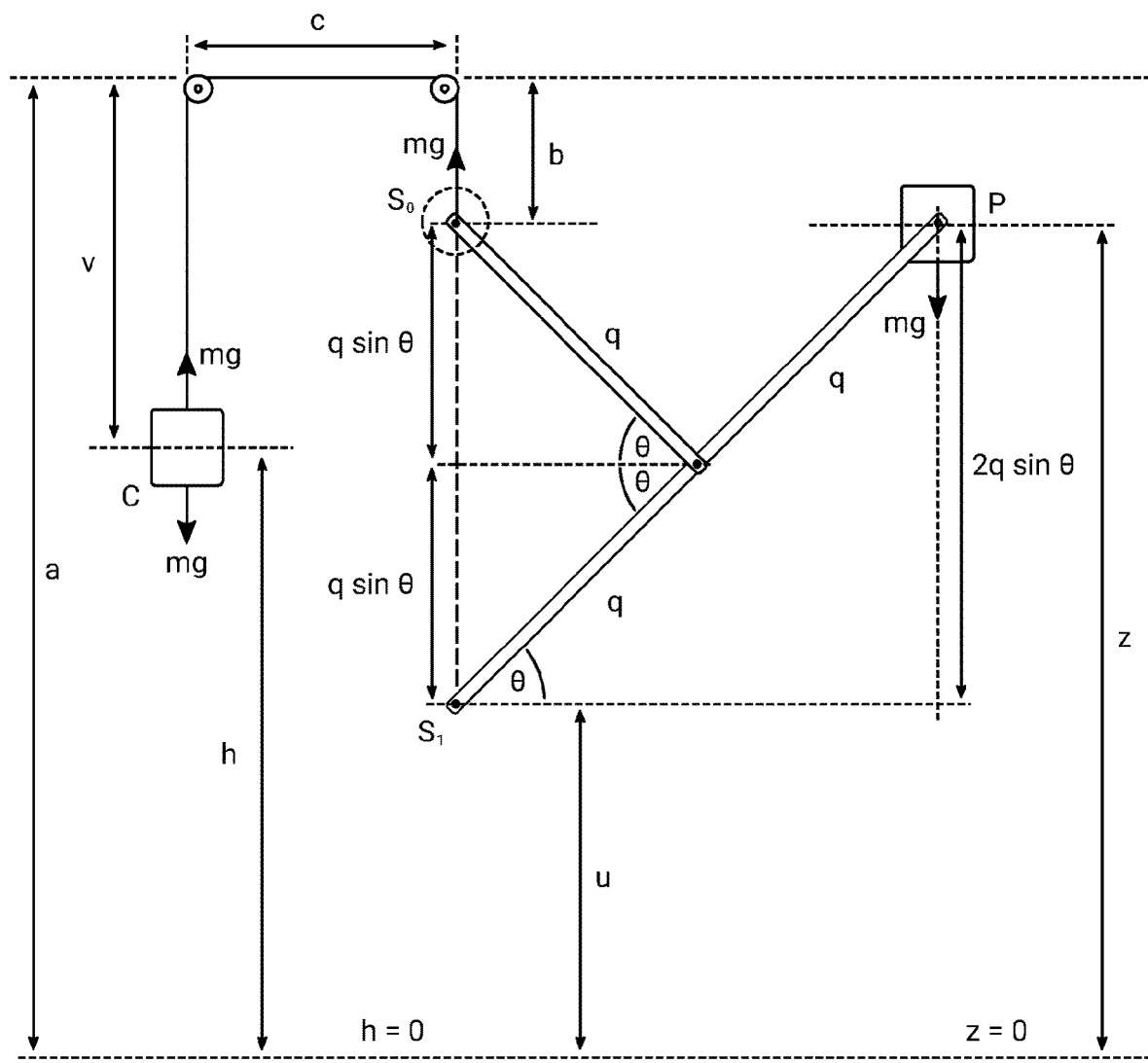
Figure 29:
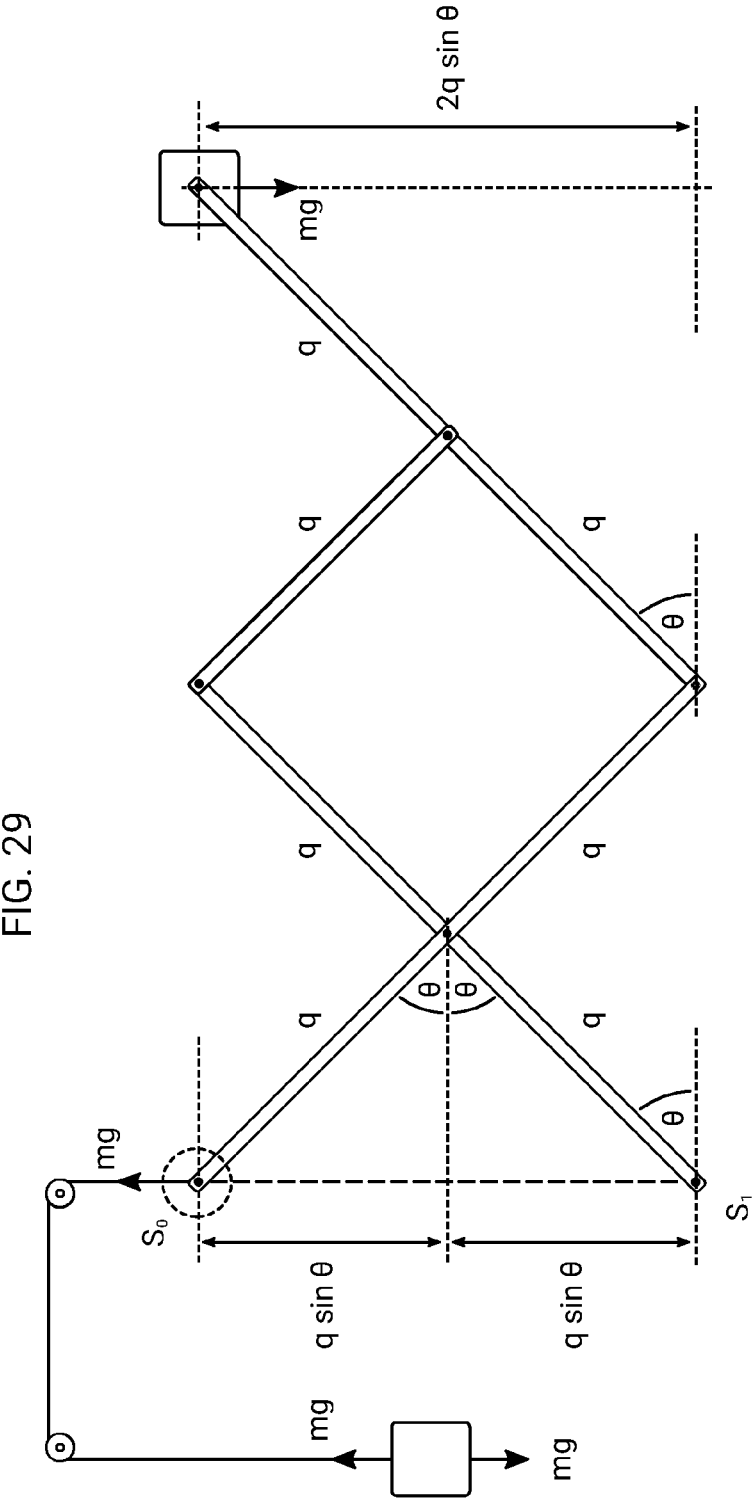
Figure 30:
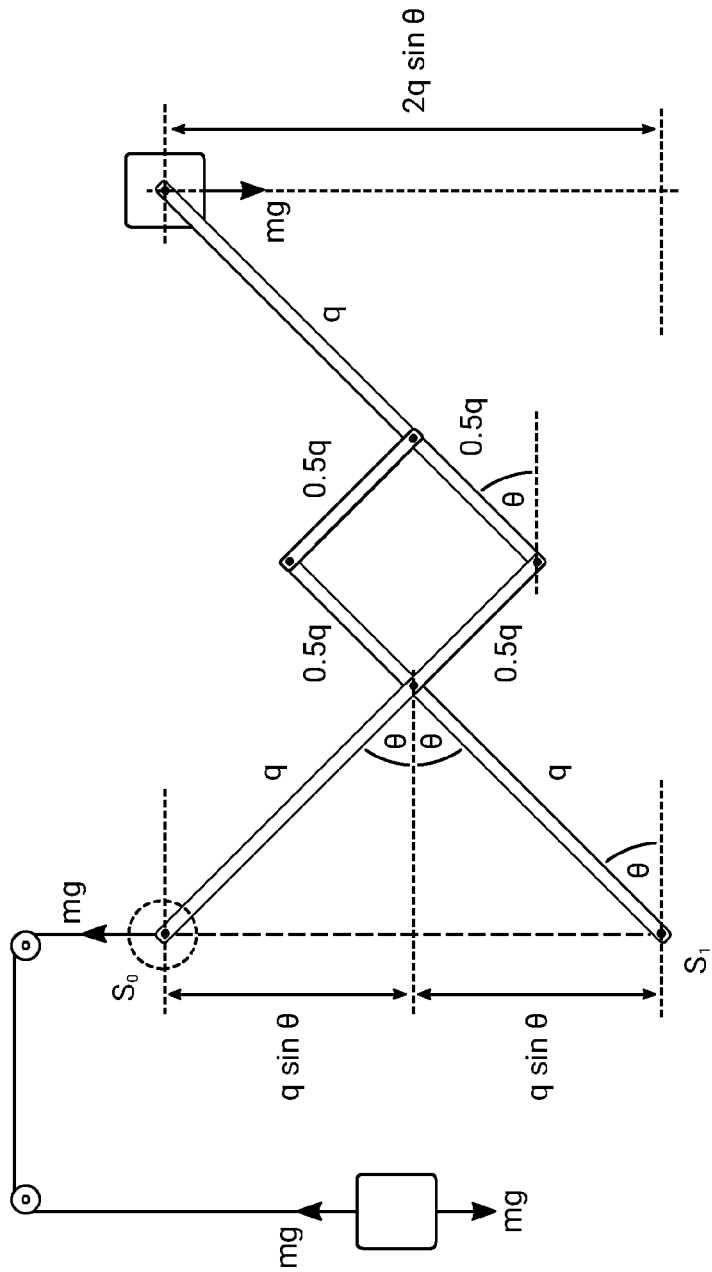
Figure 31:
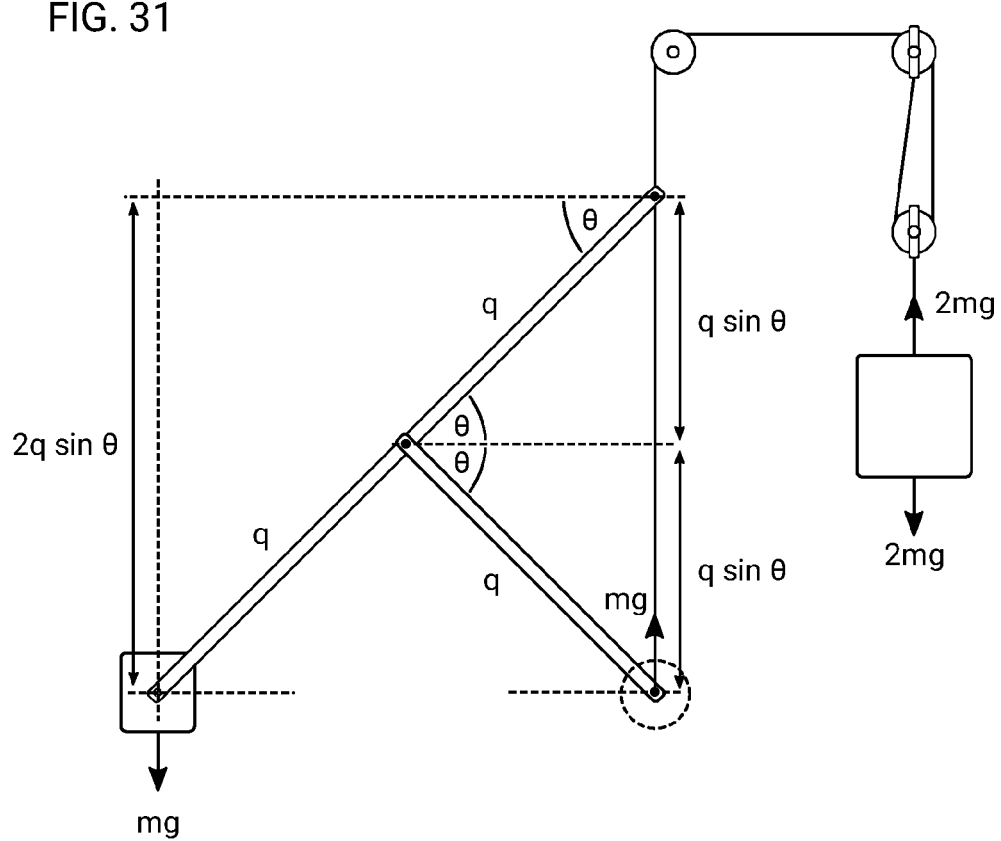
Figure 32:
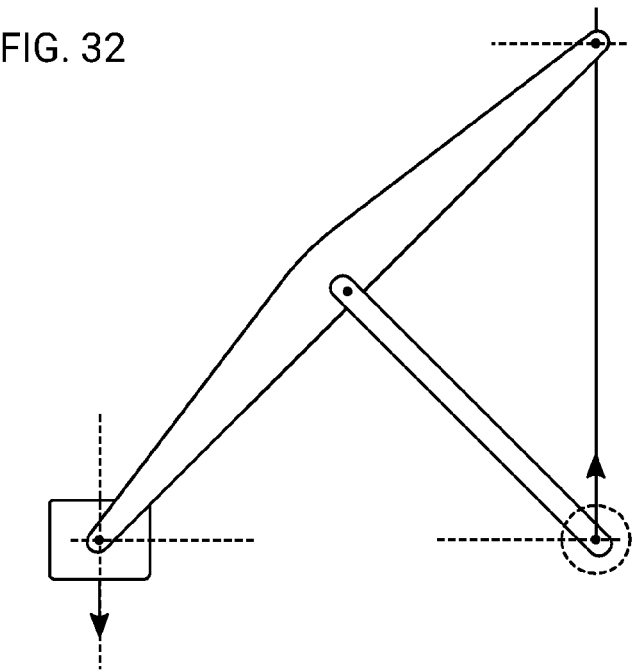
Figure 33:
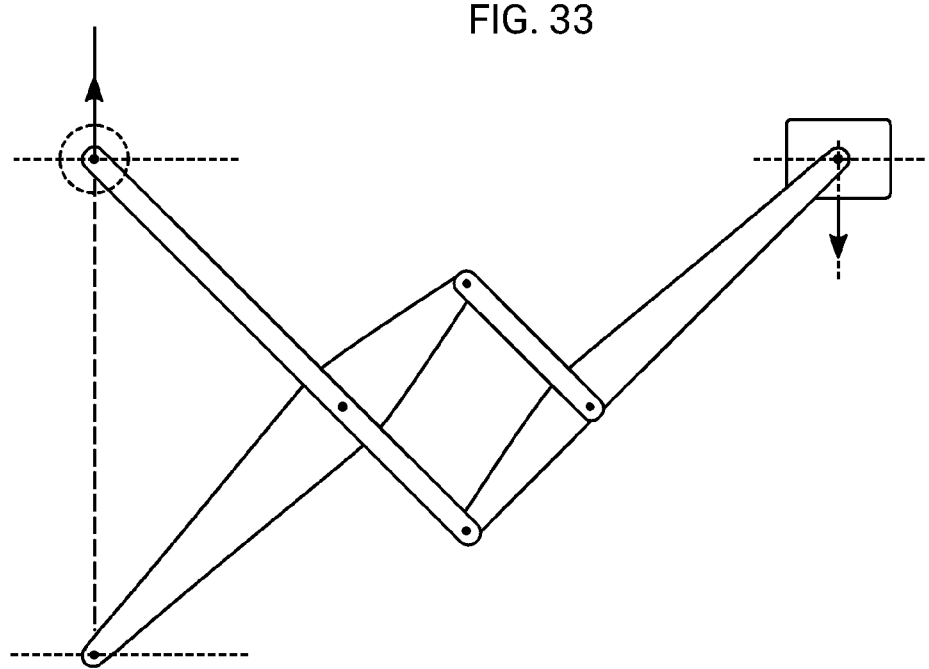
Figure 34:
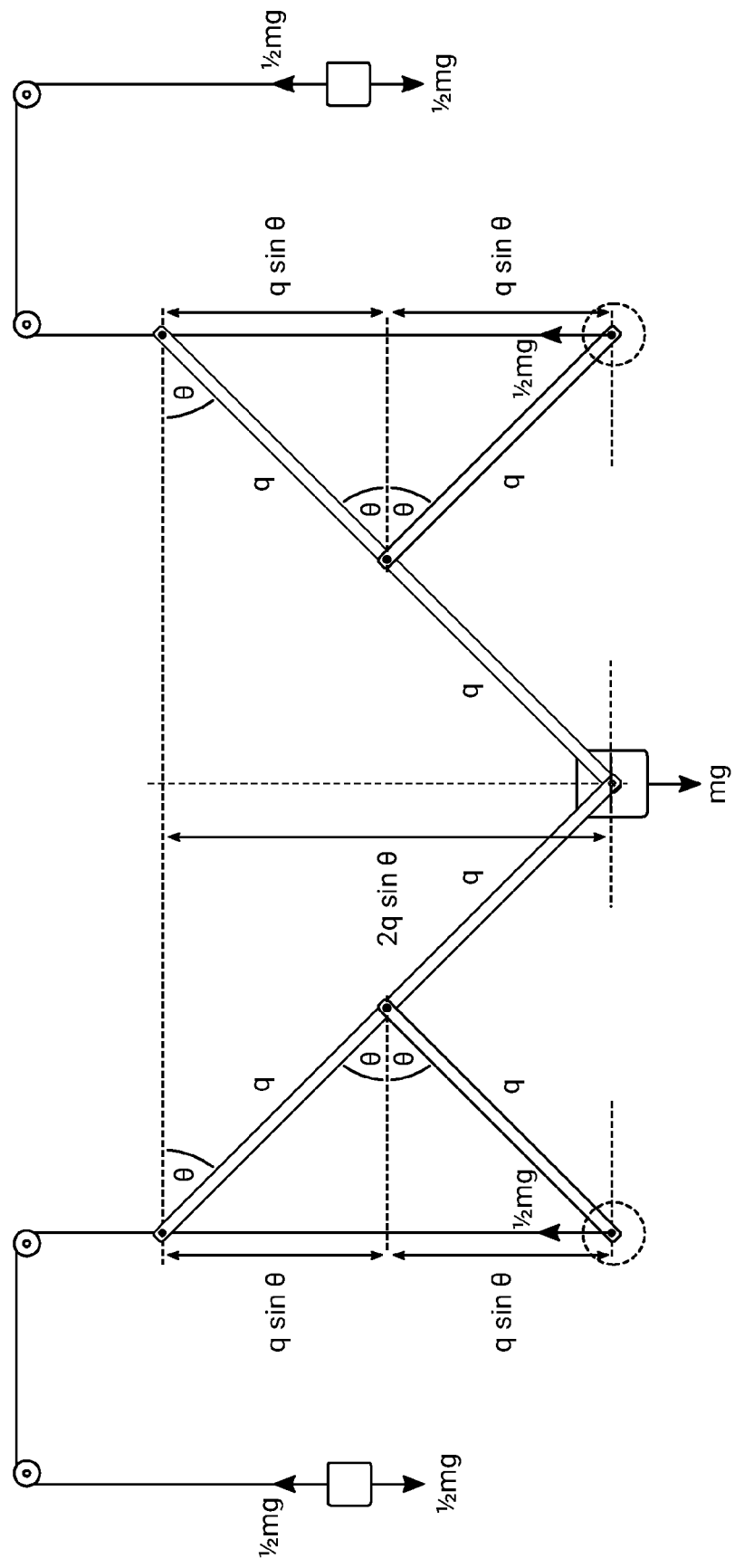
Figure 35:
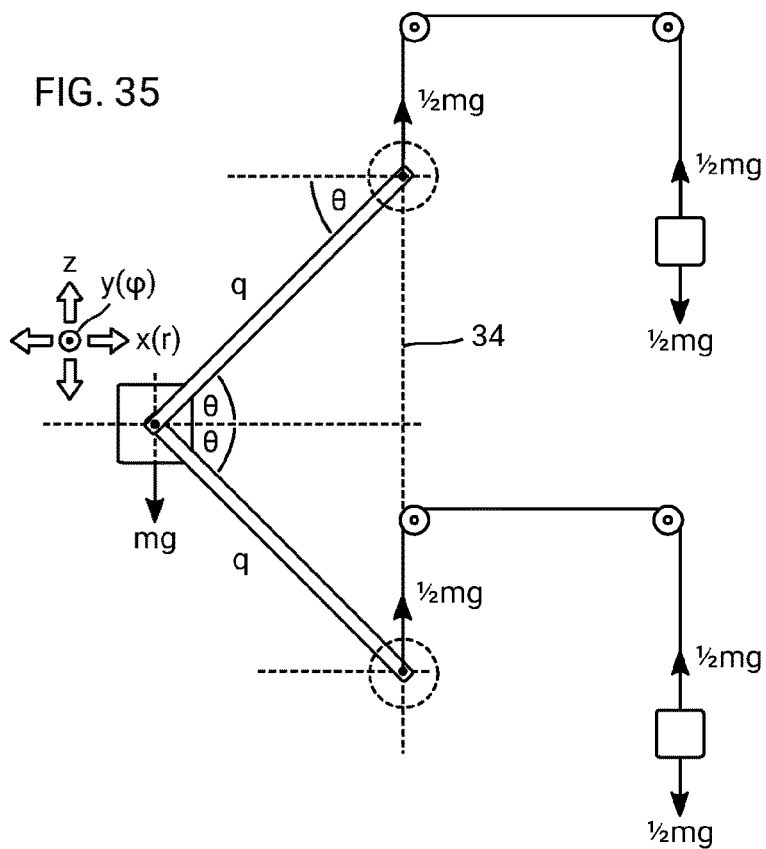
Figure 36:
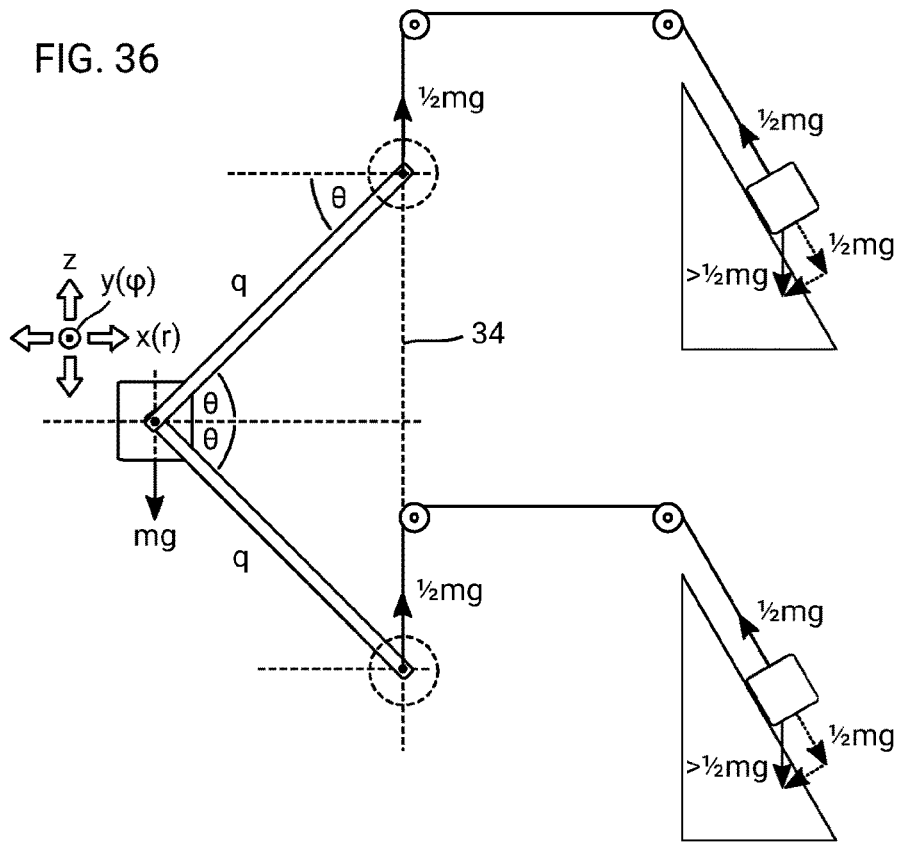
Figure 37:
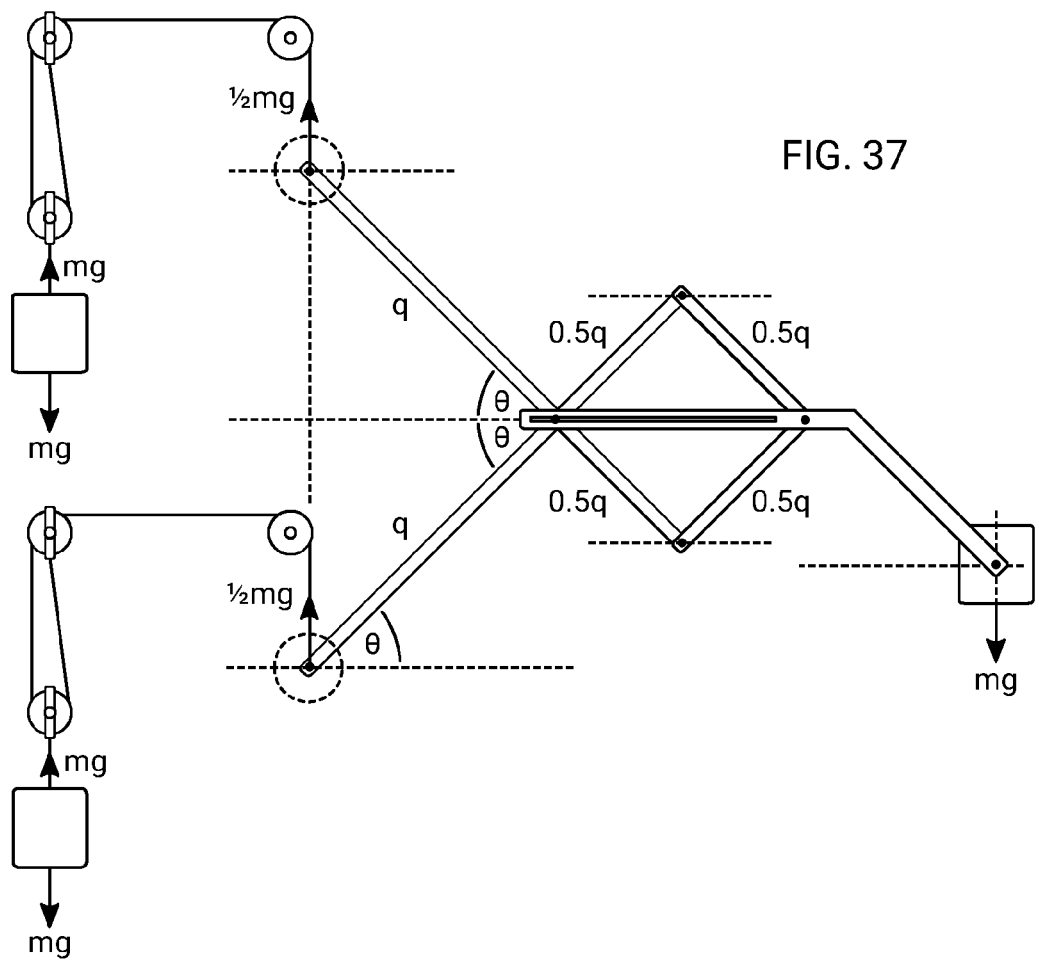
Figure 38:
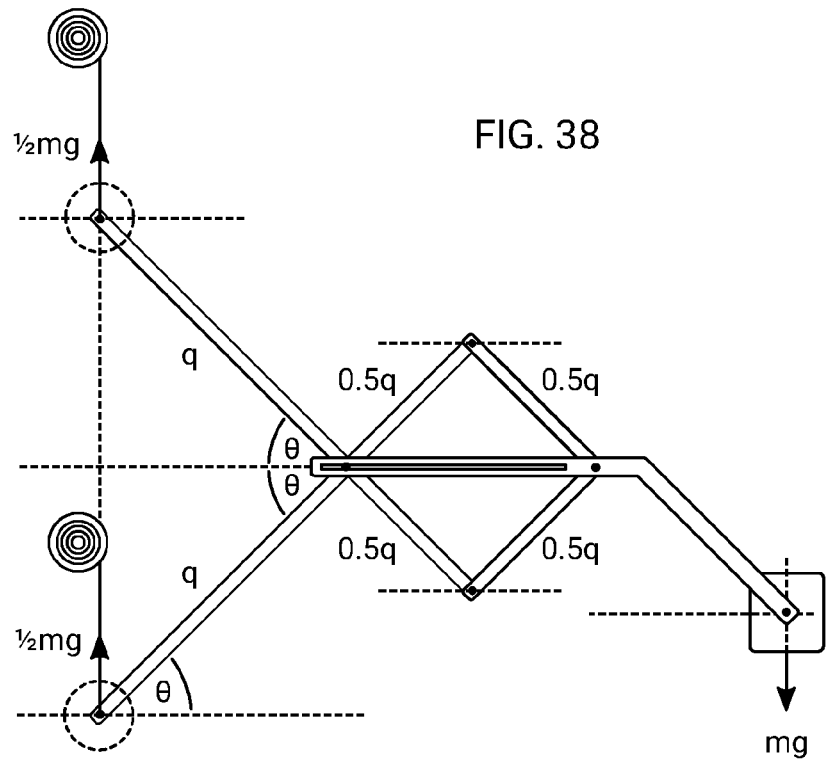
Figure 39:
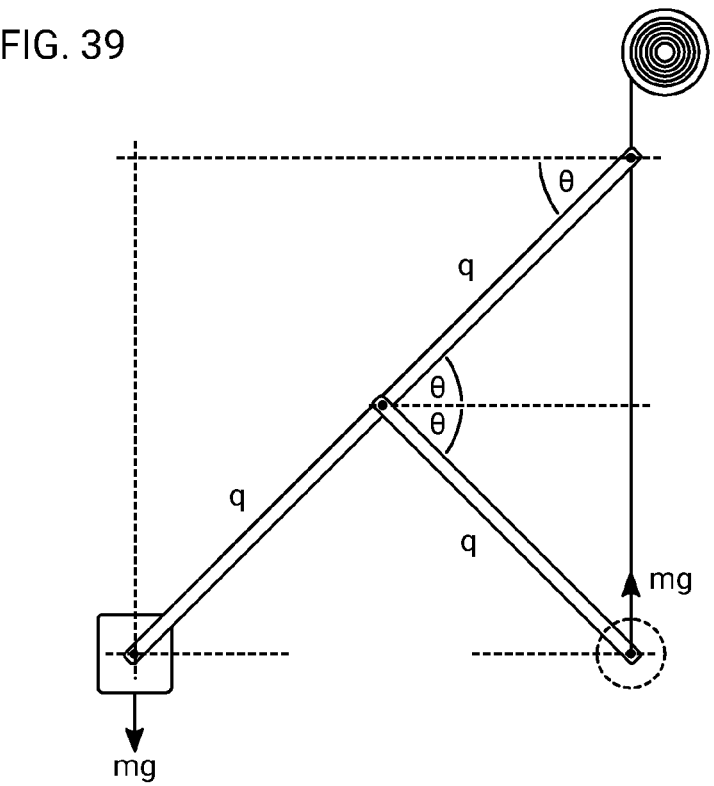
Figure 40:
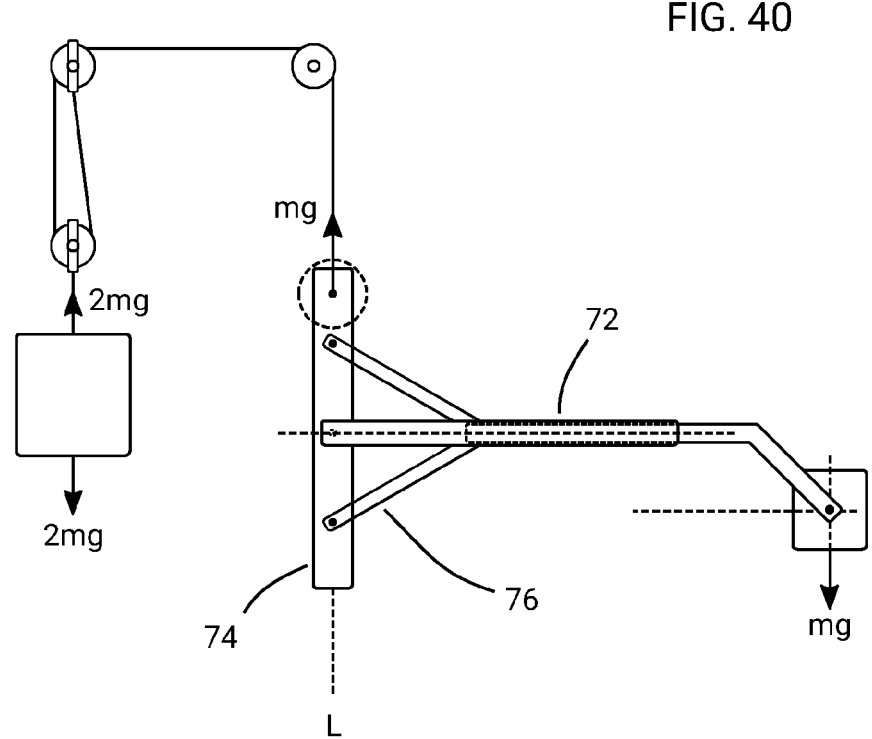
Figure 41:
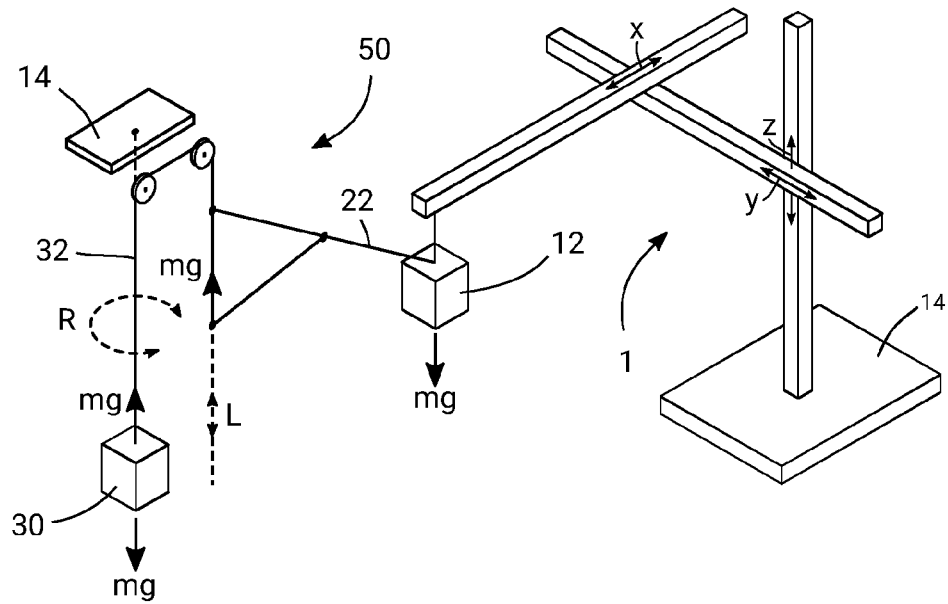
Figure 43:
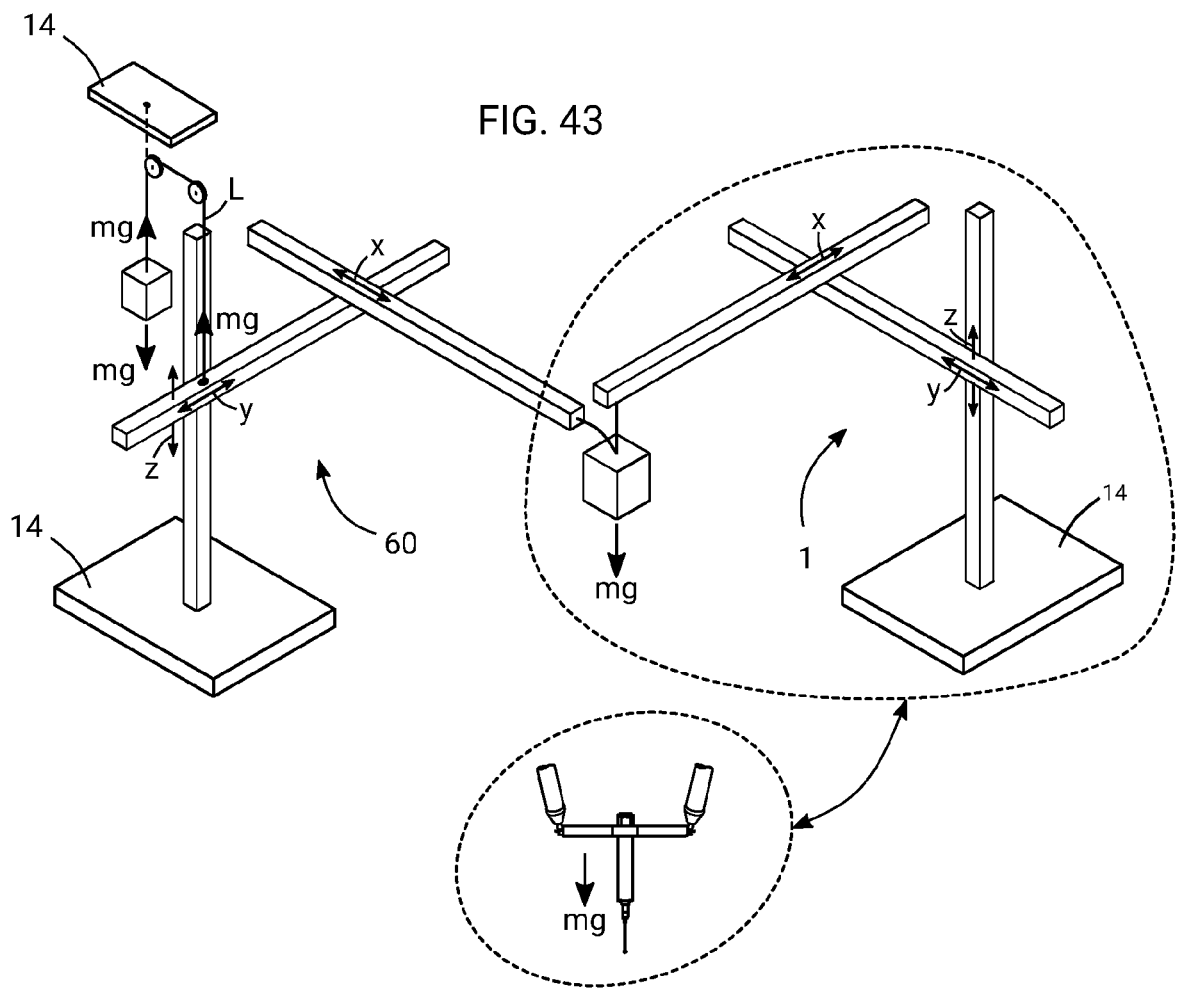
Figure 42:
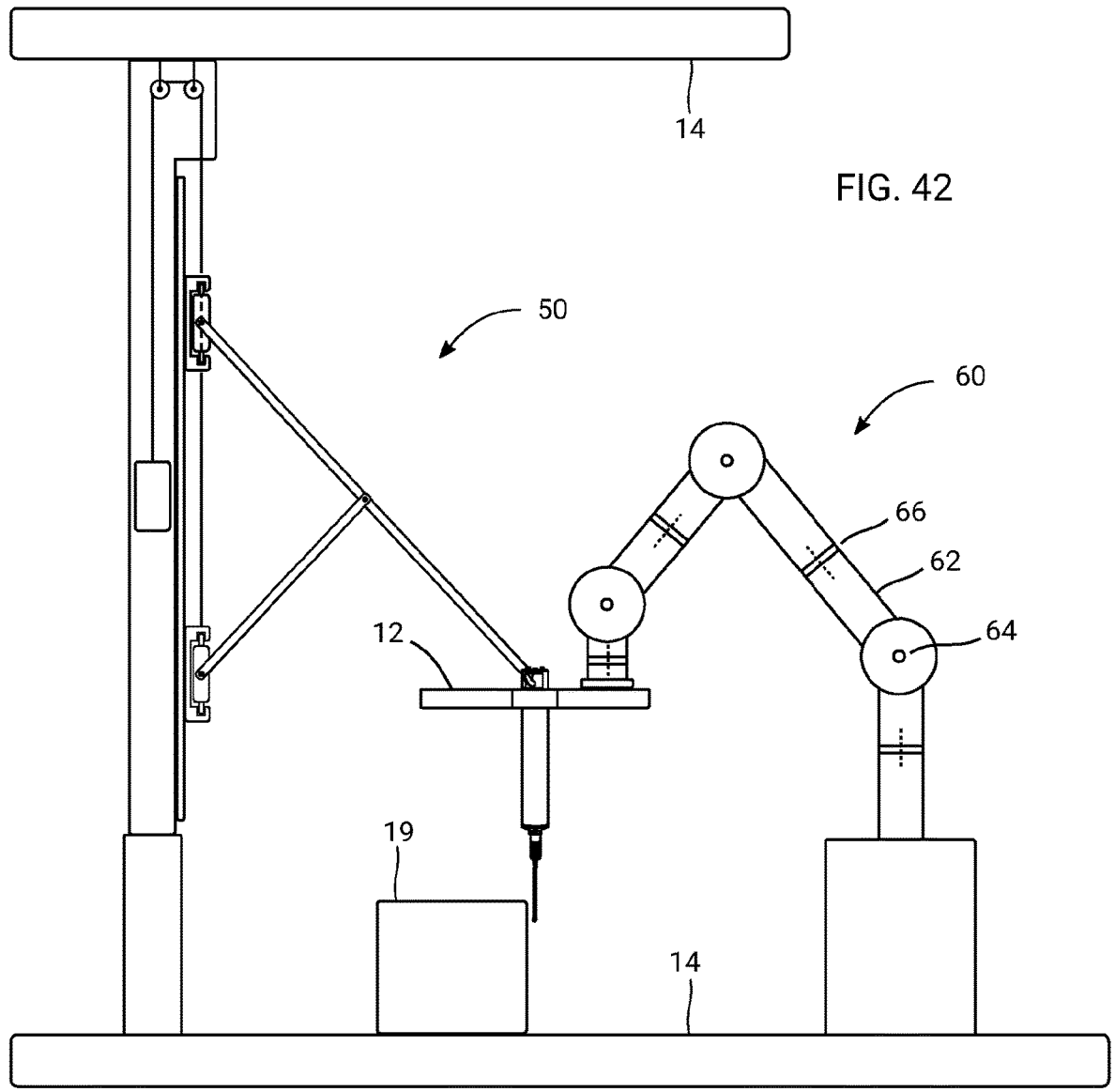
Figure 44:
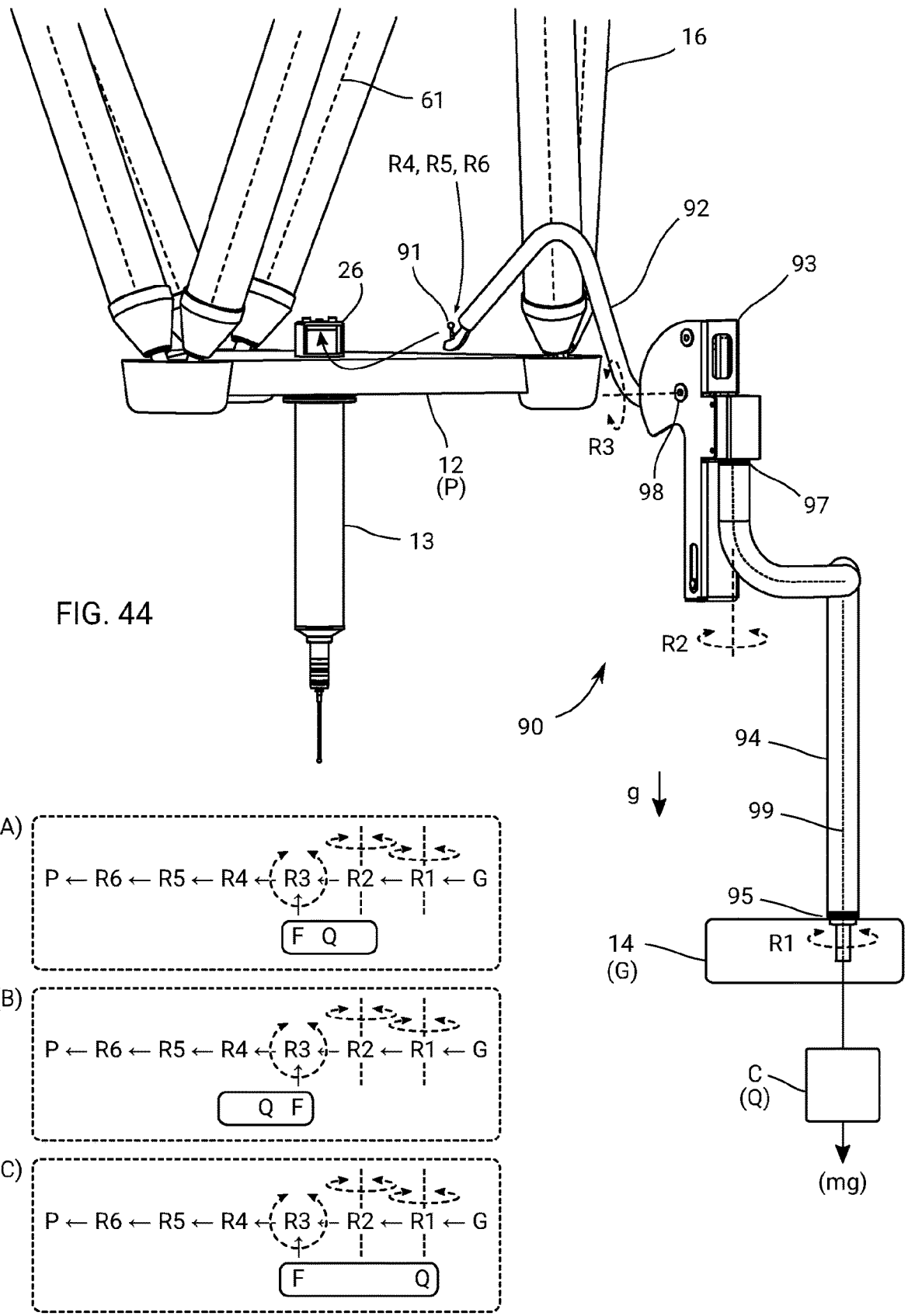

FIG. 14 provides a side view of a non-Cartesian coordinate positioning machine comprising a counterbalance arrangement embodying the present invention;

FIG. 15 provides a partial top view of the non-Cartesian coordinate positioning machine shown in FIG. 14;

FIG. 16 shows a counterbalance arrangement having linear and rotary counterbalance axes arranged in a different manner compared to FIGS. 14 and 15;

FIG. 17 is a more schematic representation of the machine of FIGS. 14, 15 and 16, and forms the basis of an analysis of the inherent stability of the counterbalance arrangement;

FIG. 18 shows mainly the linkage and platform from FIG. 17 for a consideration of the forces acting on these parts;

FIG. 19 illustrates how lateral movement of the platform results in no vertical movement of the lower support and only vertical movement of the upper support;

FIG. 20 is based on the schematic representation shown in FIG. 10, with the support member of FIG. 10 being a set of one or more support members in FIG. 20;

FIGS. 21 and 22 correspond respectively to FIGS. 18 and 19, but show an alternative linkage arrangement that is not suitable for use in an embodiment of the present invention;

FIGS. 23 and 24 correspond respectively to FIGS. 18 and 19, showing another alternative linkage arrangement that is not suitable for use in an embodiment of the present invention;

FIGS. 25 to 27 are similar to FIGS. 19, 22 and 24 respectively, showing how the platform moves when the upper support member is moved vertically with the lower support member fixed in position;

FIG. 28 illustrates an "upside down" alternative to the arrangement of FIG. 17, based on the same principles of operation;

FIG. 29 illustrates a "longer reach" alternative to the arrangement of FIG. 28, based on the same principles of operation;

FIG. 30 illustrates an embodiment that is similar to FIG. 29 but using a slightly different linkage arrangement;

FIG. 31 illustrates a "double pulley" alternative to the arrangement of FIG. 17, based on the same principles of operation;

FIG. 32 provides an illustration of a how the links forming the linkage arrangement of FIG. 18 might be shaped in practice;

FIG. 33 provides an illustration of a how the links forming the linkage arrangement of FIG. might be shaped in practice;

FIG. 34 illustrates how the platform can be supported by two counterbalance arrangements, in this example two of the type shown in FIG. 17, each providing only part of the counterbalance force;

FIG. 35 illustrates an alternative counterbalance arrangement in which a force is applied to both supports and where both supports move vertically but in opposite directions when the platform moves laterally;

FIG. 36 illustrates a variant of the arrangement of FIG. 35;

FIG. 37 illustrates an alternative counterbalance arrangement to that shown in FIG. 35, based on the same principle of operation, and also including a double pulley arrangement associated with each support;

FIG. 38 illustrates how a constant-force spring, such as a fusee spring, can be used in any of the previous embodiments, in this example in respect of the embodiment of FIG. 37;

FIG. 39 illustrates the use of a constant-force spring in the embodiment of FIG. 18;

FIG. 40 illustrates a different form of linkage to that shown in previous embodiments, having a telescopic tube, and also including a double pulley arrangement;

FIG. 41 illustrates that a counterbalance arrangement embodying the principles of operation set out in previous embodiments can also be applied to counterbalance a Cartesian coordinate positioning machine;

FIG. 42 illustrates the counterbalance arrangement of FIG. 16 being used to counterbalance a serial kinematic non-Cartesian robot arm;

FIG. 43 illustrates a Cartesian counterbalance arrangement embodying the present invention which is used to counterbalance a Cartesian or non-Cartesian coordinate positioning machine; and FIG. 44 illustrates an embodiment based on FIG. 5 but modified such that the origin of the counterbalance force is brought back in line with the first rotary counterbalance axis.

Figure 6:
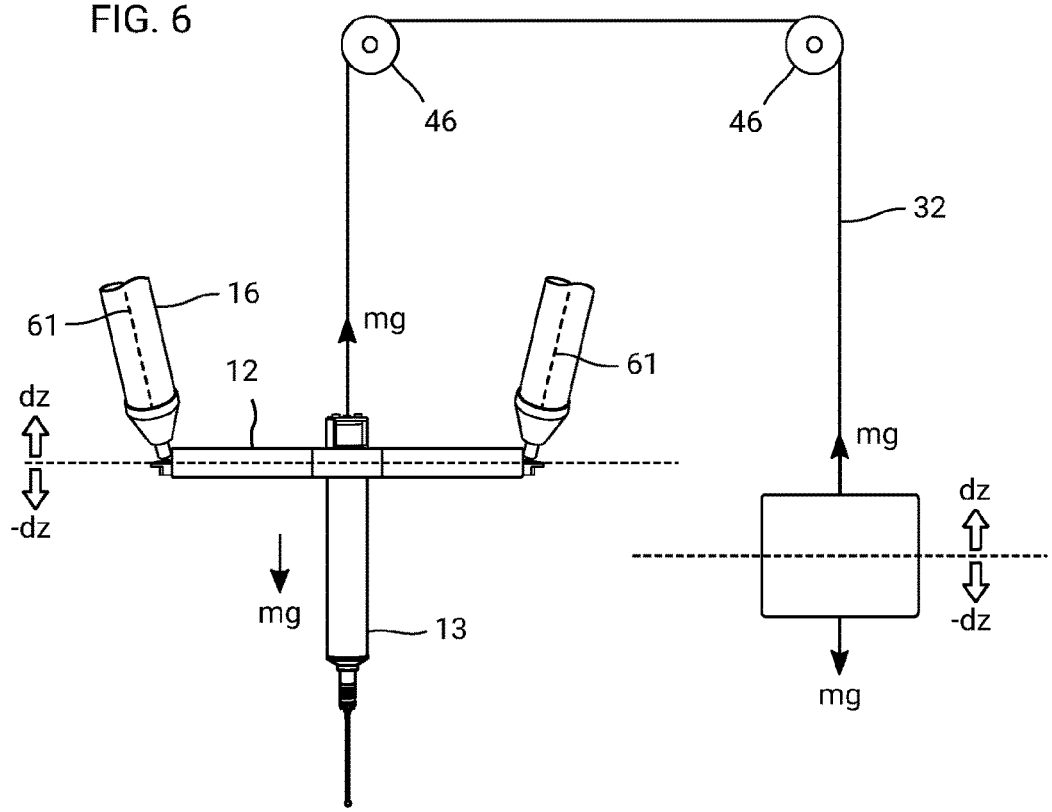

FIG. 6 is a schematic illustration of a simple type of counterbalance arrangement for a non-Cartesian coordinate positioning machine such as that described above with reference to FIGS. 2 to 5. A counterbalance arrangement embodying the present invention can be considered to draw inspiration from that shown in FIG. 6, even though the counterbalance arrangement of FIG. 6 does not itself constitute an embodiment of the present invention. The example of FIG. 6 is limited to movements of the platform 12 in two dimensions (x and z) within the plane of the page, i.e. the illustrated counterbalance arrangement is not capable of dealing with a platform 12 which moves throughout a three-dimensional working volume. Indeed, as will be discussed in more detail below, the counterbalance arrangement of FIG. 6 is not even appropriate for counterbalancing movements of the platform 12 in the x direction; it is more the response of the counterbalance arrangement to movements of the platform 12 in the z direction that is of interest.

Unlike the known counterbalance described above with reference to FIG. 5, which suffers from non-ideal counterbalance performance for different z positions of the moveable platform 12, the present applicant has appreciated the desirability of a simple counterbalance arrangement such as that shown in FIG. 6 because it provides a constant counterbalance response regardless of the z position of the moveable platform 12. In this respect, a counterweight 30 is provided having a mass m that exactly matches (or matches as closely as is practically possible) that of the moveable structure (i.e. the moveable platform 12 and measurement probe 13) that is being moved by the drive arrangement. The drive arrangement comprises a plurality of extendible legs 16, each of which has an associated linear drive axis 61.

Since the working volume in which the platform 12 is operating must be substantially clear of obstruction, the counterweight 30 is conveniently positioned off to the side of the working volume, with the platform 12 connected to the counterweight 30 via a string 32 that extends over two pulleys 46 having a lateral separation sufficient to provide a suitable lateral separation between the platform 12 and the counterweight 30.

To achieve a given acceleration a, the force F applied to an object must be equal to its mass m multiplied by the acceleration a. Therefore, when an object falls under the action of gravity, the force F acting on the object is equal to its mass m multiplied by the acceleration due to gravity g, such that F=mg, where g is the gravitational constant.

Therefore, assuming that there is no support from the extendible legs 16, a gravitational force mg will act downwardly on both the platform 12 and the counterweight 30, and a corresponding tension will develop in the string 32 that will provide an upward force also of mg, so that the system is perfectly balanced in the z direction.

Furthermore, exactly the same balancing forces will apply regardless of the z position of the platform 12, i.e. the system is unaffected by changes dz illustrated in FIG. 6, unlike for a known counterbalance arrangement such as depicted in FIG. 5. The mass of the counterweight 30 can also be conveniently adjusted, by addition or removal of mass (e.g. in the manner of the balancing weights used with an old-fashioned weighing scale), as the mass of the moveable structure changes (e.g. if a tool of a different mass is attached to the platform 12).

Figure 7:
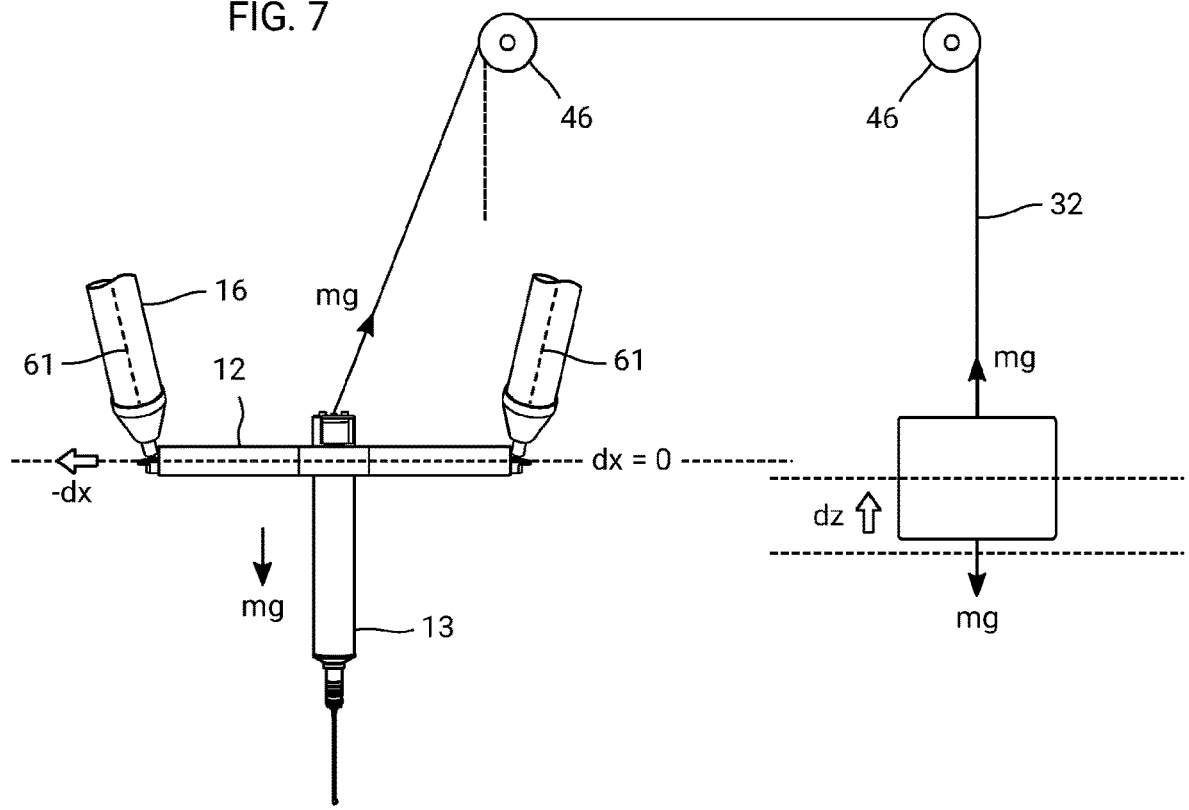

However, as illustrated in FIG. 7, the counterbalance arrangement is certainly not stable to movements towards and away from the counterweight in the x direction. When there is a change dx in the x position of the platform 12, because the string 32 is of constant length the counterweight 30 will have to rise, and work is involved in doing so. The concept of work, as applied to a counterweight system, is explored in more detail below when considering the operation of an embodiment of the present invention.

Accordingly, following such a movement of −dx as illustrated in FIG. 7, when the platform 12 is released the counterweight 30 will naturally have a tendency to fall back to its previous (lower-energy) state as shown in FIG. 6, and the platform will swing inwards (in the x direction) back to the middle (directly under the left-hand pulley 46).

Therefore, despite some useful properties, the counterweight arrangement shown in FIGS. 6 and 7 is not particularly suitable for use in stabilising the moveable structure of a coordinate positioning machine, because ideally the moveable structure in such a machine will be stable in x, y and z in the absence of drive from the drive arrangement, and not just stable along a single axis in the z direction.

Figure 8:
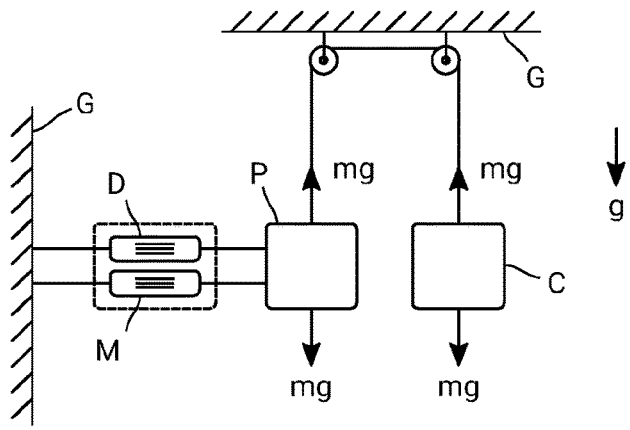

FIG. 8 provides a more schematic representation of the counterbalance arrangement of FIGS. 6 and 7, showing a moveable platform P and counterweight C connected via a pulley arrangement that is itself supported by (connected to) the fixed structure of the machine, referred to conveniently as being connected to "ground" G. The moveable platform P is separately connected to ground G via a drive arrangement D and metrology arrangement M. The drive arrangement D is responsible for moving or driving the platform P around the working volume, and the metrology arrangement is responsible for measuring the position of the platform P in the working volume. A plurality of drive axes of the drive arrangement D is schematically represented as a plurality of lines (corresponding e.g. to the six drive struts or extendible legs 16 of the machine of FIG. 2 or the x, y, z drive axes of the machine of FIG. 1), and similarly for the metrology axes of the metrology arrangement M; these axes may be parallel or serial kinematic axes, Cartesian or non-Cartesian.

Figure 2:
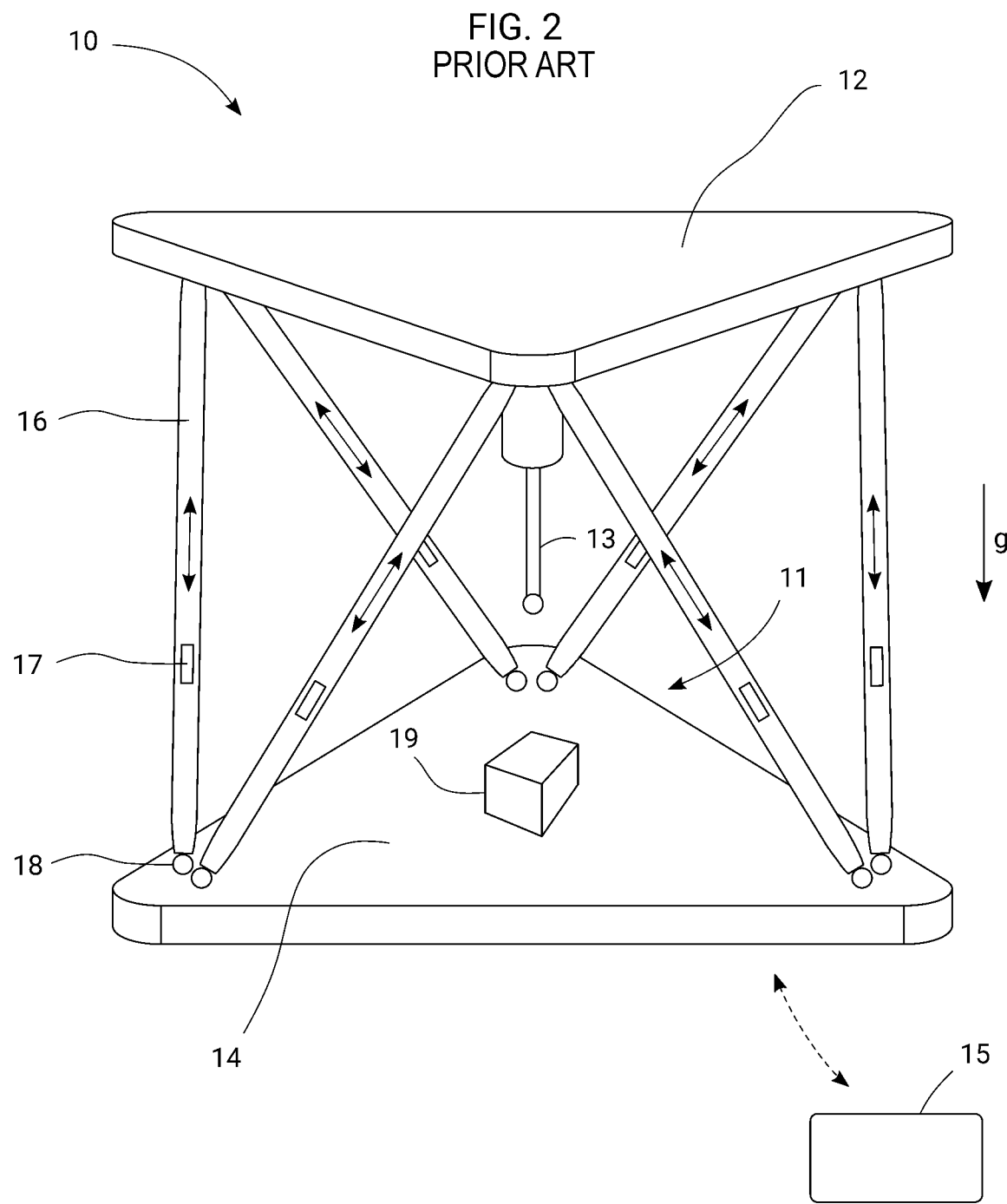
Figure 3:
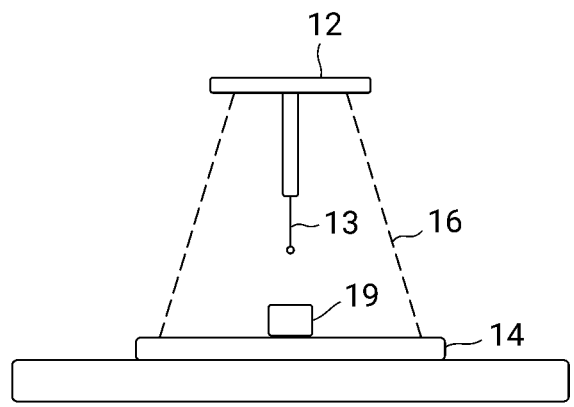
Figure 4:
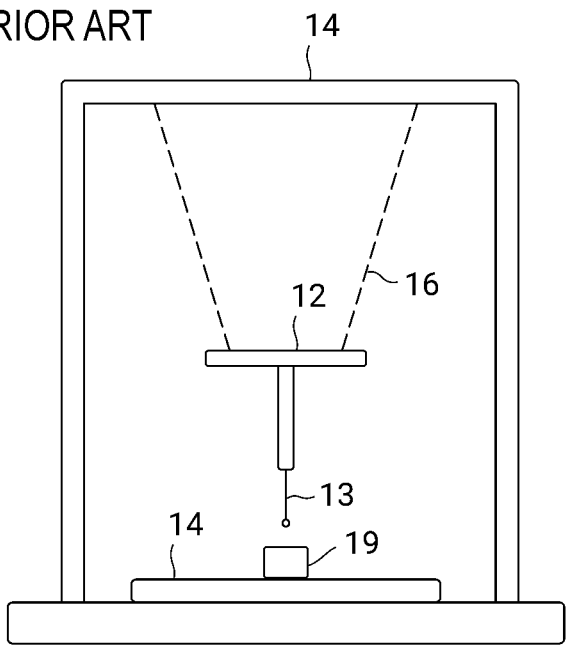

As mentioned above, the metrology arrangement M may be formed integrally with the drive arrangement, as for example illustrated in FIG. 2, or it may be decoupled at least to some extent from the drive arrangement D, as described for example in WO 2007/144573 and WO 2019/073246. Accordingly, the metrology arrangement M and drive arrangement D are shown as separate entities in the representation of FIG. 8, each connected separately to ground G, though they may in fact be one and the same entity (i.e. a combined drive and metrology arrangement D/M). It will also be appreciated that the platform P represents not only the platform 12 but also anything supported by the platform 12 (such as a tool e.g. measurement probe). In view of this, the term "moveable platform" can herein be considered to be equivalent to and interchangeable with "moveable structure".

Figure 9:
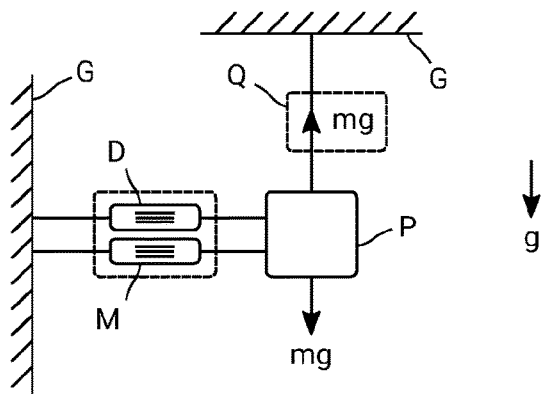

FIG. 9 provides a more generalised representation of FIG. 8, with the pulley and counterweight arrangement depicted in FIG. 8 being replaced (or represented) by a force generator Q which generates a counterbalance force mg which acts between the platform P and ground G. The representation of FIG. 9 is entirely equivalent to that of FIG. 8, with the counterbalance force mg being the tensional force developed in the left-hand string of the pulley arrangement of FIG. 8. The pulley arrangement of FIG. 8 can be considered as being provided merely to reverse the direction of the counterbalance force generated by the counterweight C (which acts downwardly, whereas the counterbalance force must act upwardly on the platform P). It is to be noted that the force acting on ground G would be 2 mg (taking into account also the force required to counteract the tension mg developed in the right-hand string of FIG. 8 that supports the counterweight C; even though not shown in the drawing, the tension in the string acts downwardly on the pulleys as well as upwardly on the platform P and counterweight C).

An embodiment of the present invention is illustrated schematically in FIG. 10. The present applicant has devised a new machine architecture which borrows the beneficial aspects of the simple counterbalance scheme of FIG. 9, in terms of perfect (or near-perfect) counterbalance stability in the z (vertical) direction, but modifying the scheme of FIG. 9 to overcome the drawbacks, as noted above, to provide counterbalance stability also in the x and y (horizontal) direction.

In simple terms, the constant counterbalance force mg from FIG. 9 is retained, but in the scheme of FIG. 10 this force mg acts not directly between the platform P and ground G but instead acts between an intermediate support S and ground G, with the support S being moveable (e.g. slidable) along a vertically-arranged linear counterbalance axis L. In turn, the platform P is supported by the support S via a linkage K. With this arrangement, the platform P is still counterbalanced in a vertical direction by the counterbalance force mg acting along the linear counterbalance axis L, but via the linkage K rather than directly. Such a machine architecture therefore provides a plurality of drive axes which are used for positioning the platform P within the working volume, and also provides a separate linear counterbalance axis L which is used for counterbalancing the platform P.

The linkage K transfers the counterbalance force mg generated by the force generator Q to the platform P (or alternatively this can be viewed as the linkage K transferring the weight mg of the platform P to the support S). As will be explained in more detail below, the linkage K provides for or enables horizontal movement of the platform P relative to the support S (and counterbalance force mg), and does so in such a way as not to affect the vertical counterbalancing provided by the force mg that acts between ground G and the support S. The linkage K can be considered to isolate horizontal movements of the platform P from the support S. These properties of the linkage K enable the simple (and very effective) vertical counterbalancing scheme of FIG. 6 to be employed, even for a platform P that is moving both horizontally and vertically within the working volume.

Since a constant counterbalance force mg can be generated (e.g. via a simple counterweight arrangement) that matches the weight of the platform P (and any supported components), and this constant counterbalance force F acts in a constant direction regardless of where the platform P is in the working volume, a counterbalance arrangement according to an embodiment of the present invention has the benefit of perfect (or near-perfect) counterbalancing throughout the working volume, which is not the case with the known counterbalance arrangement of FIG. 5.

It is appropriate in FIG. 10 to refer to the counterbalancing force (generated by the force generator Q) merely as F rather than mg to acknowledge that it is not strictly necessary for the counterbalancing force F to match the weight mg of the moveable platform P exactly, but merely sufficient for the counterbalancing force F to support at least some of the weight mg that would otherwise have to be supported by the drive arrangement (thereby reducing the amount of work done and heat generated by the drive arrangement).

To enable full movement of the platform P in all three dimensions within the working volume, including into and out of the page of the drawing, the counterbalance arrangement can be provided with an additional degree of freedom, which in FIG. 10 is shown as a rotational degree of freedom around a rotary counterbalance axis R. The additional degree of freedom could instead be a translational degree of freedom. The additional degree of freedom could be provided within or as part of the linkage K itself. With a rotary counterbalance axis R as shown in FIG. 10, it is to be noted that the linear counterbalance axis L (and counterbalance force F) may be offset from (and parallel to) the rotary counterbalance axis R, with the linear counterbalance axis L and the rotary counterbalance axis R being effectively arranged in series, as will be apparent from the specific embodiment described below with reference to FIG. 14. The linear counterbalance axis L may also be co-axial with the rotary counterbalance axis R, as is the case in the embodiment of FIG. 16.

The rotary counterbalance axis R may also come before (behind) or after (in front of) the linear counterbalance axis L (in a direction from ground G to platform P) in the series arrangement. The linear counterbalance axis L can be considered to be a first linear counterbalance axis L1, and the linkage K can be considered to provide a second linear counterbalance axis L2 for the counterbalance arrangement. The rotary counterbalance axis R can also be considered to be a first rotary counterbalance axis R1, with three additional rotary counterbalance axes R2/3/4 being provided by a coupling between the linkage K and platform P. Two possible arrangements of these axes are illustrated schematically in the inset parts to the right of FIG. 10, and will be discussed in more detail below with reference to FIGS. 14 and 16 respectively. In both arrangements the counterbalance force F is applied to (along) the linear counterbalance axis L1.

The linkage K and force generator Q are advantageously mutually arranged to ensure that, for a movement of the platform P in a direction perpendicular to gravity g, there is substantially no net work done on the force generator Q (and no net movement of the force generator Q), other than perhaps due to rotation of the force generator about at most one rotary counterbalance axis (which can be arranged to pass through the force generator Q or at least be close to it). This is advantageous because, in order to generate a counterbalance force of sufficient magnitude to support a heavy platform P, the force generator Q would need to be relatively bulky, with a large mass. Moving (accelerating) such a large mass requires a significant force to be applied to it (since force is equal to mass multiplied by acceleration), which in turn means that a significant amount of work is done by the drive arrangement in doing so (since work done on an object is equal to the force applied to the object multiplied by the distance moved by the object).

In the context of a coordinate measuring machine, which requires high accuracy and in which the accuracy is adversely affected by unknown and/or uncontrolled and/or non-uniform sources of heat (with associated thermal expansion of key parts of the machine), it is desirable to reduce the amount of work done (heat generated) by the drive arrangement. In a hexapod coordinate positioning machine of the type shown in FIG. 2 it is particularly beneficial to avoid making the drive arrangement do extra work for horizontal movements of the platform because the drive struts 16 are more powerful in the vertical direction than in the horizontal direction because of their physical arrangement (so it is easier to accelerate the platform and any ancillary mass vertically than horizontally).

With the counterbalance arrangement of FIG. 5, there is movement of the heavy force generator (i.e. the springs 96, carried by the hinge 93) even when the platform 12 is moved horizontally, which requires work to be done by the drive struts 16 on the hinge 93 (to accelerate it). Furthermore, the acceleration of the hinge 93 is not uniform for all positions of the platform 12 within the working volume, with some movements of the platform 12 that cause very high acceleration of the hinge 93 and other movements the cause much lower acceleration; this has an adverse effect on the dynamic response of the coordinate positioning machine. With an embodiment of the present invention, for radial movement of the platform towards and away from the counterbalance axis there is substantially no work done on the force generator, and for circumferential movement of the platform around the counterbalance axis the acceleration is uniform, so that the dynamic response is more controlled.

The linkage K and the force generator Q also advantageously cooperate to maintain the counterbalance force F in a substantially constant orientation relative to gravity g (and to the counterbalance axis L or R) as the platform P is moved around the working volume by the drive arrangement D. This greatly simplifies the technical requirements of the force generator Q to enable it to generate a constant force counterbalance force F. For example, with the counterbalance arrangement of FIG. 5, for a vertical movement of the platform 12 the arms 92, 94 will change angle relative to one another and the direction of the spring force generated by the springs 96 will vary. This in turn will result in a varying spring force from the springs 96, and a counterbalance force for the platform 12 that does not remain constant throughout the working volume, unless complicated and bulky (heavy) constant-force springs are used.

Figure 11:
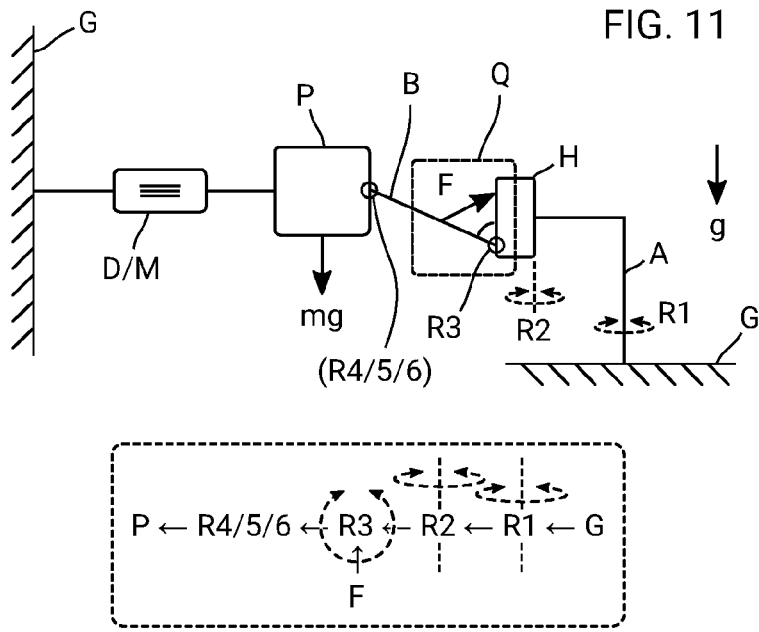
FIG. 11 is a schematic illustration, in a similar format to that of FIG. 10 for ease of comparison, of the known counterbalance arrangement of FIG. 5.

By way of comparison with the scheme of FIG. 10, a schematic representation of the known non-Cartesian counterbalance arrangement of FIG. 5 is provided in FIG. 11. The platform P is connected to ground G via a combined drive and metrology arrangement D/M, and on the other side a hinge H is provided on a counterbalance arm A that swings around a rotary axis R1 as indicated, with the hinge H also rotating around rotary axis R2, and with arm B rotating around rotary axis R3 (plus an additional three rotary axes R4 to R6 provided by a universal joint which couples arm B to platform P). A force generator Q (e.g. the spring 96 of FIG. 5) generates a counterbalance force F. The arrangement of counterbalance axes is illustrated schematically in the boxed part underneath FIG. 11, which also indicates that the counterbalance force F is applied to (around) rotary counterbalance axis R3. It is noted that the counterbalance arm A must swing around the marked rotary axis R1, and the hinge H must swing around rotary axis R2, even for movement of the platform P within the plane of the drawing; such a movement would not be possible with a fixed linkage. Unlike the embodiment represented in FIG. 10, with the known counterbalance arrangement represented in FIG. 11 the counterbalance force F does not act in a constant direction and is not connected directly to ground G. Furthermore, the force generator Q moves (accelerates) even for movements of the platform P towards or away from the arm A, which means that work is being done on the force generator Q by the drive arrangement D, and such movements are also not uniform around the working volume as mentioned above. This is a consequence of the fact that the counterbalance arrangement of FIG. 11 comprises only rotary axes, with the force generator Q having at least two rotary axes (R1 and R2) between it and ground G.

Figure 1:
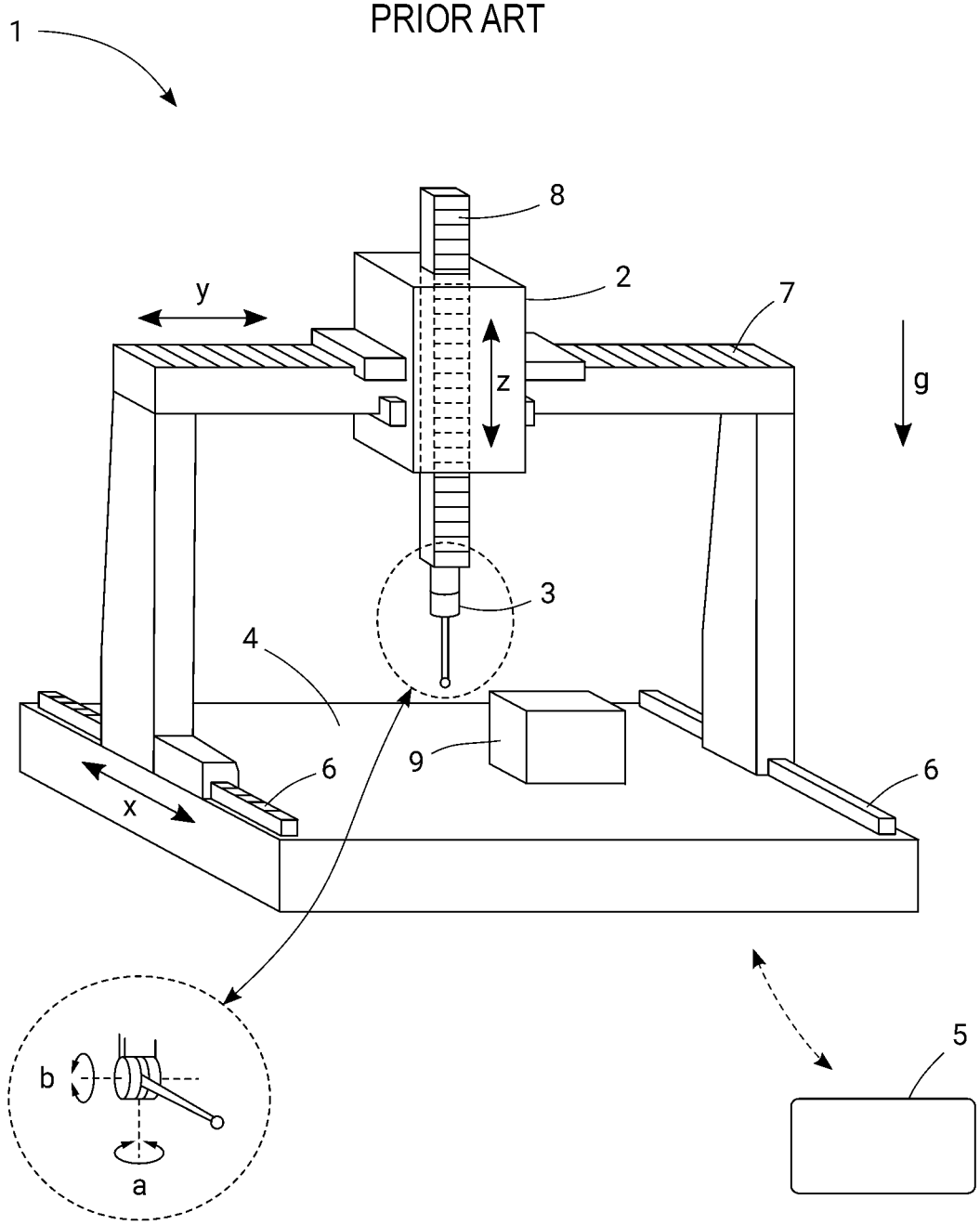
Figure 12:
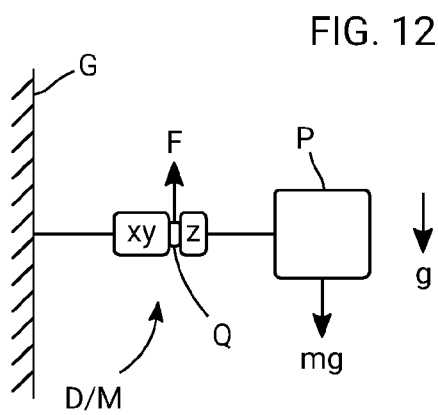
FIG. 12 is a schematic illustration, in a similar format to that of FIG. 10 for ease of comparison, of a known counterbalance arrangement for the z axis of a Cartesian coordinate positioning machine such as that illustrated in FIG. 1.
Figure 13:
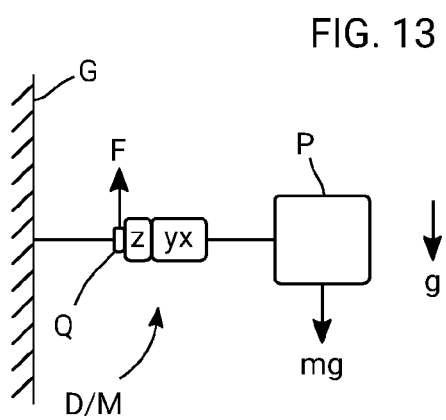
FIG. 13 is a schematic illustration, in a similar format to that of FIG. 10 for ease of comparison, of a known counterbalance arrangement for the z axis of a Cartesian coordinate positioning machine having a different arrangement of x, y and z axes to that of FIG. 12.

FIG. 12 provides a schematic representation, in a similar format, of a known counterbalance arrangement for a Cartesian machine as illustrated in FIG. 1. As mentioned above, because a Cartesian machine has a simplex, y, z arrangement of orthogonal axes, the z axis (i.e. the column 8 of FIG. 1) can be counterbalanced separately, via a counterbalance force F that effectively acts between the z axis and the adjacent y axis. For a Cartesian machine having a different serial arrangement of axes, such as disclosed in U.S. Pat. No. 4,229,136, the counterbalance arrangement would look more like the schematic representation of FIG. 13, in which the counterbalance force F acts between the z axis and ground. However, as mentioned above, it is not apparent how such a counterbalance arrangement is applicable to a non-Cartesian machine, because with the FIG. 13 arrangement the z drive axis is counterbalanced directly but a non-Cartesian machine does not have a z drive axis to counterbalance.

A more specific embodiment of the general scheme of FIG. 10 will now be described with reference to FIGS. 14 and 15. As with the non-Cartesian coordinate positioning machines described previously, a moveable platform 12 supports a measurement probe 13 and is driven around the working volume by extendible legs 16, and in particular is controlled (by a controller such as the controller 15 shown in FIG. 2) to move the measurement probe 13 into a sensing relationship with a workpiece 19 supported on a fixed structure 14 of the machine. The fixed structure 14 comprises a lower part on which the workpiece 19 is supported and an upper part which supports the extendible legs, in a "top-down" arrangement as explained above with reference to FIG. 4. Each of the extendible legs 16 is extended and retracted in a linear manner as described above, so that the drive arrangement of FIG. 14 can be considered to comprise a plurality of linear drive axes 61 associated respectively with the plurality of extendible legs 16. The orientation of each these linear drive axes 61 varies as the platform 12 moves around the working volume.

The machine of FIG. 14 is provided with a counterbalance arrangement 50 which operates according to the principles set out above with reference to FIG. 10, having a counterweight connected to a lower one of two support members 24 via a pulley arrangement. The support members 24 (comprising upper and lower support members 24) can be referred to collectively as a support. The pulley arrangement has a string (or cord or wire) 32 connected at one end to the counterweight 30 and at the other end to the lower support member 24, and the string 32 passes over two pulleys 46 which are themselves supported by a housing 40. The counterweight 30 can be considered to be a force generator (having an associated mass) for the counterbalance arrangement 50, generating a counterbalance force mg in the form of a tension in the string 32, which is connected to the lower support member 24 (via pulleys 46 and string 32) so as to apply the tension force (the counterbalance force) to the lower support member 24. Since the counterweight 30 generates a counterbalance force which acts downwardly (in the direction of gravity) and since the counterbalance force that is to be applied to the lower support member 24 must act upwardly (in a direction opposed to gravity), the pulleys 46 and string 32 can be considered to provide a function of reversing the direction of the gravitational force mg acting downwardly on the counterweight 30 to provide a counterbalance force mg acting upwardly on the lower support member 24. It would be possible to use a single pulley 46 instead of two, so long as the pulley 46 was of a sufficient width to provide the required lateral separation between the counterweight 30 and the track 44.

The support members 24 are moveable slidably along a vertically-arranged track or rail 44 which is affixed to the housing 40, thereby defining a linear counterbalance axis L for the counterbalance arrangement 50 (equivalent to that shown in FIG. 10). The linear counterbalance axis L is in line with the counterbalance force mg acting upwardly on the lower support member 24 (though these could be offset relative to one another and/or the counterbalance force could be applied to the lower support member 24 at an angle to the counterbalance axis L, with a component of the counterbalance force acting along the counterbalance axis L). The housing 40 is itself attached rotatably to the fixed structure 14 of the machine via rotary joints 41, allowing the housing 40 (with counterweight 30) to rotate about a vertical axis of rotation R. This axis of rotation R defines a rotary counterbalance axis R for the counterbalance arrangement 50 (equivalent to that shown in FIG. 10).

It is noted that (in this embodiment) the rotary counterbalance axis R is offset from the linear counterbalance axis L (i.e. offset from the line of the counterbalance force mg applied to the lower support member 24), but in other embodiments these two axes may be coincident or coaxial (see the alternative shown in FIG. 16). Despite the offset, in this embodiment the counterweight 30 is itself provided on (or along) the counterbalance axis R (i.e. with a zero offset from the counterbalance axis R), which is advantageous because when the counterbalance arrangement 50 rotates around the rotary counterbalance axis R, due to a circumferential movement of the platform 12 around the counterbalance axis R, it is desirable to have as much of the rotating mass as close as possible to the axis R of rotation to minimise the work done by such a movement (work is done by moving a mass).

Therefore, if not directly on the rotary counterbalance axis R, it is desirable at least to arrange the counterweight 30 as close as possible to it. In this respect, the mass of the other parts of the counterbalance arrangement 50 (such as the support members 24, track 44, pulleys 46, string 32 and even the housing 40) can be considered to be insignificant compared to the mass of the counterweight 30 itself. In any case, it is desirable to position as much of the mass the counterbalance arrangement 50 as close as possible to the rotary counterbalance axis R.

Using terminology borrowed from FIG. 10, FIG. 14 illustrates a series arrangement in which the elements, when viewed in a direction from ground G to platform P, are in the following order: [G→R→L→K→P]. This is illustrated schematically in inset part (A) of FIG. 14. The rotary axis R can be considered to be behind (or come before) the linear axis L (when viewed in order from G towards P). Since everything that comes after R in series will rotate around R, and since the force generator Q (counterweight 30) is associated with (tied to) the linear axis L, which comes after rotary axis R in the series, the force generator Q (counterweight 30) will also rotate around the rotary axis R. Therefore, when the machine elements are arranged in this order, with the rotary axis R behind the linear axis L, it is advantageous to arrange the force generator Q (counterweight 30) along or at least close to the rotary axis R.

It is to be noted that the linkage K effectively provides a second linear axis (i.e. a second linear degree of freedom) for the counterbalance arrangement 50, while the universal joint 26 effectively provides three rotary axes (three rotational degrees of freedom), so that the axes in full are effectively as follows: [G→R1→L1→L2→R2→R3→R4→P]. This is illustrated schematically in inset part (B) of FIG. 14. Apart from the rotary counterbalance axes (R2 to R4) provided by the universal joint 26, the counterbalance arrangement 50 comprises a single rotary counterbalance axis (R1) and two linear counterbalance axes (L1 and L2).

The counterbalance force F generated by the force generator Q is applied to (along) the linear counterbalance axis L1. The force generator Q itself is housed within housing 40, which is in front of rotary axis R1 in the series arrangement of axes. Being in front of rotary axis R1 in series, force generator Q rotates with R1. However, as indicated in inset part (B), despite being in front of rotary axis R1 in series, the force generator Q is physically positioned substantially in line with rotary axis R1, so that the mass of the force generator Q is as close as possible to rotary axis R1. Recall that the mass of the force generator Q will be significant, because in this embodiment it substantially matches that of the platform 12 and anything attached thereto, so it is of benefit to place the force generator G as close as possible to the rotary axis R1. However, it is not essential to place the force generator G directly on the rotary axis R1, because some benefit is gained merely by moving it away from the linear axis L1 and towards the rotary axis R1.

As mentioned just above, the counterbalance arrangement 50 effectively has two linear counterbalance axes (i.e. two linear degrees of freedom) and four rotary counterbalance axes (i.e. four rotational degrees of freedom), or six counterbalance axes (i.e. six degrees of freedom) in total. In general, to provide full relative movement between two bodies, six degrees of freedom are required (e.g. three linear and three rotational, or six linear, or some other suitable combination of linear and rotational), so the counterbalance arrangement 50 of FIG. 14 has a full complement of six degrees of freedom. The two linear axes (L1, L2) of FIG. 14 are substantially perpendicular to one another, with the first linear axis (L1) being substantially aligned with gravity and the second linear axis (L2) substantially perpendicular to gravity, while the first rotary axis (R1) is substantially parallel to the first linear axis (L1). The three rotary axes (R2 to R4) of the universal joint can be considered to be arranged in series, even if they act around the same point as if in parallel, because two different rotary axes cannot act in parallel between two rigid structures since they would conflict with one another (some flexing of the connected structures would be required to avoid such a conflict, which is not the case here).

The platform 12 is connected to support members 24 via a linkage 22, which effectively provides the second linear counterbalance axis (L2). The linkage 22 used in this embodiment is referred to as a Scott Russell linkage, comprising two rigid bars, one being twice the length of the other and the shorter bar being connected pivotably at one end to the centre of the longer bar. The shorter bar is pivotably connected at its other end to the lower support member 24. The longer bar is connected pivotably at one end to the upper support member 24 and at the other end is connected via a universal joint 26 to the platform 12. The linkage 22 is coupled to the platform 12 via a universal joint 26 which is shown enlarged in inset part (C).

As will be explained in more detail below with reference to FIG. 17, the linkage 22 and the force generator (counterweight 30) are mutually arranged to maintain the counterbalance force mg in a substantially constant orientation relative to gravity g as the platform 12 is moved around the working volume by the drive arrangement (extendible legs 16). In this respect, the linkage 22 is adapted to isolate or decouple lateral movement of the platform 12 from the lower support member 24 to enable this constant orientation to be maintained, which in this embodiment enables the platform 12 to move freely in x, y and z while the lower support member 24 is constrained to move linearly along the track 44, thereby enabling the constant orientation of the counterbalance force mg to be maintained through such a platform move. This will more apparent in the explanation below with reference to FIG. 17.

It will be apparent that the force generator (counterweight 30) is arranged substantially on a plane defined by the counterbalance axis R and the connection 26 between the linkage 22 and the platform 12, and this remains the case even as the platform 12 moves around the working volume. It will also be apparent that force generator (counterweight 30), the counterbalance axis R and the linkage 22 are arranged substantially in a plane, and this remains the case even as the platform 12 moves around the working volume.

As will be apparent, the linear counterbalance axis L (also labelled as L1) is arranged in series with the rotary counterbalance axis R (also labelled as R1). When viewed in a direction from the fixed structure 14 to the moveable structure 12, in this embodiment the rotary axis R comes before the linear axis L, but these could be arranged in the other order, for example with pivotable connections between the linkage 22 and the support members 24 which allow for rotation around a vertical axis. In such an embodiment, when viewed in a direction from the fixed structure 14 to the moveable structure 12, the rotary axis R would come after the linear axis L. Such an embodiment is described below with reference to FIG. 16.

FIG. 15 shows a top view of the machine of FIG. 14, with like parts being represented by like reference numerals. The top view illustrates more clearly how the linkage 22 provides for movement of the platform 12 radially towards and away from the counterweight 30, while the rotary joint 42 provides for movement of the platform 12 around the rotary axis R by an angle φ, thereby allowing movement of the platform 12 in both x and y, or more particularly in both r and φ. The platform 12 is moveable in z via movement of support members 24 along the vertical track 44, with z movement of the platform 12 being transferred to the support members 24 via linkage 22.

It was mentioned above, with reference to the known counterbalance arrangement depicted in FIG. 11, that the counterbalance arm A must swing around a rotary axis R1 even for movement of the platform P within the plane of the drawing, i.e. for movements towards and away from the rotary axis. Although in the embodiment of FIG. 14 there is also a rotary axis R, unlike the counterbalance arrangement of FIG. 11 (and FIG. 5) this rotary axis R is not required for movement of the platform 12 within the plane of the drawing, i.e. for movements towards and away from the rotary axis R. It is inevitable that an extra degree of freedom will be required in the counterbalance arrangement to enable movement out of the plane of the drawing, and the rotary axis R in this embodiment is a consequence of that inevitability rather than a consequence of the core counterbalance design. In other embodiments, a rotary axis R is not required (the extra degree of freedom could be provided by a linear axis, as is the case in FIG. 43). When restricted to two-dimensional movement within the plane of the drawing, with the FIG. 14 embodiment the rotary axis R is not required. Furthermore, the counterbalance force applied to the support member 24 in this embodiment is aligned with gravity at all times, regardless of where the platform 12 is located in the working volume, and acts between the fixed structure 14 of the machine and the lower support member 24. In this respect, the counterbalance force is provided by the tension in the string 32, which in turn is supported by the fixed structure 14 (via joint 42), just like in the FIG. 10 representation.

In the embodiment shown in FIGS. 14 and 15, the rotary counterbalance axis R is offset from the linear counterbalance axis L, and comes before the linear counterbalance axis L in series (when viewed in a direction from the fixed platform 14 to the moveable platform 12). FIG. 16 shows an alternative embodiment in which the rotary counterbalance axis R is coincident with the linear counterbalance axis L, and comes after the linear counterbalance axis L in series. In the embodiment shown in FIG. 16, the housing 40 is attached fixedly to the fixed structure 14 of the machine rather than via the rotary joints 41 of FIG. 14. Instead, rotary joints are incorporated into the support members 24, as illustrated most clearly in inset part (C) of FIG. 16. Each support member 24 comprises an inner part 24b which is supported rotatably around a rotary axis R by an outer part 24a. The rotary axis R comes after the linear axis L in series because the outer part 24a of the support member 24 slides along the linear axis L and inner part 24b rotates relative to the outer part 24a around the rotary axis R.

Borrowing terminology used in FIG. 10, FIG. 16 illustrates a series arrangement in which the elements, when viewed in a direction from ground G to platform P, are in the following order: [G→L→R→K→P]. This is illustrated schematically in inset part (A) of FIG. 16. The rotary axis R can be considered to be in front of (or come after) the linear axis L. Everything that comes after R in series will rotate around R, and what comes before R will not.

Therefore, since the force generator Q (counterweight 30) is associated with the linear axis L, the force generator Q (counterweight 30) will advantageously not rotate around the rotary axis R in this embodiment.

Note that, as mentioned above, the linkage K effectively provides a second linear axis (a second linear degree of freedom) for the counterbalance arrangement 50, while the universal joint 26 effectively provides three rotary axes (three rotational degrees of freedom) so that the axes in full are effectively as follows: [G→L1→R1→L2→R2→R3→R4→P]. This is illustrated schematically in inset part (B) of FIG. 16. In this arrangement, the counterbalance axis (L1), to which (along which) the counterbalance force is applied, is behind any rotary counterbalance axis (R1 to R4), when viewed in a direction from G to P along the series of axes.

Also marked in inset part (B) is the position of the force generator Q in the arrangement of counterbalance axes. Unlike FIG. 14, in FIG. 16 the force generator Q is located behind rotary axis R1 in the series arrangement of counterbalance axes, with the counterbalance force still being applied to (along) the linear counterbalance axis L1. Being behind rotary axis R1 in series, force generator Q does not rotate with R1, which is beneficial because not only is no work used to move the force generator Q for horizontal movements of the platform 12 with the plane of the page (towards and away from the counterbalance axis L1 and/or R1), but this is the case also for horizontal movements of the platform 12 out of the plane of the page (circumferentially around counterbalance axis R1).

The arrangements of FIGS. 14 and 16 are illustrated more schematically in FIG. 17, which will be used to explain the principle of operation of these embodiments, and in particular the properties of the Scott Russell linkage 22 which make it suitable for use as the linkage K described with reference to FIG. 10. The platform 12 and any tools, such as the measurement probe 13, supported by the platform 12 are represented schematically in FIG. 17 as a single platform P, and the connection between the platform P and the linkage is simplified in this two-dimensional representation, because to allow anything but infinitesimal movement in the y direction (into and out of the page) a suitable joint, such as the joint 26 of FIGS. 14 and 15, would of course be required; this applies to the majority of the schematic representations described hereinbelow, which are intended to show the principle of operation in two dimensions, with the third dimension (into and out of the page) being handled for example by a rotary counterbalance axis R.

When a force is applied to an object, the work W done on the object (or the energy imparted to the object) is equal to the applied force F multiplied by the distance moved by the object under the action of the force F:

$$W = F \times \text{distance}$$

Work transfers energy from one place to another, or one form to another; for example, a force applied by a spring to an object will transfer energy stored in the spring to the object in the form of kinetic and/or gravitational potential energy (e.g. to raise the object in the z direction). Work may be negative if the object is moving against the applied force; for example, the work done by the force of gravity when an object is raised vertically is negative because the gravitational force is in the opposite direction to the displacement (but the work done by the force that is doing the lifting is positive).

Consider now the arrangement illustrated in FIG. 17, where the platform P and counterweight C are considered as the moving bodies, and for the sake of simplicity the linkages are considered to have negligible mass. The change dE in the gravitational potential energy E of the system of two bodies is given by the overall work done on the two bodies by the force of gravity (F=mg):

$$dE = F \times \text{distance}$$
$$= mg \times (dh + dz)$$

where m is the mass of the platform P and of the counterweight C, g is the gravitational constant, dh is the change in h and dz is the change in z. The change dE is positive for positive dh and dz because a positive value for either of these amounts to lifting the mass against gravity, thereby imparting gravitational potential energy to the mass.

From FIG. 17 it is apparent that:

$$h = a - v$$
$$= a - (l - b - c - 2q\sin\theta)$$
$$= a - l + b + c + 2q\sin\theta$$

where l is the fixed length of the string (to the centre point of the counterweight). In the above expression, a, l and c are constant, while b will vary depending on the overall height of the linkage K within the machine. It is also apparent that:

$$z = a - b - 2q \sin \theta$$

Putting these into the expression for dE above, the following expression for dE is obtained:

$$dE = mg(db + 2q\cos\theta d\theta - db - 2q\cos\theta d\theta)$$
$$= 0$$

Therefore, a change dθ in the variable θ produces no change dE in the overall potential energy E of the system, and therefore the system is stable; there is no tendency for θ to increase or decrease, because doing so will not result in a lower energy state, and therefore the system is stable and the counterbalance performs its intended function of holding the system in a stable configuration in the absence of any externally-applied force.

In particular, the platform P is stable both in the z direction (aligned with gravity) and in the x and y directions (perpendicular to gravity), so that if the platform P is moved to a desired position in the working volume of the machine by the drive arrangement D, and the drive arrangement D is then de-activated, the platform P will remain in the same place even in the absence of any drive. Furthermore, this a substantially "pure" or "perfect" form of stability, compared to known counterbalance arrangements, because the forces involved do not change at all for different positions of the platform P in the working volume.

Rather than considering the work done on the platform P and counterweight C by the force of gravity, as represented by the downward-facing arrows of FIG. 17 emanating from those objects, consider now just the forces shown in the slightly simplified version shown in FIG. 18. In particular, consider the work done on the support members by the tension in the string of the pulley system and the work done on the platform by the force of gravity. Since the system is (in theory) perfectly balanced, the tension in the string is equal to mg, and this force acts upwardly on the lower support member. The upper support member is not attached to the string and hence the force acting on that support member in the vertical direction is zero. The gravitational force acting downwardly on the platform is of course equal to mg.

In general, the overall work done on the support member(s) by the tensional force(s) is given by:

$$\sum_i F_i dz_i$$

where $F_i$ is the force acting on support member i and $dz_i$ is the distance moved in the z direction by support member i. This concept is illustrated schematically in FIG. 20, which is based on the schematic representation of FIG. 10. In general, there can be considered to be N support members i=0 ... (N−1) where N is an integer greater than or equal to 1, with support member i having a force $F_i$ applied between the support member i and ground G along a linear counterbalance axis $L_i$.

As is illustrated graphically in FIG. 19, a key property of the Scott Russell linkage is that, when the platform P moves horizontally by an amount dx, in a direction perpendicular to gravity, this horizontal movement is translated or converted by the linkage into vertical movement $dz_1$ of the upper support member only (to which no counterweight force is applied), with no vertical movement $dz_0$ of the lower support member (to which a counterweight force is applied) and no horizontal movement dx, dy of either support member.

Therefore, the overall work done on the support members by the tension in the string is given by:

$$W = F_0 \times dz_0 + F_1 \times dz_1$$
$$= F_0 \times 0 + 0 \times dz_1$$
$$= 0$$

In the above, the lower support member has been assigned index i=0, the upper support member has been assigned index i=1, and it is also the case that $dz_0=0$ (the lower support member does not move in z) and $F_1=0$ (the upper support member is not attached to the pulley string).

Therefore, for a horizontal motion of the platform, the overall work done by the counterbalance forces applied to the support members is zero. In other words, a horizontal motion of the platform results in no change in the overall energy state, so there is no incentive or tendency for the platform to move sideways or horizontally, and the system is therefore stable in a direction perpendicular to gravity.

When the platform P moves vertically by an amount dz, in a direction aligned with gravity, this vertical movement is translated by the linkage into a corresponding vertical movement $dz_i$ of each support member i. The total work done by the forces $F_i$ acting the support members is therefore as follows:

$$\sum_i F_i dz_i$$

For the example of FIG. 18, the above expression amounts to:

$$\sum_i F_i dz_i = F_0 dz + F_1 dz$$
$$= mg \times dz + 0 \times dz$$
$$= mg \times dz$$

Therefore, the work done by the forces $F_i$ is exactly matched by the work done by the gravitational force acting on the platform P, i.e. both are equal to mg×dz. Accordingly, there is no change in the overall energy state with a change dz in the z position of the platform, so there is no incentive or tendency for the platform P to move vertically, and the system is therefore also stable in a direction aligned with gravity.

Again, because of the nature of the counterbalance arrangement, these forces do not change at all for different positions of the platform P within the working volume, so the counterbalance arrangement can be considered to provide perfect or near-perfect counterbalance throughout, assuming that the weight of the counterbalance C matches or nearly matches the weight of the platform P. Of course, in practice the counterweight C may not perfectly match the weight of the platform P (or rather, the moveable structure which includes anything also attached to the platform), but if there was a perfect match then the counterbalance can be considered also to be perfect or at least approximately so.

It will also be apparent from the above analysis that the linkage design is such that there is no horizontal movement of either support member for any movement of the platform, which is what enables the support members to run along their respective tracks and therefore what enables the counterbalance force to be maintained in a substantially constant orientation relative to gravity as the platform is moved around the working volume. Any lateral movement of the lower support member in particular would lead to the sort of issues explained above with reference to FIGS. 6 and 7, where the counterbalance force is not maintained in a substantially constant orientation relative to gravity as the platform is moved around the working volume. Being able to maintain the counterbalance force in a substantially constant orientation relative to gravity, whilst still allowing the platform to be moved around the working volume, provides a very effective counterbalance arrangement. This is particularly so for a non-Cartesian machine which by its nature does not have any drive axes that maintain a fixed orientation relative to gravity.

FIG. 21 illustrates an imperfect version of the counterbalance, having a longer arm length of 3q rather than 2q. The expression for h remains the same as above, while that for z becomes:

$$z = a - b - 3q \sin \theta$$

Therefore:

$$dE = mg(db + 2q\cos\theta d\theta - db - 3q\cos\theta d\theta)$$
$$= -mgq\cos\theta d\theta$$

Where $\theta$ is in the range from 0 to 90° (as will be the case for the arrangement of FIG. 21), $\cos \theta$ is in the range from 1 and 0 (i.e. $\cos \theta$ is positive), so that for a small positive change $d\theta$ in $\theta$ there is a decrease in the gravitational potential energy of the system because dE is negative. Therefore, in the absence of any other applied forces, the tendency is for $\theta$ to decrease, rather than to remain stable, so the arrangement of FIG. 21 will naturally collapse. Therefore, the arrangement of FIG. 21 is not suitable for use as a counterbalance and does not constitute an embodiment of the present invention. FIG. 22 corresponds to FIG. 19 and shows graphically how horizontal movement of the platform results in z movement of both support members.

FIG. 23 illustrates an imperfect version of the counterbalance, having a shorter arm length of 1.5q rather than 2q. The expression for dE and h remain the same, while that for z becomes:

$$z = a - b - 1.5q \sin \theta$$

Therefore:

$$dE = mg(db + 2q\cos\theta d\theta - db - 1.5q\cos\theta d\theta)$$
$$= -0.5mgq\cos\theta d\theta$$

In view of the above it will be apparent that the arrangement of FIG. 23 is also not stable, with the natural tendency being for $\theta$ to increase; again, the arrangement of FIG. 23 is therefore also not suitable for use as a counterbalance and also does not constitute an embodiment of the present invention. FIG. 24 corresponds to FIG. 19 and shows graphically how horizontal movement of the platform results in z movement of both support members.

FIGS. 25 to 27 are similar to FIGS. 19, 22 and 24 respectively, but instead show how the platform moves when the upper support member is moved vertically with the lower support member (i.e. that to which a counterbalance force is being applied) at a constant z position. For the counterbalance arrangements not embodying the present invention (FIGS. 26 and 27), the z position of the platform changes with such a motion, leading to an overall change in the energy of the system, and hence giving these arrangements an inherent instability.

Furthermore, with the linear axis L from FIGS. 14 and 16 marked as a first linear axis L1 in FIG. 25, it will be apparent that the linkage of FIG. 25 effectively provides a second linear axis L2 that is substantially perpendicular to the first linear axis L1. Since the first linear axis L1 is substantially aligned with gravity (substantially vertical), it follows that the second linear axis L2 is substantially perpendicular to gravity (substantially horizontal). This is because the nature of the Scott Russell linkage is such that it produces a right-angle change of motion, from linear to linear. Therefore, when the linkage is coupled to a first linear axis L1 it effectively creates a second linear axis L2, thereby providing two (substantially orthogonal) linear degrees of freedom for the counterbalance arrangement. On the other hand, this is not the case for the linkages illustrated in FIGS. 26 and 27, in both of which cases the linkage creates a distinctly non-linear axis NL coupled to the linear (vertical) axis L.

FIG. 28 shows an alternative counterbalance arrangement, which is an "upside down" version of that described above with reference to FIG. 17. In the FIG. 28 arrangement, the upper support member is attached to the pulley string rather than the lower support member. A similar analysis applies to that given above in connection with FIG. 17:

$$z = u + 2q\sin\theta$$

$$h = a - v$$

$$= a - (l - c - b)$$

$$= a - (l - c - (a - u - 2q\sin\theta))$$

$$= 2a - l + c - u - 2q\sin\theta$$

In the above expression, a, 1 and c are constant, while u will vary depending on the overall height of the linkage K within the machine. Therefore:

$$dE = mg(du + 2q\cos\theta d\theta - du - 2q\cos\theta d\theta)$$

$$= 0$$

Therefore, a change $d\theta$ in the variable $\theta$ produces no change dE in the overall potential energy E of the system, and therefore the system is stable; there is no tendency for $\theta$ to increase or decrease, because doing so will not result in a lower energy state, and therefore the system is stable and the counterbalance performs its intended function of holding the system in a stable configuration in the absence of any externally-applied force. The linkage of FIG. 28 also effectively creates two orthogonally-arranged linear counterbalance axes, as explained above with reference to FIG. 25.

Further embodiments of the present invention will now be described, based on the same principles as set out above. Accordingly, the description of these further embodiments is not as detailed as that given above.

FIG. 29 illustrates a "longer reach" alternative to the arrangement of FIG. 28, having additional links and joints. The linkage of FIG. 29 has the same property as that of FIG. 28, which is that the upper support member does not move when the platform moves only horizontally, and does not try to move horizontally for any movement of the platform, thereby maintaining the counterbalance force in a substantially constant orientation relative to gravity. The linkage of FIG. 29 also effectively creates two orthogonally-arranged linear counterbalance axes, as explained above with reference to FIG. 25.

FIG. 30 illustrates an embodiment that is similar to FIG. 29 but using a slightly different linkage arrangement, with three links of length 1.5q and one link of length 0.5q. Again, the linkage of FIG. 30 has the same property as the others described above, which is that the support member that is attached to the counterbalance force does not move when the platform moves only horizontally, and does not try to move horizontally for any movement of the platform, thereby maintaining the counterbalance force in a substantially constant orientation relative to gravity. The linkage of FIG. 30 also effectively creates two orthogonally-arranged linear counterbalance axes, as explained above with reference to FIG. 25.

FIG. 31 illustrates a "double pulley" arrangement associated with the force generator, in contrast to the single pulley arrangement of FIG. 17. A counterweight is used that is twice the weight of the platform because the counterweight moves only half the vertical distance of the platform, so that the overall potential energy of the system is still stable, and the tension in the pulley string that supports the lower support member is half that of the gravitational force acting on the counterweight, i.e. equal to the gravitational force acting on the platform. The linkage of FIG. 31 also effectively creates two orthogonally-arranged linear counterbalance axes, as explained above with reference to FIG. 25.

FIG. 32 provides an illustration of how the links forming the linkage arrangement of FIG. 18 might be shaped in practice to provide structural rigidity to the linkage with use of only sheet or plate material, for example an aluminium or steel material. Similarly, FIG. 33 provides an illustration of a how the links forming the linkage arrangement of FIG. 30 might be shaped and formed in practice.

FIG. 34 illustrates how the platform can be supported by two counterbalance arrangements, in this example two counterbalance arrangements of the type shown in FIG. 17, each providing only half of the counterbalance force to the platform, so that the overall counterbalance force is as per previous embodiments.

FIG. 35 illustrates an alternative counterbalance arrangement in which a force is applied to both support members, rather than just one of them like in previous embodiments, and where the linkage is adapted so that both support members move vertically but in opposite directions when the platform moves horizontally. Each support member has a force of ½ mg applied to it in an upward direction by a force generator (via a respective pulley arrangement), so that when one moves up and the other moves down, the work done by one counterbalance force is positive and the work done by the other counterbalance force is negative, with the overall work performed being zero, i.e. $\Sigma_i F_i dz_i = 0$, so that there is counterbalance stability in the horizontal direction, and the sum of forces $F_i$ still matches the weight of the platform, i.e. $\Sigma_i F_i = mg$, so that there is counterbalance stability also in the vertical direction. The linkage of FIG. 35 also effectively creates two orthogonally-arranged linear counterbalance axes, as explained above with reference to FIG. 25.

FIG. 36 illustrates a variant of the arrangement of FIG. 35, in which the counterweights are arranged to slide on respective angled supports, i.e. in a direction not aligned with gravity. The forces acting on the support members remains the same, however.

FIG. 37 illustrates an alternative counterbalance arrangement to that shown in FIG. 35, in which a force generator is used to apply a counterbalance force separately to both support members, in which the linkage is adapted so that both support members move vertically but in opposite directions when the platform moves horizontally, and in which vertical movement of the platform is transferred to a corresponding vertical movement of the support members. The counterbalance of FIG. 37 includes a double pulley arrangement associated with each support member. The linkage of FIG. 37 also effectively creates two orthogonally-arranged linear counterbalance axes, as explained above with reference to FIG. 25.

In each of the specific embodiments described above, a counterweight has been employed to generate a counterbalance force (in the form of tension in the string) that is applied to one or more support members of the counterbalance arrangement. The use of a counterweight that exactly matches the weight of the structure (platform plus supported tools) is a very convenient way of implementing the present invention, and it is a straightforward way of providing exact counterbalancing (with a constant counterbalance force that exactly balances the weight of the moveable structure). However, it is not essential to use a counterweight system as the force generator to provide a constant counterbalancing force of the correct magnitude, and instead a pneumatic element or a constant-force spring could be employed as the force generator. A constant-force spring is a variant of an extension spring, and is characterised by exerting a substantially constant force regardless of the degree of extension. An example of a constant-force spring is the well-known fusee spring arrangement, which makes use of a cone-shaped pulley with a helical groove around which a cord is wound; the cord is attached to a coiled mainspring which provides a force that diminishes with extension, but the helical nature of the pulley compensates for the diminishing force provided by the mainspring as the cord unwinds, thereby providing a substantially constant force. Just like a counterweight, in order to provide sufficient force to act as a counterbalance, a spring has an associated mass that is not insignificant and that would require a noticeable amount of work to be performed on it to move it around.

An embodiment based on the use of a constant-force spring as the force generator is illustrated schematically in FIG. 38, which is based on the embodiment of FIG. 37. Similarly, FIG. 39 illustrates the use of a constant-force spring as the force generator in the embodiment of FIG. 18. The use of a such a constant-force spring as the force generator can be considered in some applications to have an advantage over the use of a physical counterweight 30, because with a physical counterweight 30 it is necessary to accelerate the counterweight 30 when moving the platform 12 vertically. In practice, however, a physical counterweight 30 provides a very convenient solution due to its ease of use and due to the ability to fine-tune the weight of the counterweight 30 simply by adding or removing additional mass elements. Furthermore, with a non-Cartesian machine such as that depicted in FIG. 2 the extendible legs 16 are able to deliver a significant drive force in the z direction, by extension and retraction of the legs 16, so it is not particularly problematic to have to accelerate the additional weight of the counterweight 30; on the other hand it would be more problematic with such a machine to have to drive an additional mass horizontally but this is not the case with an embodiment of the present invention because no work is performed on (or by) the counterweight 30 with horizontal movement of the platform 12, and in the embodiments of FIGS. 14 and 16 for example there is no movement of the counterweight 30 at all when the platform 12 is moved horizontally.

FIG. 40 illustrates a different form of linkage to that shown in previous embodiments, having a horizontally-arranged telescopic tube (or relatively-slidable bars) 72 rigidly coupled to a vertically-slidable carriage 74 (to which the counterbalance force is applied) by a rigid coupling 76, and also including a double pulley arrangement as part of the force generator. The linkage of FIG. 40 also effectively creates two orthogonally-arranged linear counterbalance axes, just like for previous embodiments, and as explained above with reference to FIG. 25.

Furthermore, although the counterbalance arrangement is described above as providing an effective counterbalance for a non-Cartesian machine, it can also provide a counterbalance for a Cartesian machine. FIG. 41 illustrates that a counterbalance arrangement embodying the principles of operation set out in previous embodiments can also be applied to counterbalance a Cartesian coordinate positioning machine. Such a counterbalance arrangement can also be used to counterbalance a non-Cartesian serial kinematic coordinate positioning machine such as a robot arm, which has a plurality of rotary drive axes.

For example, FIG. 42 illustrates the use of the same counterbalance arrangement 50 as is shown in FIG. 16, but where a robot arm 60 is used to move the platform 12 instead of a hexapod drive arrangement. The robot arm 60 comprises a plurality of segments 62 connected by a mixture of transverse rotary joints (or "rotational joints") 64 and inline rotary joints (or "twisting joints") 66, forming a mechanical linkage from one end to the other. Accordingly, the drive arrangement of FIG. 42 has a plurality of rotary drive axes 64, 66, compared to the plurality of linear drive axes 16 of FIG. 16. The counterbalance arrangement is equally applicable to a coordinate positioning machine having a mixture of linear and rotary drive axes.

Although it is explained above, with reference to FIGS. 14 and 15, that the counterbalance arrangement 50 rotates about a rotary axis R in order to enable motion of the platform 12 in three dimensions x, y, z (or r, z in radial coordinates), this is not essential. Instead, rather than being based on a radial coordinate system as shown in FIGS. 14 and 15, the counterbalance arrangement could itself be based on a Cartesian x, y, z coordinate system, having orthogonal axes x, y, z. With such an arrangement, the z axis would be counterbalanced and the x, y axes would provide for x, y movement of the platform 12 without interfering with the counterbalancing force provided by the vertical counterbalance. The counterbalance arrangement is provided between the fixed structure 14 of the machine and the moveable platform 12 independently of the drive arrangement for the machine. Such an arrangement is illustrated in FIG. 43, in which a Cartesian counterbalance arrangement embodying the present invention is used to counterbalance either a Cartesian coordinate positioning machine or a non-Cartesian coordinate positioning machine.

In the analysis given above based on the arrangement illustrated in FIG. 17, points $S_0$ and $S_1$ are constrained to move along a vertical track or rail, with point P moving freely within the range of movement defined by the rigid bars. However, other arrangements are possible in which points $S_0$ and $S_1$ are not so constrained, or constrained in a different manner. It will also be appreciated that the although the linkage (e.g. Scott Russell linkage) is described as being linear in nature (thereby providing a linear counterbalance axis), a series of rotary counterbalance axes (for example with each rotary counterbalance axis being aligned with gravity) could take the place of this second linear counterbalance axis, like the links of a bicycle chain, so that there is only a single linear counterbalance axis (that to which the counterbalance force is applied).

A counterbalance arrangement embodying the present invention, as set out above, has proven to be so effective in practice that it eliminates the need completely for a braking system, because wherever the platform 12 is in the working volume 11 the counterbalance provides a substantially perfect counterbalance such that the platform 12 is stable without the need for a brake to prevent it from moving away from that position in the absence of separate support from the drive arrangement.

FIG. 44 illustrates an embodiment which is based more closely on the counterbalance arrangement of FIG. 5. There are no changes to the arrangement of counterbalance axes, such that there are effectively six rotary counterbalance axes R1 to R6 as marked in FIG. 44 (and as discussed above with reference to FIGS. 5 and 11). It is noted that rotary counterbalance axis R3 is substantially perpendicular to gravity, such that when a counterbalance force is applied to (around) the rotary axis R3 the resulting force applied to the connected arm 92 is in a substantially vertical plane, while rotary counterbalance axes R1 and R2 are substantially aligned with gravity. Rotary axis R3 is substantially perpendicular to rotary axes R1 and R2. Rotary axes R4 to R6 are provided by the universal joint which couples arm 92 to platform 12.

The key modification compared to FIG. 5 is that in FIG. 44 the mass that generates the counterbalance force is brought back so as to be in line with the first rotary counterbalance axis R1, rather than being located after rotary axis R2. In this respect, in the embodiment of FIG. 44 the force generator is a simple counterweight C, with a string 99 transferring the generated counterbalance force through the arm 94 to the hinge 93, where it can be applied to (around) the rotary axis R3 in a similar way to the FIG. 5 arrangement. The difference is that in this embodiment the counterbalance force is provided to the hinge 93 via tension in the string 99, with the source of the force (counterweight C) being located remote from the hinge 93, whereas in the FIG. 5 arrangement the source of the force (springs 96) is located at the hinge 93 itself.

The benefit of the FIG. 44 arrangement over the FIG. 5 arrangement is that, by having the mass of the force generator C located along (or alongside or at least close to) the first counterbalance axis R1 in the series of counterbalance axes R1 to R6 (when viewed in a direction towards the platform 12), the mass does not move (or at least does not move inconsistently) when the platform 12 moves around the working volume, other than due to rotation of the mass about just a single rotary counterbalance axis R1 via twisting/rotation of the string 99 (rather than rotation around two or more rotary counterbalance axes as in the known counterbalance arrangements). The force-generating mass is still connected to the hinge 93, via string 99, in order to transfer the counterbalance force to where it is needed (at the rotary counterbalance axis R3), but the force-generating mass itself is located close to (e.g. along) the first rotary axis R1.

This can be explained in a broad sense with reference to the inset parts (A) to (C) in FIG. 44, which are similar to those in FIGS. 14 and 16 for comparison. Inset part (A) is for the known counterbalance arrangement of FIG. 5, showing the arrangement of counterbalance axes R1 to R6 and the position the force generator Q (counterweight C) in the arrangement of counterbalance axes. Force generator Q is located in front of rotary axes R1 and R2 (within hinge 93), with the counterbalance force F being applied to (around) rotary counterbalance axis R3. Being in front of two rotary axes R1 and R2 in series, force generator Q rotates with R1 and R2, in complicated ways as described above.

The arrangement shown in inset part (B) is representative of a similar type of counterbalance that is used in the DS10 contact scanner sold by Renishaw plc (previously also marketed under the Incise trade name), which is also a parallel kinematic machine. The counterbalance force F is again applied to (around) rotary counterbalance axis R3, and the force generator Q is again located in front of rotary axes R1 and R2 in the series arrangement. However, the force generator Q (which is a spring in practice) is physically located somewhat in front of rotary axis R3, connected in practice to a point along the associated arm (between R3 and R4/5/6) which is some distance away from axis R3, more like what is represented schematically in FIG. 11. Accordingly, the force generator Q effectively rotates around three rotary axes R1, R2 and R3, though rotation around rotary axis R3 only occurs when movement of the platform 12 has a vertical component, not for pure horizontal movements. However, even for pure horizontal movements of the platform 12, the effect of rotation around rotary axis R2 is potentially more significant because the force generator Q is not located close to rotary axis R2.

Contrast this with the arrangement shown in inset part (C), which is representative of the embodiment shown in FIG. 44. The counterbalance force F is still applied to (around) rotary counterbalance axis R3, but the force generator Q is now physically placed behind rotary axes R2 and R3 and substantially in line with rotary axis R1. Hence, the force generator Q is effectively shielded or isolated from rotational movements around rotary axes R2 and R3 and is only subject to rotational movements around rotary axis R1, providing similar benefits to the FIG. 14 embodiment.

Although embodiments of the present invention have been described mainly in relation to the use of a contact probe, in which a stylus of the contact probe makes physical contact with the workpiece surface to take a measurement, it will be appreciated that the invention is not limited to contact probes. The same concepts are applicable equally to non-contact probes, such as optical probes, in which a surface is sensed without making physical contact. The invention is generally applicable to any surface sensing device that is adapted to sense a surface, whether by contact or not. The invention can also be applied to the positioning of a component other than a surface sensing device, for example for orienting a component part of an article during manufacture of the article. Or, the component could be a tool, or a part thereof, such as a tool typically found in a machine tool for shaping or machining metal or other rigid materials. The component could be the moveable structure itself. The component may comprise a camera for imaging the surface of the workpiece. The component may comprise an eddy current probe for detecting and/or measuring eddy current at or near the surface of the workpiece. Many other possibilities would be apparent to the skilled person.

It will be appreciated that operation of the coordinate measuring machine can be controlled by a program operating on the machine, and in particular by a program operating on a coordinate measuring machine controller such as the controller 5 and 15 illustrated schematically in FIGS. 1 and 2 respectively. It will be appreciated that control of the extendable legs can be provided by a program operating on the controller 5 or 15. Such an operating program can be stored on a computer-readable medium, or could, for example, be embodied in a signal such as a downloadable data signal provided from an Internet website. The appended claims are to be understood as covering an operating program by itself, or as a record on a carrier, or as a signal, or in any other form.

Although the above embodiments have been described mainly in the context of a coordinate measuring machine, the concepts are applicable more generally to any type of coordinate positioning machine, such as comparators, scanning machines, machine tools, robots, positioning devices (e.g. for optical components), prototype manufacturing machines and various other uses.

The invention claimed is:

1. A coordinate positioning machine comprising:
   a plurality of drive axes for positioning a moveable structure within a working volume of the machine;
   a plurality of counterbalance axes for counterbalancing the moveable structure; and
   a force generator for generating a counterbalance force which is applied to at least one of the counterbalance axes;
   wherein the counterbalance axes comprise a linear counterbalance axis and wherein the counterbalance force is applied to the linear counterbalance axis.

2. A coordinate positioning machine as claimed in claim 1, wherein each counterbalance axis provides constrained relative linear or rotary motion between two corresponding elements of the counterbalance arrangement.

3. A coordinate positioning machine as claimed in claim 1, wherein the linear counterbalance axis provides constrained relative linear motion between two elements of the counterbalance arrangement.

4. A coordinate positioning machine as claimed in claim 1, wherein each counterbalance axis provides a corresponding linear or rotary degree of freedom for relative movement between the moveable structure and a fixed structure of the machine.

5. A coordinate positioning machine as claimed in claim 1, comprising a linkage for transferring the counterbalance force to the moveable structure.

6. A coordinate positioning machine as claimed in claim 5, wherein the linkage is adapted to provide for movement of the moveable structure in a direction perpendicular to gravity whilst causing the counterbalance force to do substantially no work.

7. A coordinate positioning machine as claimed in claim 1, wherein the counterbalance axes are arranged in series and/or wherein the drive axes are arranged in parallel.

8. A coordinate positioning machine as claimed in claim 1, wherein the linear counterbalance axis has a substantially constant orientation relative to gravity, such as substantially aligned with gravity, and/or wherein an orientation of the linear counterbalance axis is substantially invariant to a change in orientation and/or actuation of the drive axes.

9. A coordinate positioning machine as claimed in claim 1, wherein the counterbalance axes comprise first and second linear counterbalance axes which are arranged substantially perpendicular to one another.

10. A coordinate positioning machine as claimed in claim 9, comprising a linkage for transferring the counterbalance force to the moveable structure, wherein the second linear counterbalance axis is provided by the linkage and wherein the counterbalance force is applied to the first linear counterbalance axis.

11. A coordinate positioning machine as claimed in claim 9, comprising a linkage for transferring the counterbalance force to the moveable structure, wherein the linkage defines the first and second linear counterbalance axes and/or is adapted to produce a substantially perpendicular change of motion corresponding to the first and second linear counterbalance axes.

12. A coordinate positioning machine as claimed in claim 5, wherein the linkage is a Scott Russell linkage.

13. A coordinate positioning machine as claimed in claim 5, wherein the linkage is adapted to absorb horizontal movement of the moveable structure and to convert vertical movement of the moveable structure into corresponding vertical movement of the linkage along the linear counterbalance axis.

14. A coordinate positioning machine as claimed in claim 5, wherein the moveable structure is counterbalanced along the linear counterbalance axis via the linkage, for example with at least part of the weight of the moveable structure being supported via the linkage by a substantially constant counterbalance force applied to the linkage along the linear counterbalance axis.

15. A coordinate positioning machine as claimed in claim 5, comprising at least one support member coupled to the linear counterbalance axis, with the at least one support member being arranged to move slidably along the linear counterbalance axis, wherein the counterbalance force is arranged to act on the at least one support member, and wherein the linkage is coupled between the moveable structure and the at least one support member.

16. A coordinate positioning machine as claimed in claim 15, wherein a vertical movement of the moveable structure by the drive arrangement is converted by the linkage into a corresponding vertical movement of the at least one support member, causing the counterbalance force applied to the at least one support member to do work substantially equal but opposite to the work done by the force of gravity acting on the moveable structure.

17. A coordinate positioning machine as claimed in claim 15, wherein a horizontal movement of the moveable structure by the drive arrangement is converted by the linkage into at most a vertical movement of the at least one support member, causing the force(s) applied to at least one support member to do substantially no net work.

18. A coordinate positioning machine as claimed in claim 15, comprising first and second support members each arranged to move slidably along a track that is substantially aligned with gravity, wherein movement of the moveable structure in a direction perpendicular to the or each track is translated by the linkage into movement of the second support member along its track with substantially no movement of the first support member along its track; wherein movement of the moveable structure in a direction parallel to the or each track is translated by the linkage into motion of at least the first support member along its track in the same direction and by the same amount; and optionally wherein the counterbalance force is applied to the first support member and not the second support member.

19. A coordinate positioning machine as claimed in claim 15, wherein a force $F_i$ is applied by the force generator to each support member i in a direction substantially opposed to gravity, with $\Sigma_i F_i \sim mg$, with the linkage translating or converting changes dx, dy, dz in the moveable structure to changes $dx_i$, $dy_i$, $dz_i$ in each support member i such that $\Sigma_i F_i dz_i \sim mg.dz$, $dx_i \sim 0$ and $dy_i \sim 0$, where m is the mass of the moveable structure, g is the gravitational acceleration and i is an integer greater than or equal to one and where at least one of $F_i$ may be zero.

20. A coordinate positioning machine as claimed in claim 1, wherein the counterbalance axes comprise at least one rotary counterbalance axis.

21. A coordinate positioning machine as claimed in claim 20, wherein the counterbalance axes are arranged in series, and wherein the force generator is arranged behind or at a predetermined horizontal distance from the first rotary counterbalance axis in the series.

22. A coordinate positioning machine as claimed in claim 21, wherein the predetermined horizontal distance is substantially constant and/or wherein the force generator is arranged close to the first rotary counterbalance axis, for example with the predetermined horizontal distance being less than 50% of a horizontal distance between the first rotary counterbalance axis and the moveable structure.

23. A coordinate positioning machine as claimed in claim 1, wherein the counterbalance axes and force generator are mutually arranged such that movement of the moveable structure in a direction perpendicular to gravity causes substantially no net movement of the force generator, other than due to rotation of the force generator about at most one rotary counterbalance axis.

24. A coordinate positioning machine as claimed in claim 1, wherein the counterbalance axes are separate from the drive axes and/or wherein each counterbalance axis is separate from and/or independent of and/or different to each of the drive axes.

25. A coordinate positioning machine as claimed in claim 1, wherein the counterbalance force is a substantially constant counterbalance force.

26. A coordinate positioning machine as claimed in claim 1, wherein the force generator comprises a counterweight which generates a tensional force in a string or cord or cable or wire or similar coupled thereto.

27. A coordinate positioning machine as claimed in claim 1, wherein each of the drive axes is a linear drive axis and/or wherein none of the drive axes has or maintains a substantially constant orientation relative to gravity as the moveable structure moves around the working volume.

28. A coordinate positioning machine as claimed in claim 1, wherein the machine is a non-Cartesian and/or parallel kinematic and/or hexapod coordinate positioning machine, and wherein the machine may be a coordinate measuring machine.

29. A method of counterbalancing a coordinate positioning machine having a plurality of drive axes, each of which is either a rotary drive axis or a linear drive axis, for positioning a moveable structure within a working volume of the machine, the method comprising providing a linear counterbalance axis, separate from any of the drive axes, and counterbalancing the moveable structure via the linear counterbalance axis.

30. A coordinate positioning machine comprising:
a plurality of drive axes for positioning a moveable structure within a working volume of the machine;
a plurality of counterbalance axes for counterbalancing the moveable structure; and
a force generator for generating a counterbalance force which is applied to at least one of the counterbalance axes;
wherein the counterbalance axes and force generator are mutually arranged such that movement of the moveable structure in a direction perpendicular to gravity causes substantially no net movement of and/or causes substantially no work to be done on the force generator, other than due to rotation of the force generator about at most one rotary counterbalance axis.

* * * * *